(12) United States Patent
Fukasawa

(10) Patent No.: US 11,936,701 B2
(45) Date of Patent: Mar. 19, 2024

(54) MEDIA DISTRIBUTION SYSTEM, COMMUNICATION SYSTEM, DISTRIBUTION CONTROL APPARATUS, AND DISTRIBUTION CONTROL METHOD

(71) Applicant: Naoki Fukasawa, Kanagawa (JP)

(72) Inventor: Naoki Fukasawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/946,045

(22) Filed: Sep. 16, 2022

(65) Prior Publication Data
US 2023/0113867 A1 Apr. 13, 2023

(30) Foreign Application Priority Data
Sep. 28, 2021 (JP) .................................. 2021-157790

(51) Int. Cl.
*H04L 65/611* (2022.01)
*H04L 65/403* (2022.01)
*H04L 65/612* (2022.01)

(52) U.S. Cl.
CPC .......... *H04L 65/611* (2022.05); *H04L 65/403* (2013.01); *H04L 65/612* (2022.05)

(58) Field of Classification Search
CPC ... H04L 65/611; H04L 65/403; H04L 65/612; H04L 65/1069; H04L 65/4038;
(Continued)

(56) References Cited

U.S. PATENT DOCUMENTS 7,321,925 B2 * 1/2008 Trethewey ............ H04L 69/329
  709/227
8,423,672 B2 * 4/2013 Liu ....................... H04L 67/101
  709/245

(Continued)

FOREIGN PATENT DOCUMENTS

JP   2015-192230   11/2015
JP   2016-178356   10/2016

OTHER PUBLICATIONS

Extended European Search Report dated Jan. 10, 2023 in European Patent Application No. 22197119.5, 10 pages.
(Continued)

*Primary Examiner* — Javier O Guzman
(74) *Attorney, Agent, or Firm* — XSENSUS LLP

(57) ABSTRACT

A distribution control apparatus assigns one of the one or more media distribution servers that is selected based on a reserved bandwidth of the media distribution server for distributing the media information and a maximum reserved bandwidth available to the media distribution server, as a media distribution server that distributes the media information to one or more communication apparatuses at a collective site, the collective site including one or more sites that share the same media information, and transmits, in response to a connection request to connect to the assigned distribution media distribution server, transmitted from a particular communication apparatus of the one or more communication apparatuses at a particular site of the collective site, a connection response to the particular communication apparatus at the particular site.

14 Claims, 48 Drawing Sheets

(58) Field of Classification Search
CPC ... H04L 65/1063; H04L 65/752; H04L 65/80; H04N 7/152
See application file for complete search history.

(56) References Cited

U.S. PATENT DOCUMENTS

| | | | | |
|---|---|---|---|---|
| 9,065,867 B2 * | 6/2015 | Prasad | ............... | H04L 61/5076 |
| 9,215,275 B2 * | 12/2015 | Kannan | ............... | H04L 67/02 |
| 10,033,631 B1 * | 7/2018 | Baveja | ............... | H04L 67/10 |
| 10,116,737 B2 * | 10/2018 | Yeager | ............... | H04L 61/2528 |
| 2002/0059170 A1 * | 5/2002 | Vange | ............... | H04W 8/04 |
| 2003/0154283 A1 * | 8/2003 | Brown | ............... | H04L 61/2503 |
| | | | | 709/240 |
| 2004/0243712 A1 * | 12/2004 | Sakai | ............... | H04L 41/00 |
| | | | | 709/227 |
| 2010/0153337 A1 * | 6/2010 | Murata | ............... | G06F 9/505 |
| | | | | 707/610 |
| 2010/0265824 A1 * | 10/2010 | Chao | ............... | H04L 12/66 |
| | | | | 370/235 |
| 2011/0154420 A1 | 6/2011 | Korte et al. | | |
| 2013/0125206 A1 * | 5/2013 | Kim | ............... | H04L 67/55 |
| | | | | 726/3 |
| 2013/0282801 A1 * | 10/2013 | Barrett | ............... | H04L 67/02 |
| | | | | 709/219 |
| 2014/0304362 A1 | 10/2014 | Phillips et al. | | |
| 2015/0006615 A1 * | 1/2015 | Wainner | ............... | H04L 67/02 |
| | | | | 709/203 |
| 2015/0215389 A1 * | 7/2015 | Spencer | ............... | H04L 67/1001 |
| | | | | 707/741 |
| 2018/0097682 A1 | 4/2018 | Yoshida et al. | | |
| 2018/0098105 A1 | 4/2018 | Morita et al. | | |
| 2018/0191787 A1 | 7/2018 | Morita et al. | | |
| 2018/0227457 A1 | 8/2018 | Morita et al. | | |
| 2019/0082144 A1 | 3/2019 | Hakata et al. | | |
| 2019/0098211 A1 | 3/2019 | Ohmura et al. | | |
| 2019/0098253 A1 | 3/2019 | Soneda et al. | | |
| 2019/0191198 A1 | 6/2019 | Morita et al. | | |
| 2019/0306004 A1 | 10/2019 | Hakata et al. | | |
| 2019/0306201 A1 | 10/2019 | Ohmura et al. | | |
| 2019/0306421 A1 | 10/2019 | Takeda et al. | | |
| 2019/0306458 A1 | 10/2019 | Soneda et al. | | |
| 2020/0045230 A1 | 2/2020 | Ohmura et al. | | |
| 2020/0045244 A1 | 2/2020 | Ohmura et al. | | |
| 2020/0186407 A1 | 6/2020 | Morita et al. | | |
| 2020/0244510 A1 | 7/2020 | Hakata et al. | | |
| 2020/0260125 A1 * | 8/2020 | Xiong | ............... | H04L 67/101 |
| 2020/0274904 A1 | 8/2020 | Ohmura et al. | | |
| 2020/0296284 A1 | 9/2020 | Aikawa et al. | | |
| 2020/0296302 A1 | 9/2020 | Shiro et al. | | |
| 2020/0382700 A1 | 12/2020 | Takatsu et al. | | |
| 2021/0026589 A1 | 1/2021 | Morita et al. | | |
| 2021/0090211 A1 | 3/2021 | Takeda et al. | | |
| 2021/0099669 A1 | 4/2021 | Shiro et al. | | |
| 2022/0070412 A1 | 3/2022 | Aikawa et al. | | |
| 2022/0094850 A1 | 3/2022 | Morita et al. | | |
| 2022/0103751 A1 | 3/2022 | Annaka et al. | | |
| 2022/0103763 A1 | 3/2022 | Annaka et al. | | |

OTHER PUBLICATIONS

U.S. Appl. No. 17/643,474, filed Dec. 9, 2021, Hiroshi Hinohara, et al.

U.S. Appl. No. 17/692,210, filed Mar. 11, 2022, Kenichiroh Morita, et al.

U.S. Appl. No. 17/831,462, filed Jun. 3, 2022, Hidekuni Annaka, et al.

U.S. Appl. No. 17/841,677, filed Jun. 16, 2022, Mayu Hakata, et al.

* cited by examiner

FIG. 9

| CLIENT IDENTI-FICATION INFORMATION | CLIENT KEY | CLIENT SECRET |
|---|---|---|
| C0001 | AAAAAAA | BBBBBBB |
| C0002 | CCCCCCC | DDDDDDD |
| ... | ... | ... |

FIG. 10

| MEDIA DISTRIBUTION SERVER IDENTIFICA-TION INFORMATION | MAXIMUM RESERVED BANDWIDTH (Mbps) | ADDRESS INFORMATION | STATE |
|---|---|---|---|
| M0091 | 100 | sfu1@example.com | — |
| M0092 | 100 | sfu2@example.com | — |
| ... | ... | ... | ... |

FIG. 11

| CLIENT IDENTIFICATION INFORMATION | ROOM IDENTIFICATION INFORMATION | RESERVED BANDWIDTH (Mbps) | MEDIA DISTRIBUTION SERVER IDENTIFICATION INFORMATION | SITE IDENTIFICATION INFORMATION |
|---|---|---|---|---|
| C0002 | R0002 | 90 | M0091 | B000D, B000E |
| C0002 | R0003 | 50 | M0092 | B000F, B000G |
| ... | ... | ... | ... | ... |

FIG. 12

| KEY NAME | VALUE |
|---|---|
| ROOM IDENTIFICATION INFORMATION | R0001 |
| SITE IDENTIFICATION INFORMATION | B000A |
| ... | ... |

FIG. 14

| CLIENT IDENTI-FICATION INFORMATION | CLIENT KEY | CLIENT SECRET |
|---|---|---|
| C0001 | AAAAAAAA | BBBBBBBB |
| C0002 | CCCCCCCC | DDDDDDDD |
| ... | ... | ... |

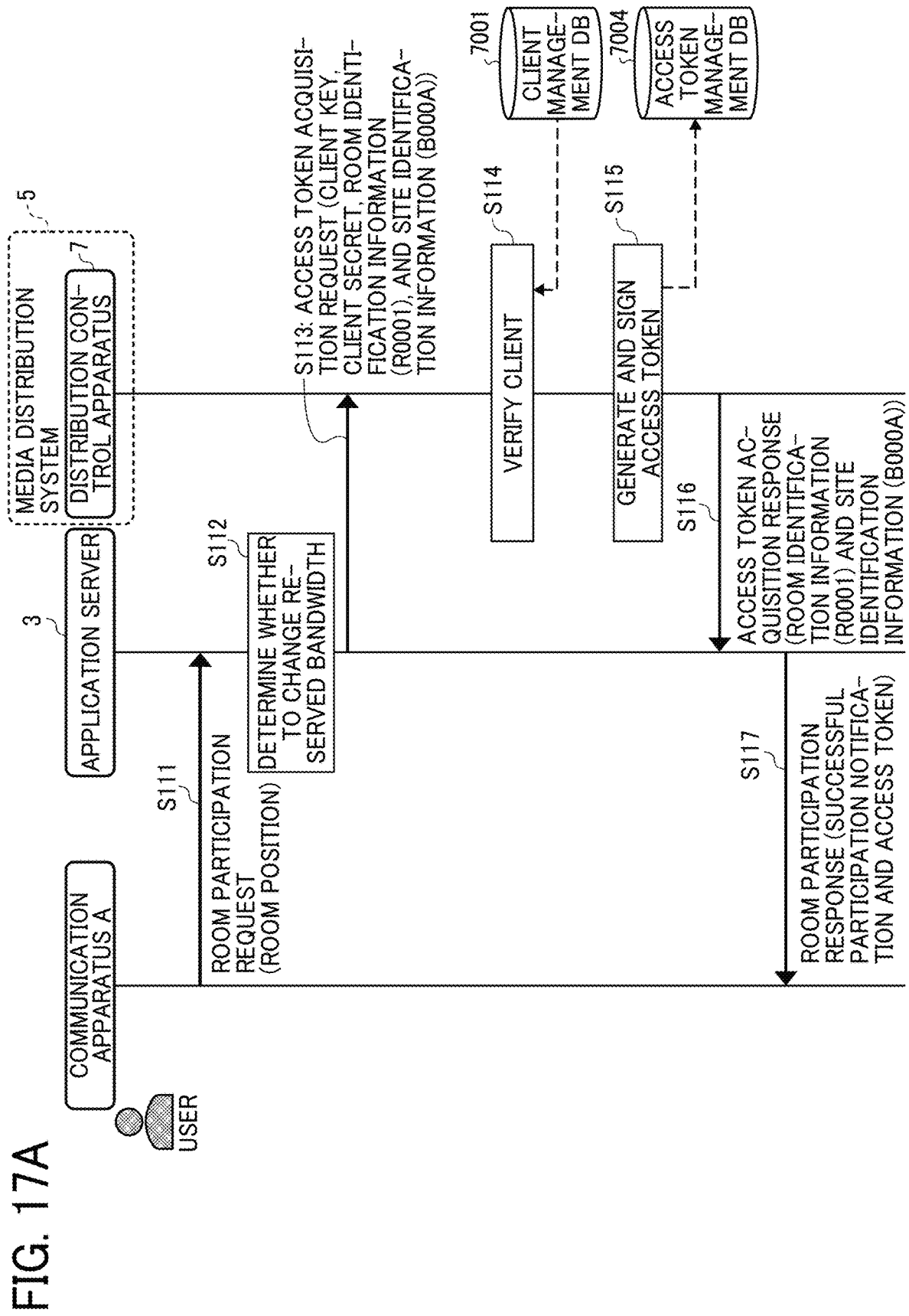

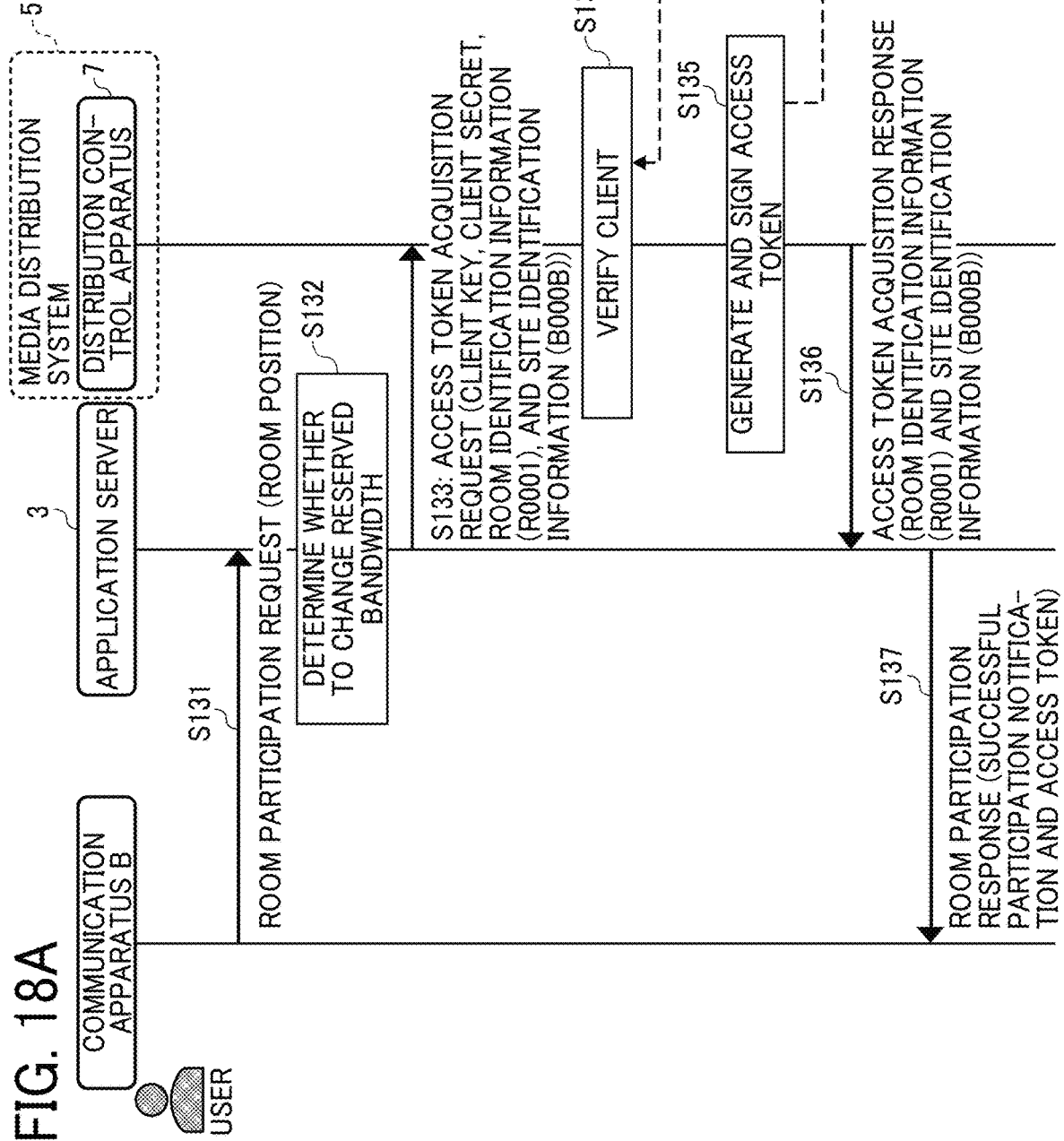

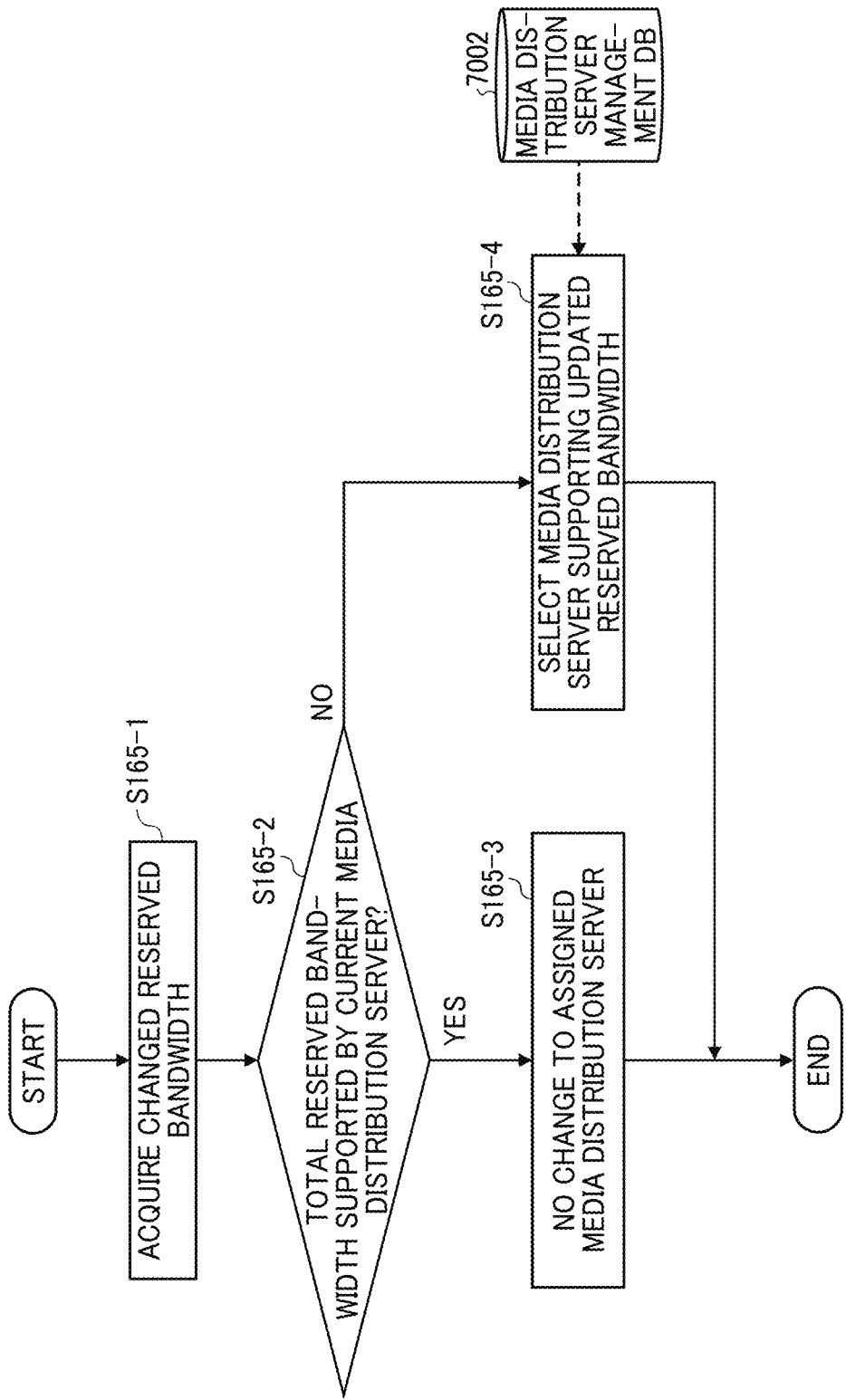

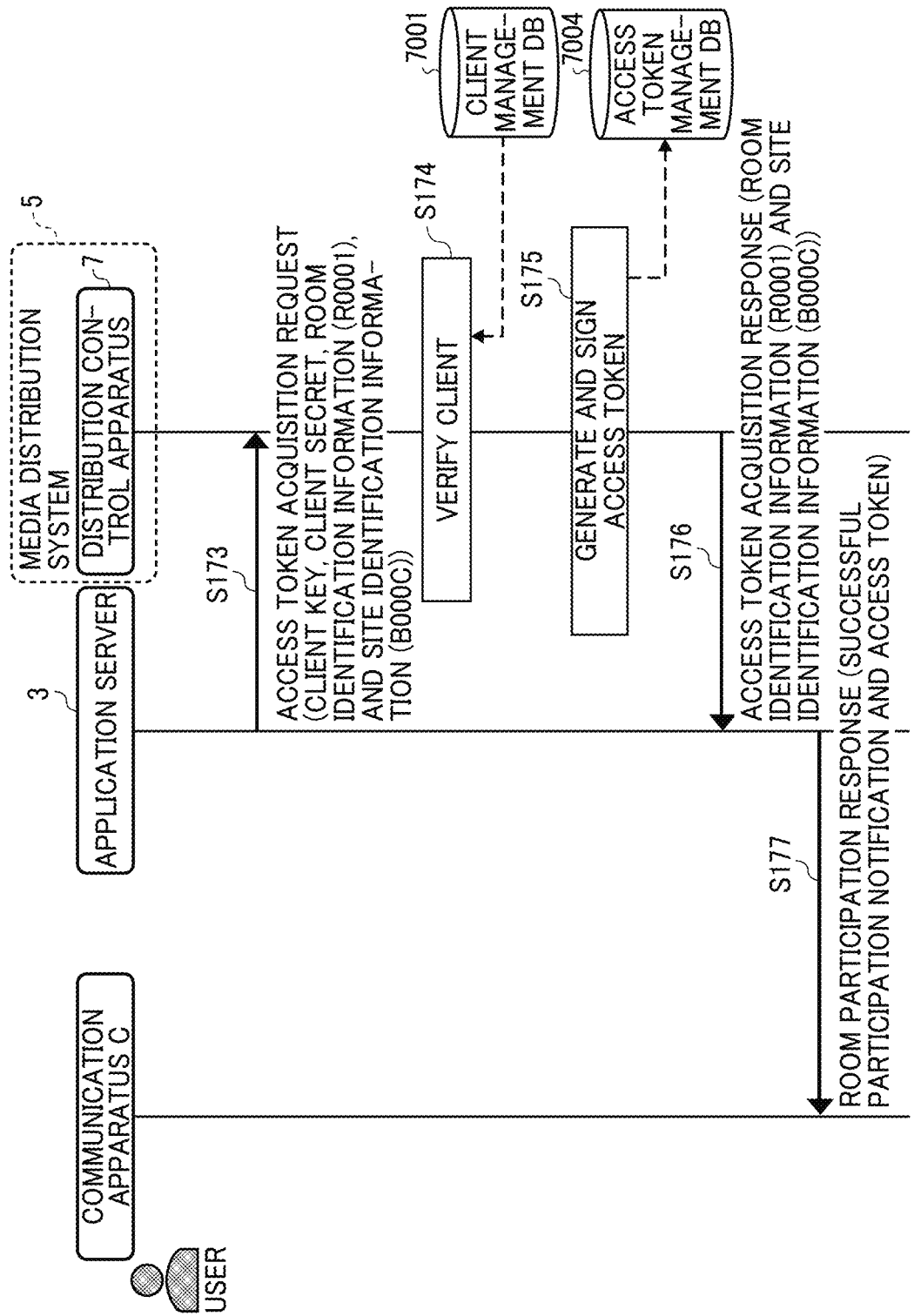

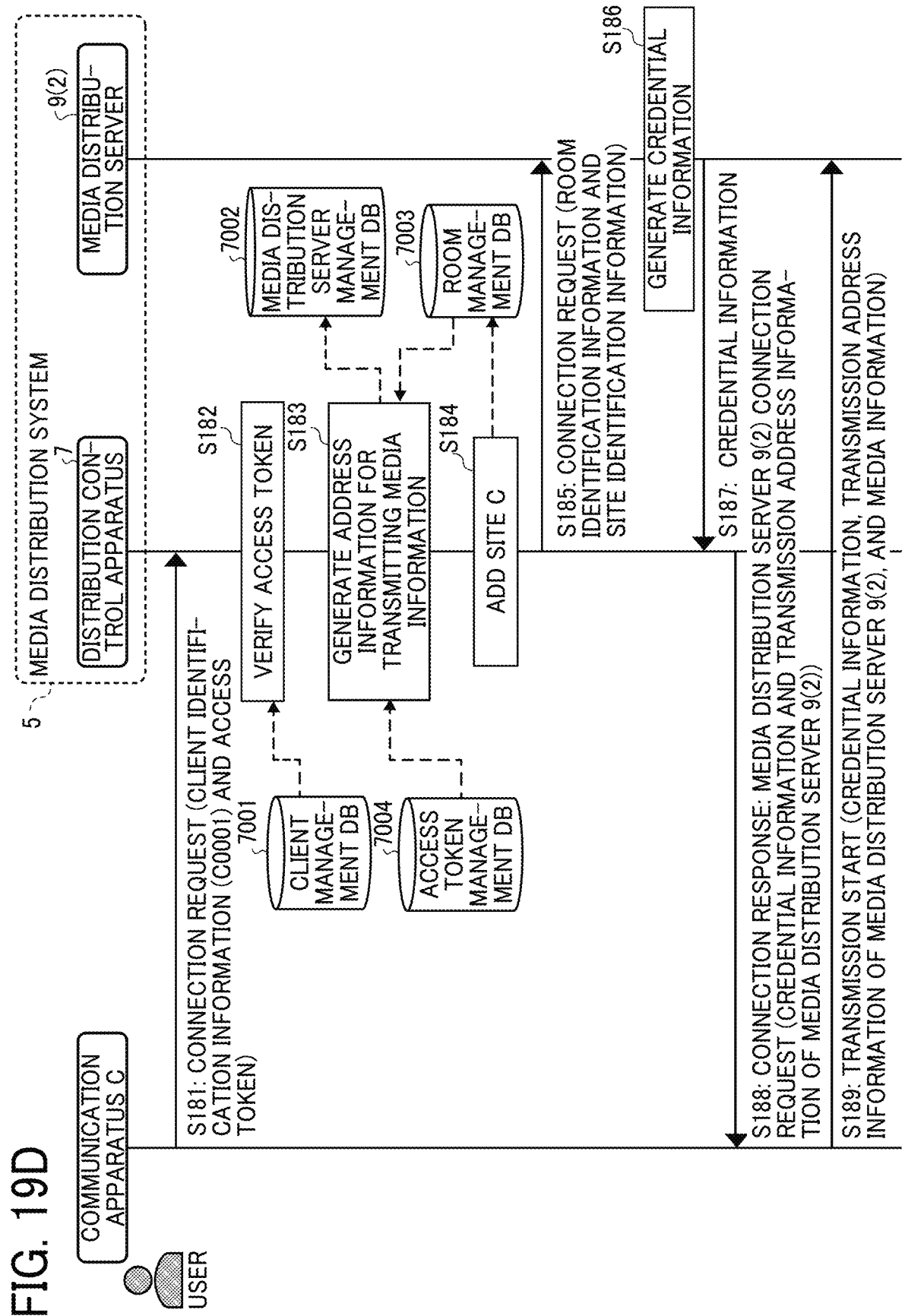

FIG. 23

| CLIENT IDENTIFICATION INFORMATION | ROOM IDENTIFICATION INFORMATION | RESERVED BANDWIDTH (Mbps) | MEDIA DISTRIBUTION SERVER IDENTIFICATION INFORMATION | SITE IDENTIFICATION INFORMATION |
|---|---|---|---|---|
| C0002 | R0002 | 90 | M0091 | B000D, B000E |
| C0002 | R0003 | 90 | M0092 | B000F, B000G |
| ... | ... | ... | ... | ... |

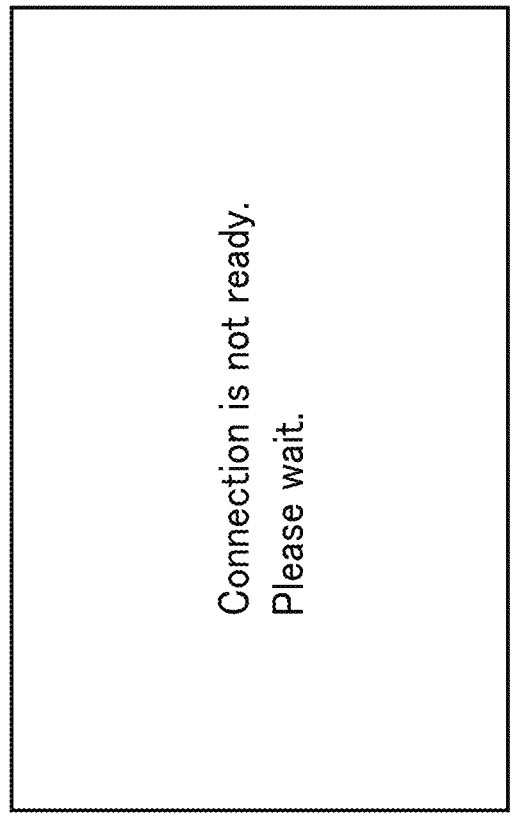

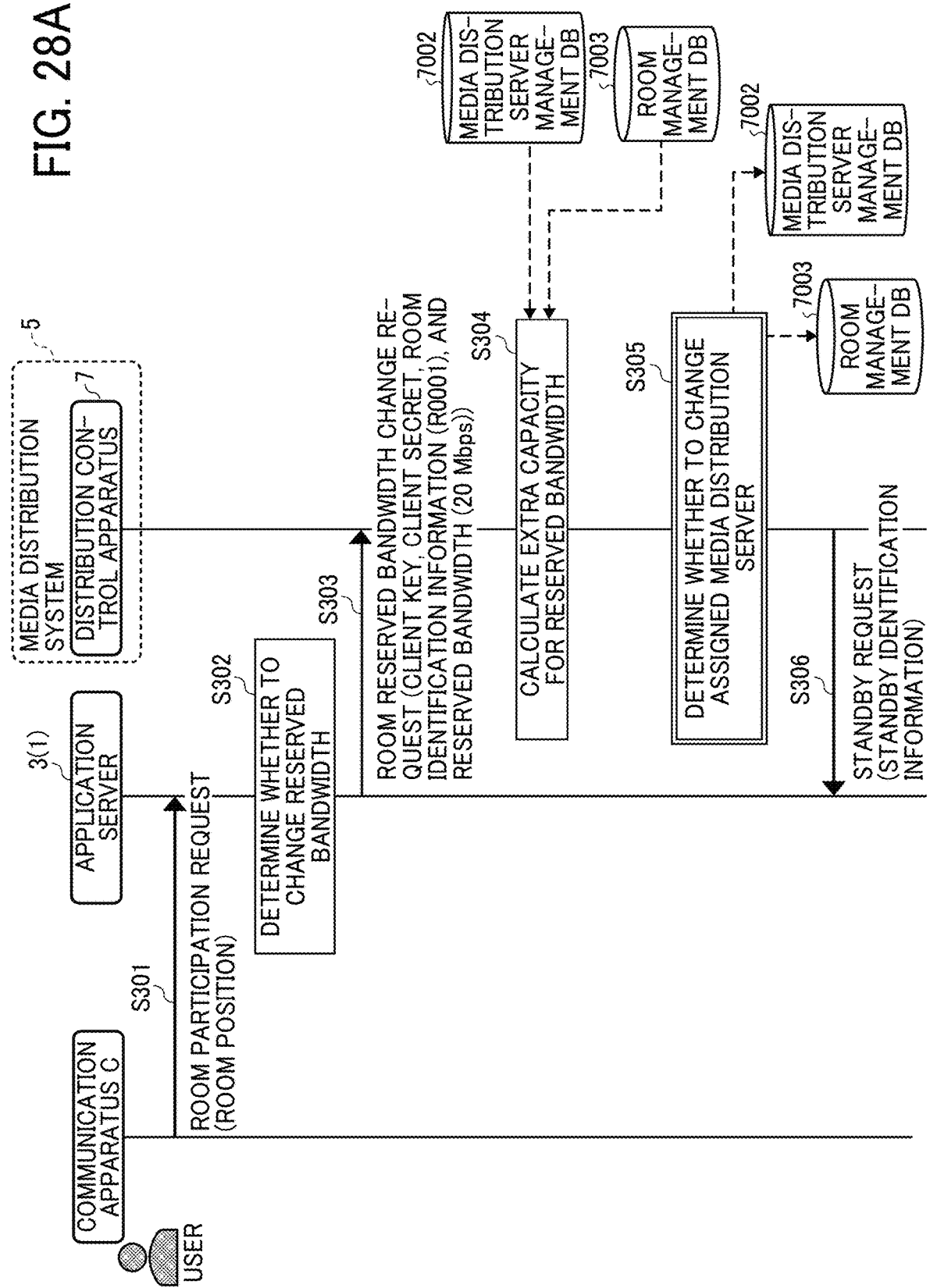

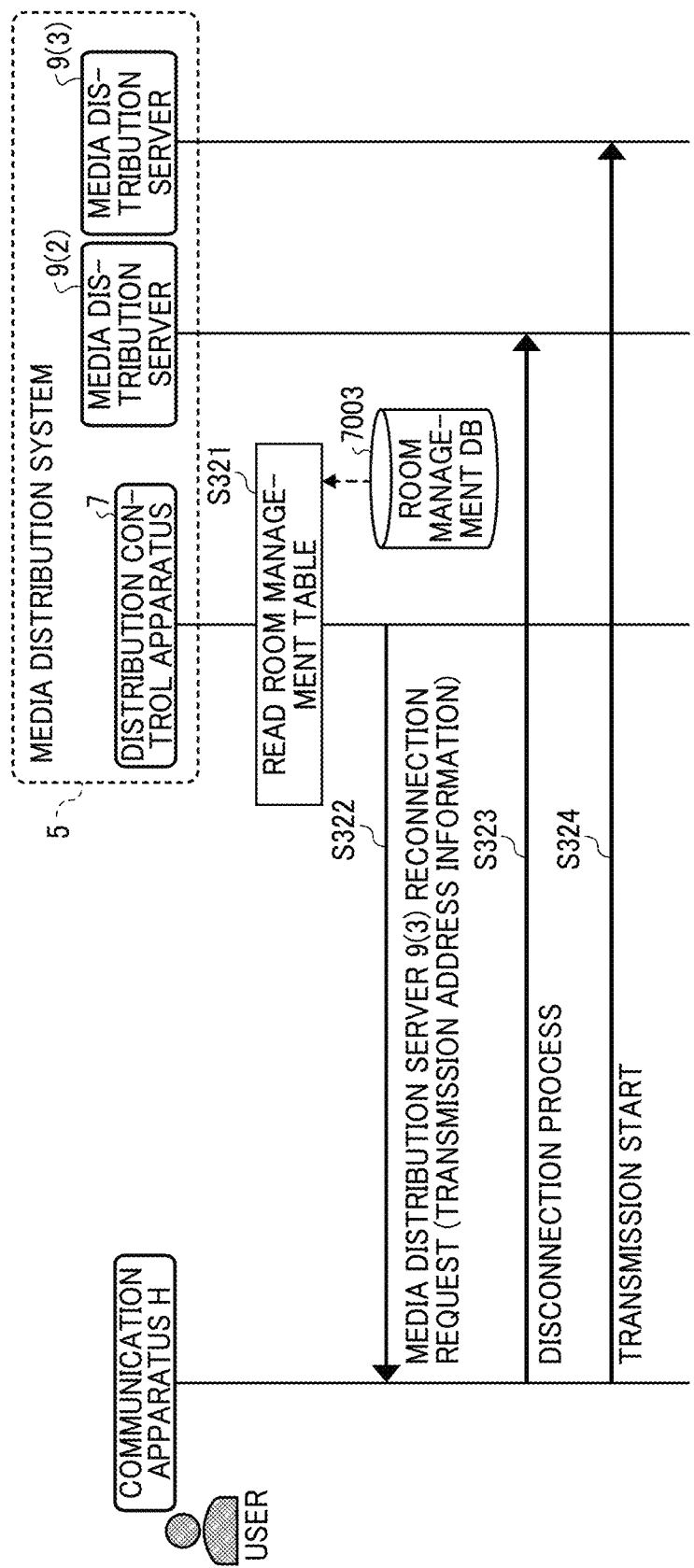

MEDIA DISTRIBUTION SYSTEM, COMMUNICATION SYSTEM, DISTRIBUTION CONTROL APPARATUS, AND DISTRIBUTION CONTROL METHOD

CROSS-REFERENCE TO RELATED APPLICATIONS

This patent application is based on and claims priority pursuant to 35 U.S.C. § 119(a) to Japanese Patent Application No. 2021-157790, filed on Sep. 28, 2021, in the Japan Patent Office, the entire disclosure of which is hereby incorporated by reference herein.

BACKGROUND

Technical Field

The present disclosure relates to a media distribution system, a communication system, a distribution control apparatus, and a distribution control method.

Related Art

Systems for transmitting and receiving media information such as video data and audio data at a plurality of sites in real time are available in the related art.

For example, in a technique for a videoconference system, bandwidths used for reception of videos are assigned such that the bandwidth used for receiving a gaze video at which a user is gazing is greater than the bandwidth used for receiving the other videos.

In the related art, however, the following issue arises in the distribution of media information among a plurality of sites. If a reserved bandwidth used across the sites that share the media information exceeds a predetermined bandwidth, the transmission and reception quality of the media information to be shared is difficult to maintain.

SUMMARY

In one exemplary aspect, a media distribution system includes: one or more media distribution servers that distributes media information to one or more communication apparatuses at one or more sites; and a distribution control apparatus that controls distribution of the media information between the one or more media distribution servers and the one or more communication apparatuses. The distribution control apparatus includes first circuitry that assigns one of the one or more media distribution servers that is selected based on a reserved bandwidth of the media distribution server for distributing the media information and a maximum reserved bandwidth available to the media distribution server, as a media distribution server that distributes the media information to one or more communication apparatuses at a collective site, the collective site including one or more sites that share the same media information. The first circuitry further transmits, in response to a connection request to connect to the assigned distributable media distribution server, transmitted from a particular communication apparatus of the one or more communication apparatuses at a particular site of the collective site, a connection response to the particular communication apparatus at the particular site. The distributable media distribution server includes second circuitry that transmits, in response to the connection request from the distribution control apparatus, the media information transmitted from the particular communication apparatus at the particular site of the collective site, to another communication apparatus at another site different from the particular site of the collective site.

In one exemplary embodiment, a communication system includes: the one or more communication apparatuses at the one or more sites; and the above-described media distribution system.

In one exemplary embodiment, a distribution control apparatus is provided, which controls distribution of media information between one or more communication apparatuses at one or more sites and one or more media distribution servers that distribute the media information to the communication apparatuses at the sites. The distribution control apparatus includes circuitry that assigns one of the one or more media distribution servers that is selected based on a reserved bandwidth of the media distribution server for distributing the media information and a maximum reserved bandwidth available to the media distribution server, as a media distribution server that distributes the media information to one or more communication apparatuses at a collective site, the collective site including one or more sites that share the same media information. The circuitry further transmits, in response to a connection request to connect to the assigned distribution media distribution server, transmitted from a particular communication apparatus of the one or more communication apparatuses at a particular site of the collective site, a connection response to the particular communication apparatus at the particular site.

In one exemplary embodiment, a distribution control method executed by a distribution control apparatus for controlling distribution of media information between one or more communication apparatuses at one or more sites and one or more media distribution servers that distribute the media information to the communication apparatuses at the sites, is provided. The distribution control method includes: assigning one of the one or more media distribution servers that is selected based on a reserved bandwidth of the media distribution server for distributing the media information and a maximum reserved bandwidth available to the media distribution server, as a media distribution server that distributes the media information to one or more communication apparatuses at a collective site, the collective site including one or more sites that share the same media information; and transmitting, in response to a connection request to connect to the assigned distribution media distribution server, transmitted from a particular communication apparatus of the one or more communication apparatuses at a particular site of the collective site, a connection response to the particular communication apparatus at the particular site.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 9 illustrates an example of a client management table according to the first embodiment of the present disclosure;

FIG. 10 illustrates an example of a media distribution server management table according to the first embodiment of the present disclosure;

FIG. 11 illustrates an example of a room management table according to the first embodiment of the present disclosure;

FIG. 12 illustrates an example of an access token management table according to the first embodiment of the present disclosure;

FIG. 14 illustrates an example of a client management table according to the first embodiment of the present disclosure;

FIG. 17A is a sequence diagram illustrating an example of a connection process from site A according to the first embodiment of the present disclosure;

FIG. 18A is a sequence diagram illustrating an example of a connection process from site B according to the first embodiment of the present disclosure;

FIG. 19B is a flowchart illustrating an example of a process for determining whether to change an assigned media distribution server in response to a change to the room reserved bandwidth according to the first embodiment of the present disclosure;

FIG. 19C is a sequence diagram illustrating the example of the connection process from the site C according to the first embodiment of the present disclosure;

FIG. 19D is a sequence diagram illustrating the example of the connection process from the site C according to the first embodiment of the present disclosure;

FIG. 23 illustrates an example of a room management table according to a second embodiment of the present disclosure;

FIG. 24D is a view of an example standby screen displayed at the site C according to the second embodiment of the present disclosure;

FIG. 28A is a sequence diagram illustrating an example of a connection process from the site C according to the third embodiment of the present disclosure;

FIG. 29 is a sequence diagram illustrating an example of a reconnection process for site H according to the third embodiment of the present disclosure;

Figure 1:
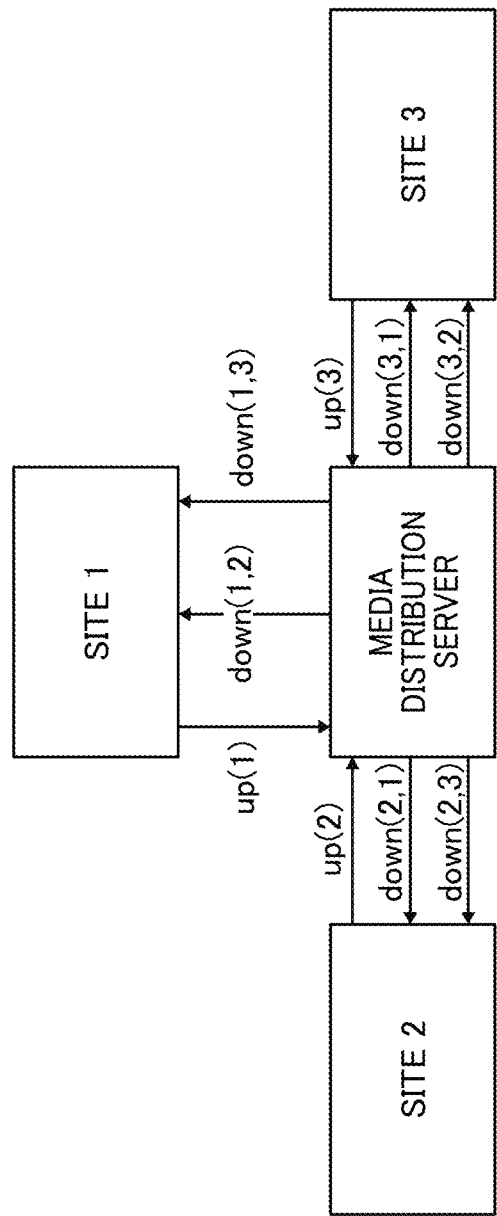
FIG. 1 is a diagram illustrating an example relationship between reserved bandwidths and dynamic media control at a plurality of sites according to one or more embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, one or more embodiments of the present disclosure will be described with reference to the drawings. In the description of the drawings, substantially the same elements are denoted by the same reference numerals, and any redundant descriptions thereof will be omitted.

First Embodiment

A first embodiment will be described with reference to FIGS. 1 to 22C.
Technique for Media Information Distribution
Relationship Between Dynamic Media Control and Reserved Bandwidths FIG. 1 is a diagram illustrating an example relationship between reserved bandwidths and dynamic media control at a plurality of sites. As illustrated in FIG. 1, in one example, a media distribution server receives media information from sites 1, 2, and 3 and distributes the received media information to the sites 1, 2, and 3. When the sites 1, 2, and 3 are allocated a room reserved bandwidth BR of a "room" described below, the media distribution server controls an uplink bandwidth up(i) for site i and a downlink bandwidth down(i, j) for site j, which is used for media information of the site j, such that Expression (1) below is satisfied for the uplink bandwidth up(i) and the downlink bandwidth down(i, j).

$$BR \geq \Sigma up(i) + \Sigma down(i,j) \qquad (1)$$

In a system including a plurality of media distribution servers, a media distribution server supporting the designated room reserved bandwidth BR is selected and assigned to the room.

At this time, the following control methods are available. In transmission control, for example, a control method includes:

setting a maximum bit rate and a priority ("high" or "normal") for each site;

assigning, to a site having the priority "high", the maximum bit rate of the site; and assigning a remaining band to a site having the priority "normal".

In reception control, for example, a control method includes:

setting whether each site is to receive the media information of the partner site;

stopping the transmission of media information from a site for which the media information is not to be received by any of the sites; and assigning an available band (bandwidth) generated by stopping the transmission and reception of the media information to the transmission of information from each site.

Dynamic Change of Room Reserved Bandwidth

A use case in which the number of participant sites is difficult to predict in advance is provided with means for dynamically changing the room reserved bandwidth. Examples of the means for changing the room reserved bandwidth include:

means for providing an application program interface (API) to directly set a room reserved bandwidth; and means for setting a mode for automatically adjusting the room reserved bandwidth in accordance with the number of participant sites. In the automatic adjustment mode, for example, the room reserved bandwidth can be determined using Expression (2) below for the number of sites N, the transmission bit rate send(p, i) for the site i having the priority p, and the constant B.

$$\Sigma(send(high,i)*N) + B \qquad (2)$$

The method for determining a reserved bandwidth described above is a mode in which a bandwidth for transmitting and receiving media information at a site having the priority "high" is ensured and the total of the transmission and reception bandwidths for sites having the priority "normal" is specified by the constant B such that the bandwidth decreases with the increase in the number of sites.

Concept of Rooms

Figure 2:
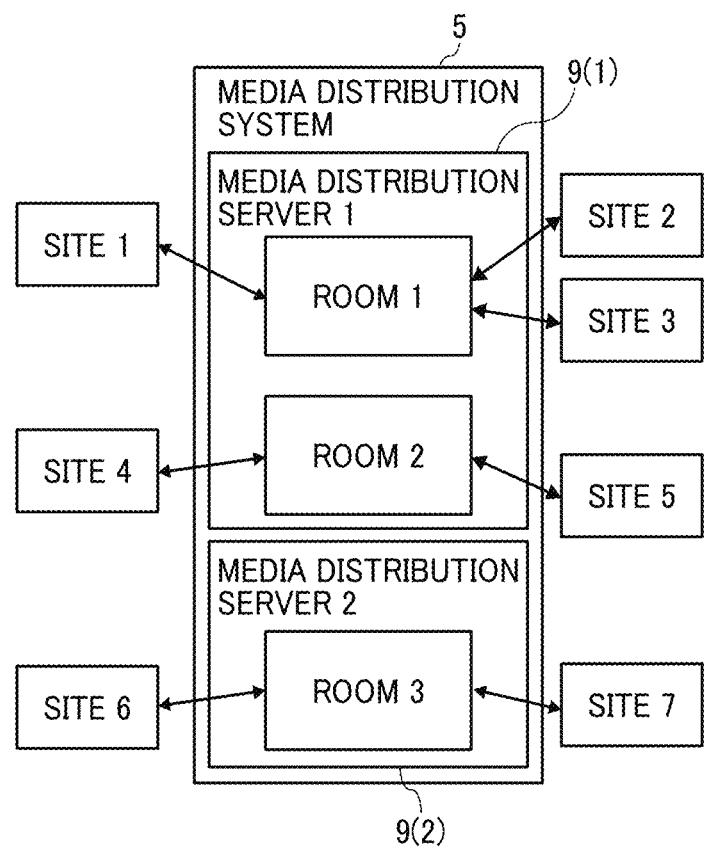
FIG. 2 is a diagram illustrating an example of the concept of rooms according to one or more embodiments of the present disclosure.

FIG. 2 is a diagram illustrating an example of the concept of rooms. Each room is a set of one or more sites that mutually distribute media information. A media distribution system 5 illustrated in FIG. 2 is a system that provides a media distribution function to an application server 3 described below. The media distribution system 5 includes a distribution control apparatus 7 described below, and one or more media distribution servers 9 including media distribution servers 9(1) and 9(2).

Each of the media distribution servers 9 includes one or more rooms. For example, the media distribution server 9(1)

includes room 1 and room 2. For example, the media distribution server 9(2) includes room 3. The room 1 is connected to sites 1, 2, and 3, and the sites 1, 2, and 3 share media information. The room 2 is connected to sites 4 and 5, and the sites 4 and 5 share media information. The room 3 is connected to sites 6 and 7, and the sites 6 and 7 share predetermined media information. In each of the rooms 1, 2, and 3, the media information to be shared across the corresponding sites is mutually distributed over a reserved bandwidth within the maximum bandwidth supported by the corresponding one of the media distribution servers 9 that distributes the media information to the room.

General Arrangement of Communication System

Example System Configuration

Figure 3:
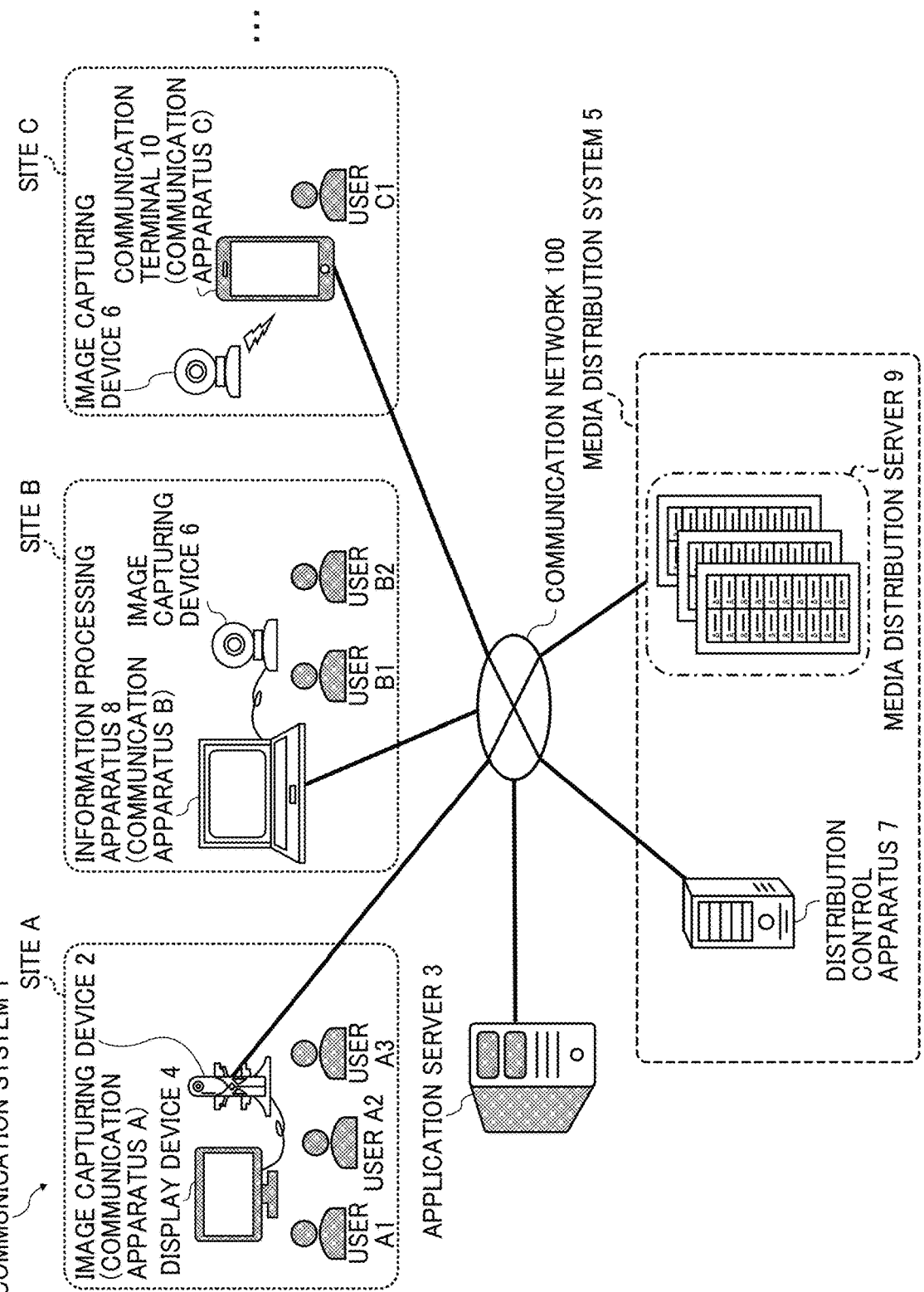
FIG. 3 is a diagram illustrating an example general arrangement of a communication system according to a first embodiment of the present disclosure.

FIG. 3 is a diagram illustrating an example general arrangement of a communication system. As illustrated in FIG. 3, a communication system 1 includes one or more sites A, B, and C, the application server 3, and the media distribution system 5. The sites A, B, and C, the application server 3, and the media distribution system 5 are connected to each other via a communication network 100. An image capturing device 2 and a display device 4 are arranged at the site A. The image capturing device 2 is an example of a communication apparatus. The display device 4 displays an image (video) captured by the image capturing device 2 and reproduces collected audio obtained by the image capturing device 2. An image capturing device 6 and an information processing apparatus 8 are arranged at the site B. The information processing apparatus 8 displays an image (video) captured by the image capturing device 6 and reproduces collected audio obtained by the image capturing device 6. The information processing apparatus 8 functions as an example of a communication apparatus. An image capturing device 6 and a communication terminal 10 are arranged at the site C. The communication terminal 10 displays an image (video) captured by the image capturing device 6 and reproduces collected audio obtained by the image capturing device 6. As used herein, the term "site" refers to a place where each application provided by the application server 3 is used. At each site, an environment is provided for a user to use a browser and various applications. The communication terminal 10 functions as an example of a communication apparatus.

The media distribution system 5 includes the distribution control apparatus 7 and the one or more media distribution servers 9. The distribution control apparatus 7 controls information on sites to control the establishment of communication for media information. Each of the one or more media distribution servers 9 receives media information from each site and distributes the received media information to the associated site(s).

The communication network 100 provides communication for an unspecified number of users, and examples of the communication network 100 include the Internet, an intranet, and a local area network (LAN). The communication network 100 may include a communication network based on wired communication or wireless communication such as 3rd Generation (3G), 4th Generation (4G), 5th Generation (5G), Worldwide Interoperability for Microwave Access (WiMAX), and Long Term Evolution (LTE).

Image Capturing Device

The image capturing device 2 is, for example, a special digital camera configured to capture an image of an object such as a user who uses the site A or surroundings such as scenery to obtain two hemispherical images, from which a spherical panoramic image is generated. The image capturing device 2 is capable of communicating with the application server 3 and the one or more media distribution servers 9 via the communication network 100. As described above, the image capturing device 2 transmits a captured image (video) and collected audio to the display device 4 to display the image (video) and reproduce the audio.

Display Device

The display device 4 is, for example, a device that displays an image (video) transmitted from the image capturing device 2 and reproduces audio transmitted from the image capturing device 2. The display device 4 is a typical display terminal.

Image Capturing Device

The image capturing device 6 is, for example, a typical digital camera configured to capture an image of an object such as a user who uses the site B or C or surroundings such as scenery to obtain a typical planar image. As described above, the image capturing device 6 transmits a captured image (video) and collected audio to the information processing apparatus 8 or the communication terminal 10 to display the image (video) and reproduce the audio.

Information Processing Apparatus

The information processing apparatus 8 is implemented by a computer system including a typical operating system (OS) or the like and configured to perform communication. The information processing apparatus 8 is capable of communicating with the application server 3 and the one or more media distribution servers 9 via the communication network 100.

The information processing apparatus 8 has installed therein, for example, a browser application for communicating with the media distribution system 5 and a screen display application for displaying a screen such as a conference screen in media information transmitted from the one or more media distribution servers 9.

The information processing apparatus 8 may be a general-purpose communication terminal having a communication function, such as a personal computer (PC), a portable notebook PC, a mobile phone, a smartphone, a tablet terminal, or a wearable terminal of a suitable type such as a sunglass type or a wristwatch type. Alternatively, the information processing apparatus 8 may be a communication apparatus or a communication terminal capable of operating software such as browser software.

Communication Terminal

The communication terminal 10 is implemented by one or more information processing apparatuses (computer systems) each including a typical OS or the like and configured to perform communication. The communication terminal 10 is capable of communicating with the application server 3 and the one or more media distribution servers 9 via the communication network 100.

The communication terminal 10 has installed therein, for example, a browser application for communicating with the media distribution system 5 and a screen display application for displaying a screen such as a conference screen in media information transmitted from the one or more media distribution servers 9.

The communication terminal 10 may be a general-purpose communication terminal having a communication function, such as a PC, a portable notebook PC, a mobile phone, a smartphone, a tablet terminal, or a wearable terminal of a suitable type such as a sunglass type or a wristwatch type. Alternatively, the communication terminal 10 may be a communication apparatus or a communication terminal capable of operating software such as browser software.

Application Server

The application server 3 is implemented by an information processing apparatus (computer system) including a typical server OS or the like. The application server 3 is a server that implements an application for distributing media information using the communication system 1. The application server 3 holds a client secret issued for each application. In response to various requests such as a room generation request, an access token acquisition request, a room reserved bandwidth change request, and a standby state inquiry, the application server 3 adds the client secret to various request information and transmits the request information to the distribution control apparatus 7. The access token acquisition request is a request generated based on a room participation request transmitted from a communication apparatus used at each site (or arranged at each site). The room reserved bandwidth change request is a request generated based on a room participation request transmitted from a communication apparatus used at each site (or arranged at each site). The standby state inquiry is a query transmitted from a communication apparatus used at each site (or arranged at each site) and transferred to the distribution control apparatus 7. As described above, the application server 3 also functions as an intermediary device that intermediates between a communication apparatus used at each site (or arranged at each site) and the distribution control apparatus 7.

The application server 3 may be implemented by a single computer or a plurality of computers, each of which is assigned a component (function or means) such as a storage as appropriate. All or some of the functions of the application server 3 may be implemented by a server computer residing on a cloud network or a server computer residing on an on-premise network.

Distribution Control Apparatus

The distribution control apparatus 7 is implemented by one or more information processing apparatuses (computer systems) each including a typical server OS or the like. As described above, the distribution control apparatus 7 controls information on sites to control the establishment of communication for media information. Further, the distribution control apparatus 7 distributes connection control information to each site to receive the media information of the partner site, and controls transmission and reception of the media information between the sites. Further, the distribution control apparatus 7 determines a media distribution server to which each room is to be assigned among the one or more media distribution servers 9, based on the room reserved bandwidth set by the application server 3 and the use of the bands by the one or more media distribution servers 9.

The distribution control apparatus 7 may be implemented by a single computer or a plurality of computers, each of which is assigned a component (function or means) such as a storage as appropriate. All or some of the functions of the distribution control apparatus 7 may be implemented by a server computer residing on a cloud network or a server computer residing on an on-premise network.

Media Distribution Server

The one or more media distribution servers 9 are each implemented by one or more information processing apparatuses (computer systems) each including a typical server OS or the like. The one or more media distribution servers 9 are each a server for receiving media information from each site and distributing the received media information to the associated sites. Since the maximum bandwidth available for each of the one or more media distribution servers 9 to perform transmission and reception is determined in accordance with the performance, each of the one or more media distribution servers 9 distributes the media information in that range. In one example, the media distribution system 5 includes a plurality of media distribution servers 9, which are scaled out as appropriate.

Each of the one or more media distribution servers 9 may be implemented by a single computer or a plurality of computers, each of which is assigned a component (function or means) such as a storage as appropriate. All or some of the functions of each of the one or more media distribution servers 9 may be implemented by a server computer residing on a cloud network or a server computer residing on an on-premise network.

In this embodiment, the term "media information" refers to information to be transmitted and received between or among sites using the one or more media distribution servers 9 as media, that is, via the one or more media distribution servers 9. The information includes information related to an image (video) and information related to a voice (audio). More specifically, the media information includes information such as image (video) data, audio data, text data such as a chat, and a shared file. In this embodiment, in one example, the media information includes an image (video) based on image (video) data including a person, a space, and the like at each site.

Hardware Configuration

Next, the hardware configuration of apparatuses, devices, or terminals of a communication system according to an embodiment will be described with reference to FIGS. 4 to 7. In the hardware configuration of the apparatuses, devices, or terminals illustrated in FIGS. 4 to 7, certain hardware elements may be added or deleted as appropriate.

Hardware Configuration of Image Capturing Device

Figure 4:
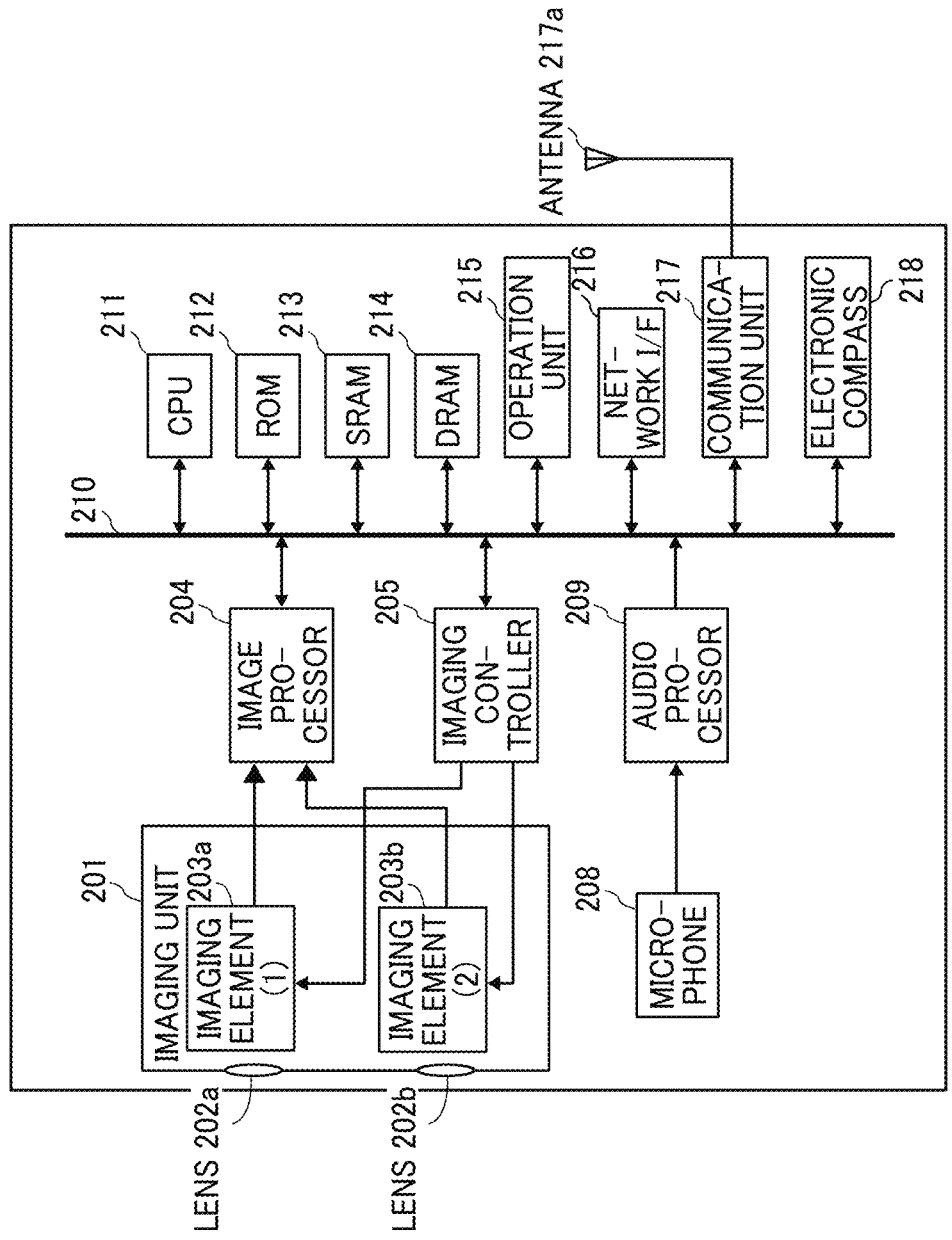
FIG. 4 is a diagram illustrating an example hardware configuration of an image capturing device according to the first embodiment of the present disclosure.

First, the hardware configuration of the image capturing device 2 will be described with reference to FIG. 4. FIG. 4 is a diagram illustrating an example hardware configuration of the image capturing device 2. In the following description, the image capturing device 2 is a spherical (omnidirectional) image capturing device having two imaging elements. Alternatively, the image capturing device 2 may have two or more imaging elements. In one example, the image capturing device 2 is not dedicated to omnidirectional image capturing, and an external omnidirectional image capturing unit is attached to a general-purpose digital camera or a smartphone to implement an image capturing device having substantially the same functions as those of the image capturing device 2.

As illustrated in FIG. 4, the image capturing device 2 includes, for example, an imaging unit 201, an image processor 204, an imaging controller 205, a microphone 208, an audio processor 209, a central processing unit (CPU) 211, a read only memory (ROM) 212, a static random access memory (SRAM) 213, a dynamic random access memory (DRAM) 214, an operation unit 215, a network interface (I/F) 216, a communication unit 217, an antenna 217a, and an electronic compass 218.

The imaging unit 201 includes wide-angle lenses (so-called fish-eye lenses) 202a and 202b each having an angle of view of 180 degrees or more to form a hemispherical image. The imaging unit 201 further includes two imaging elements 203a and 203b corresponding to the wide-angle lenses 202a and 202b, respectively. Each of the imaging elements 203a and 203b includes an image sensor such as a complementary metal oxide semiconductor (CMOS) sensor and a charge-coupled device (CCD) sensor, a timing generation circuit, and a group of registers. The image sensor converts an optical image formed by the fish-eye lenses 202a and 202b into electric signals and outputs image data. The timing generation circuit generates horizontal or vertical synchronization signals, pixel clocks, and the like for the image sensor. Various commands, parameters, and the like for operations of the imaging elements 203a and 203b are set in the group of registers.

Each of the imaging elements 203a and 203b of the imaging unit 201 is connected to the image processor 204 via a parallel I/F bus. Each of the imaging elements 203a and 203b of the imaging unit 201 is also connected to the imaging controller 205 through a serial I/F bus such as an inter-integrated circuit (I2C) bus. The image processor 204 and the imaging controller 205 are connected to the CPU 211 through a bus 210. The ROM 212, the SRAM 213, the DRAM 214, the operation unit 215, the network I/F 216, the communication unit 217, and the electronic compass 218, for example, are also connected to the bus 210.

The image processor 204 obtains image data from each of the imaging elements 203a and 203b through the parallel I/F bus, combines the image data obtained from the imaging element 203a and the image data obtained from the imaging element 203b after performing predetermined processing, and generates data representing a Mercator image.

The imaging controller 205 usually functions as a master device while the imaging elements 203a and 203b each usually functions as a slave device. The imaging controller 205 sets commands and the like in the group of registers of each of the imaging elements 203a and 203b via the I2C bus. The imaging controller 205 receives various commands from the CPU 211. Further, the imaging controller 205 obtains status data of the group of registers of each of the imaging elements 203a and 203b via the I2C bus, and sends the obtained status data to the CPU 211.

The imaging controller 205 instructs the imaging elements 203a and 203b to output the image data at a time when the shutter button of the operation unit 215 is pressed. In one example, the image capturing device 2 has a function of displaying a preview image on a display (e.g., the display device 4), a function of displaying a moving image, or the like. In the case of displaying a moving image, the imaging elements 203a and 203b continuously output image data at a predetermined frame rate (frames per minute).

The imaging controller 205 also functions as a synchronization controller configured to operate in cooperation with the CPU 211 to synchronize the time when the imaging element 203a outputs image data and the time when the imaging element 203b outputs the image data. It should be noted that, although the image capturing device 2 does not include a display in this embodiment, the image capturing device 2 may include a display.

The microphone 208 converts sounds such as speech into audio data (signals). The audio processor 209 obtains audio data output from the microphone 208 via an I/F bus and performs predetermined processing on the audio data.

The CPU 211 controls the overall operation of the image capturing device 2 and performs processing. The ROM 212 stores various programs for the CPU 211. Each of the SRAM 213 and the DRAM 214 operates as a work memory to store programs for execution by the CPU 211 or data in current processing. More specifically, in one example, the DRAM 214 stores image data currently processed by the image processor 204 and data of the Mercator image on which processing has been performed.

The operation unit 215 collectively refers to various operation keys, a power switch, a shutter button, and a touch panel having functions of both displaying information and receiving input from a user, which may be used in combination. The user operates the operation keys to input various image capturing modes or image capturing conditions.

The network I/F 216 collectively refers to an interface circuit such as a Universal Serial Bus (USB) I/F that enables the image capturing device 2 to communicate with an external medium such as a secure digital (SD) card or an external personal computer. The network I/F 216 supports at least one of wired communication and wireless communication. The data of the Mercator image, which is stored in the DRAM 214, is stored in the external medium via the network I/F 216 or transmitted to an external device via the network I/F 216, as desired.

The communication unit 217 communicates with an external device such as a video conference terminal via the antenna 217a of the image capturing device 2 using short-range wireless communication technology such as near-field communication (NFC), Bluetooth®, or Wi-Fi®. The communication unit 217 may transmit the data of the Mercator image to the external device.

The electronic compass 218 computes an orientation and a tilt (roll angle) of the image capturing device 2 based on the Earth magnetism and outputs orientation and tilt information. The orientation and tilt information is an example of related information, which is metadata described in compliance with Exif. The orientation and tilt information is used for performing image processing, such as image correction, on a captured image. The related information includes data indicating a time (date) when the image was captured by the image capturing device 2, and data indicating a size of image data (an amount of image data), for example.

Figure 5:
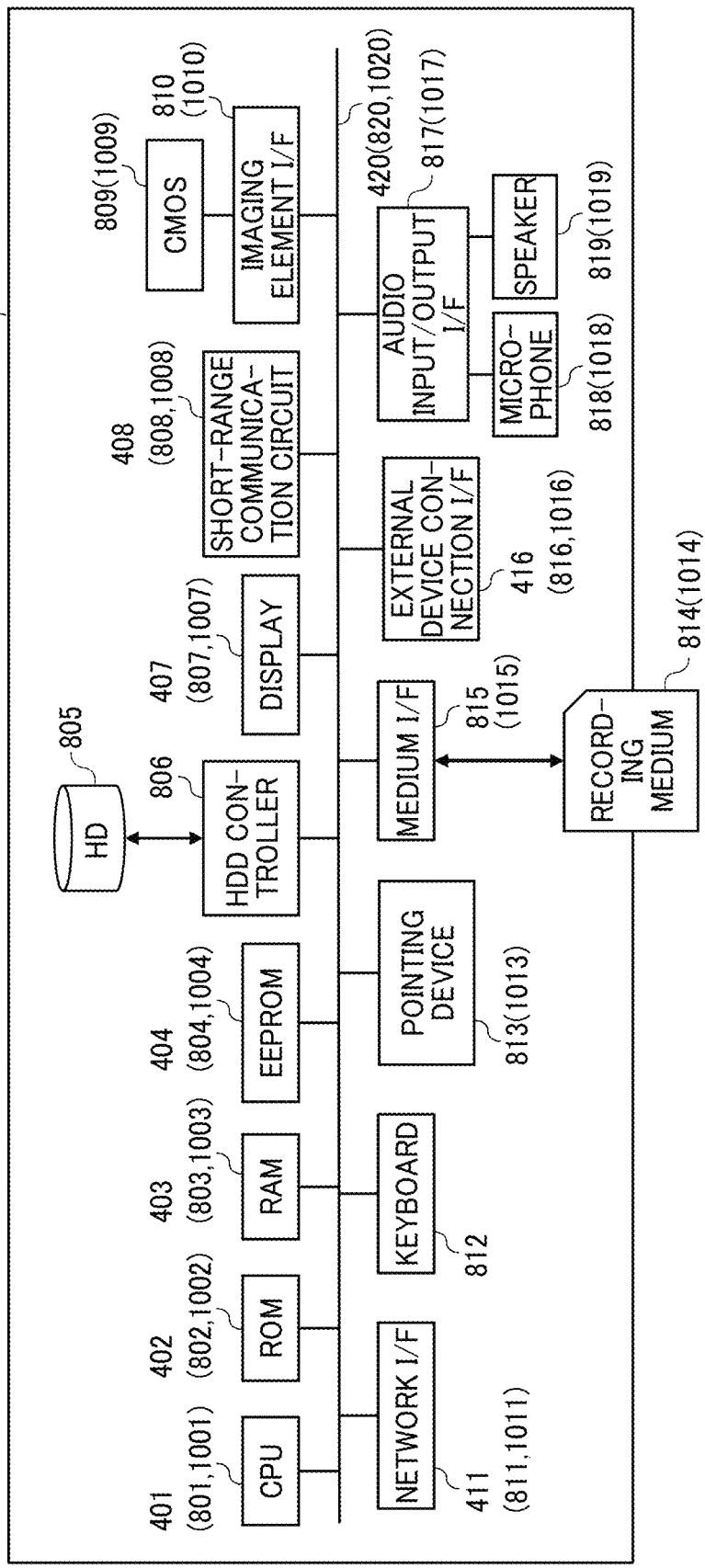
FIG. 5 is a diagram illustrating an example hardware configuration of a display device, an information processing apparatus, and a communication terminal according to the first embodiment of the present disclosure.

Hardware Configuration of Display Device, Information Processing Apparatus, and Communication Terminal Next, the hardware configuration of the display device 4, the information processing apparatus 8, and the communication terminal 10 will be described with reference to FIG. 5. FIG. 5 is a diagram illustrating an example hardware configuration of the display device 4, the information processing apparatus 8, and the communication terminal 10. As illustrated in FIG. 5, the display device 4 is implemented by, for example, a computer. The display device 4 includes, for example, a CPU 401, a ROM 402, a RAM 403, an electrically erasable programmable ROM (EEPROM) 404, a display 407, a short-range communication circuit 408, a network I/F 411, an external device connection I/F 416, and a bus line 420.

The CPU 401 controls the overall operation of the display device 4. The ROM 402 stores a program used for processing of the CPU 401. The RAM 403 is used as a work area for the CPU 401. The EEPROM 404 reads or writes various data such as an application under the control of the CPU 401. The display 407 is an example of a display means for displaying an image of an object, characters, various icons, etc. Examples of the display 407 include a liquid crystal display (LCD) and an organic electroluminescence (EL) display. The short-range communication circuit 408 is a communication circuit for performing short-range wireless communication with a communication apparatus or a communication terminal including a wireless communication interface. Examples of the short-range wireless communication include NFC communication, Bluetooth® communication, millimeter-wave wireless communication, Wi-Fi® communication, QR Code® communication, visible light communication, environmental sound communication, and ultrasonic wave communication.

The network I/F 411 is a communication interface for performing various data (information) communication with another device via the communication network 100. The external device connection I/F 416 is an interface for connecting to various external devices. Examples of the external device include a USB memory. The bus line 420 is an address bus, a data bus, or the like for electrically connecting the components such as the CPU 401 to one another.

As illustrated in FIG. 5, the information processing apparatus 8 is implemented by, for example, a computer. The information processing apparatus 8 includes, for example, a CPU 801, a ROM 802, a RAM 803, an EEPROM 804, a hard disk (HD) 805, a hard disk drive (HDD) controller 806, a display 807, a short-range communication circuit 808, a CMOS sensor 809, an imaging element I/F 810, a network I/F 811, a keyboard 812, a pointing device 813, a medium I/F 815, an external device connection I/F 816, an audio input/output I/F 817, a microphone 818, a speaker 819, and a bus line 820. The CPU 801, the ROM 802, the RAM 803, the EEPROM 804, the display 807, the short-range communication circuit 808, the network I/F 811, and the external device connection I/F 816 are similar to the corresponding hardware resources of the display device 4, namely, the CPU 401, the ROM 402, the RAM 403, the EEPROM 404, the display 407, the short-range communication circuit 408, the network I/F 411, and the external device connection I/F 416, and will not be described herein.

The HD 805 stores various data such as a program. The HDD controller 806 controls reading or writing of various data from or to the HD 805 under the control of the CPU 801. The CMOS sensor 809 is an example of a built-in imaging means for capturing an image of an object under the control of the CPU 801 to obtain image data or video data. In alternative to the CMOS sensor 809, any other imaging means such as a CCD sensor may be used. The imaging element I/F 810 is a circuit that controls driving of the CMOS sensor 809. The keyboard 812 is an example of an input unit having a plurality of keys for entering characters, numerical values, or various instructions, for example. The pointing device 813 is an example of an input unit that allows the user to select or execute various instructions, select a target for processing, or move a cursor being displayed. The medium I/F 815 controls reading or writing (storing) of data from or to a recording medium 814 such as a flash memory. The audio input/output I/F 817 is a circuit that processes input and output of an audio signal between the microphone 818 and the speaker 819 under the control of the CPU 801. The microphone 818 is a built-in circuit that converts sounds into electric signals. The microphone 818 acquires voice and sound waves emitted from an external speaker or the like and acquires information using electrical signals. The speaker 819 is a built-in circuit that converts an electric signal into physical vibration to generate sound such as music or voice.

As illustrated in FIG. 5, the communication terminal 10 is implemented by, for example, a computer. The communication terminal 10 includes, for example, a CPU 1001, a ROM 1002, a RAM 1003, an EEPROM 1004, a display 1007, a short-range communication circuit 1008, a CMOS sensor 1009, an imaging element I/F 1010, a network I/F 1011, a pointing device 1013, a medium I/F 1015, an external device connection I/F 1016, an audio input/output I/F 1017, a microphone 1018, a speaker 1019, and a bus line 1020. The CPU 1001, the ROM 1002, the RAM 1003, the EEPROM 1004, the display 1007, the short-range communication circuit 1008, the network I/F 1011, and the external device connection I/F 1016 are similar to the corresponding hardware resources of the display device 4, namely, the CPU 401, the ROM 402, the RAM 403, the EEPROM 404, the display 407, the short-range communication circuit 408, the network I/F 411, and the external device connection I/F 416, and will not be described herein. The CMOS sensor 1009, the imaging element I/F 1010, the pointing device 1013, the medium I/F 1015, the audio input/output I/F 1017, the microphone 1018, and the speaker 1019 are similar to the corresponding hardware resources of the information processing apparatus 8, namely, the CMOS sensor 809, the imaging element I/F 810, the pointing device 813, the medium I/F 815, the audio input/output I/F 817, the microphone 818, and the speaker 819, and will not be described herein.

Hardware Configuration of Image Capturing Device

Figure 6:
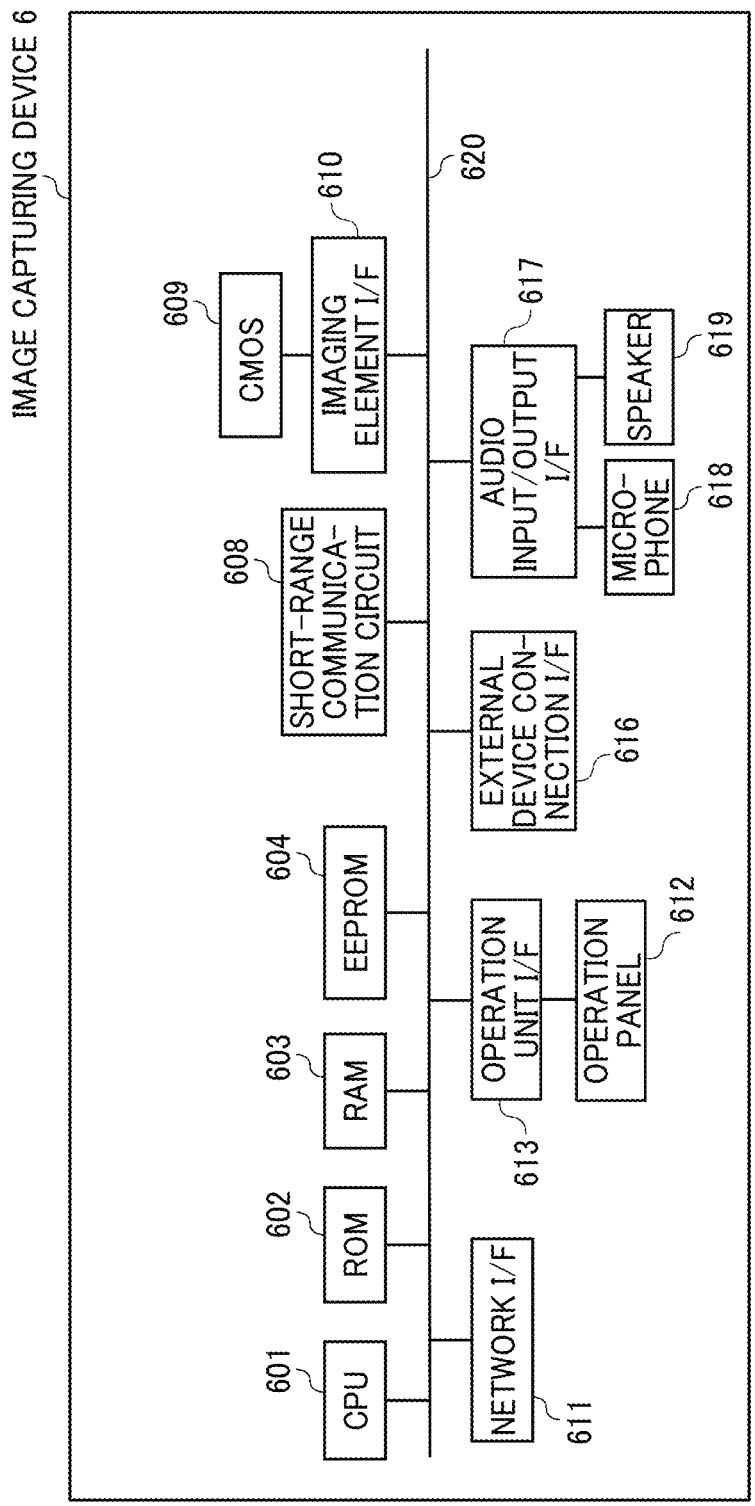
FIG. 6 is a diagram illustrating an example hardware configuration of the image capturing device according to the first embodiment of the present disclosure.

First, the hardware configuration of the image capturing device 6 will be described with reference to FIG. 6. FIG. 6 is a diagram illustrating an example hardware configuration of the image capturing device 6. As illustrated in FIG. 6, in one example, the image capturing device 6 is, for example, a camera used for live distribution or a similar image capturing device. The image capturing device 6 includes, for example, a CPU 601, a ROM 602, a RAM 603, an EEPROM 604, a short-range communication circuit 608, a CMOS sensor 609, an imaging element I/F 610, a network I/F 611, an operation panel 612, an operation unit I/F 613, an external device connection I/F 616, an audio input/output I/F 617, a microphone 618, a speaker 619, and a bus line 620.

The CPU 601, the ROM 602, the RAM 603, the EEPROM 604, the short-range communication circuit 608, the network I/F 611, the external device connection I/F 616, and the bus line 620 are similar to the corresponding hardware resources of the display device 4 illustrated in FIG. 5, namely, the CPU 401, the ROM 402, the RAM 403, the EEPROM 404, the short-range communication circuit 408, the network I/F 411, the external device connection I/F 416, and the bus line 420, and will not be described herein.

The CMOS sensor 609, the imaging element I/F 610, the audio input/output I/F 617, the microphone 618, and the speaker 619 are similar to the hardware resources of the information processing apparatus 8 illustrated in FIG. 5, namely, the CMOS sensor 809, the imaging element I/F 810, the audio input/output I/F 817, the microphone 818, and the speaker 819, and will not be described herein.

The operation panel 612 collectively refers to various operation keys, a power switch, the shutter button, and a touch panel having functions of both displaying information and receiving input from a user, which can be used in combination. The user operates the operation panel 612 to input various image capturing modes or image capturing conditions. The operation unit I/F 613 is an interface for providing information input by the user, such as various image capturing modes and image capturing conditions, to the image capturing device 6.

Figure 7:
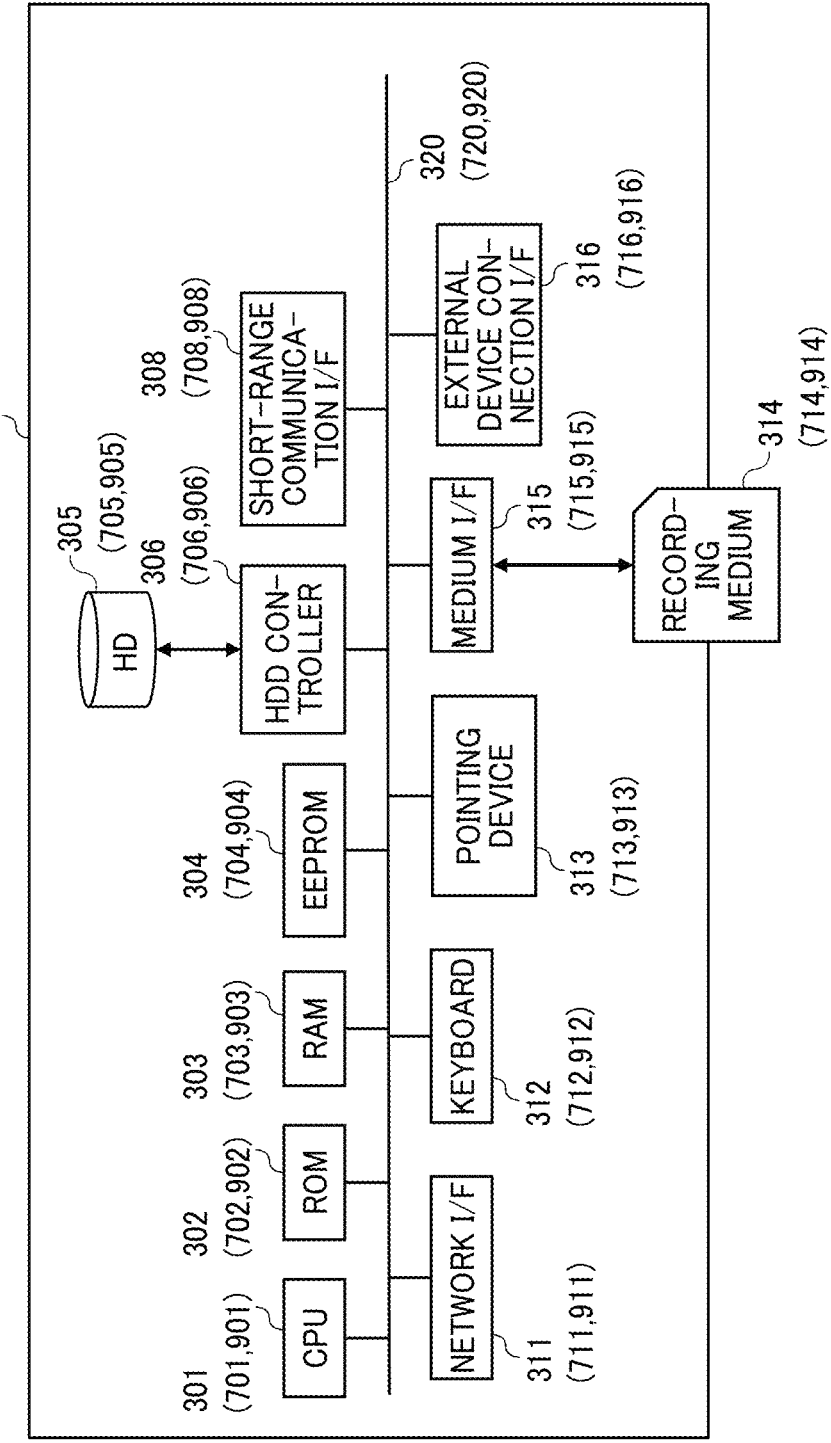
FIG. 7 is a diagram illustrating an example hardware configuration of an application server, a distribution control apparatus, and a media distribution server according to the first embodiment of the present disclosure.

Hardware Configuration of Application Server, Distribution Control Apparatus, and Media Distribution Server Next, the hardware configuration of the application server 3, the distribution control apparatus 7, and the one or more media distribution servers 9 will be described with reference to FIG. 7. FIG. 7 is a diagram illustrating an example hardware configuration of the application server 3, the distribution control apparatus 7, and the one or more media distribution servers 9. As illustrated in FIG. 7, the application server 3 is implemented by, for example, a computer. The application server 3 includes, for example, a CPU 301, a ROM 302, a RAM 303, an EEPROM 304, an HD 305, an HDD controller 306, a short-range communication I/F 308, a network I/F 311, a keyboard 312, a pointing device 313, a medium I/F 315, an external device connection I/F 316, and a bus line 320. The hardware resources described above are similar to the corresponding hardware resources of the display device 4 illustrated in FIG. 5, namely, the CPU 401, the ROM 402, the RAM 403, the EEPROM 404, the short-range communication circuit 408, the network I/F 411, the external device connection I/F 416, and the bus line 420, and will not be described herein.

The HD 305, the HDD controller 306, the keyboard 312, the pointing device 313, the medium I/F 315, and the external device connection I/F 316 are similar to the HD 805, the HDD controller 806, the keyboard 812, the pointing device 813, the medium I/F 815, and the external device connection I/F 816 of the information processing apparatus 8 illustrated in FIG. 5, and will not be described herein.

As illustrated in FIG. 7, the distribution control apparatus 7 is implemented by, for example, a computer. The distribution control apparatus 7 includes, for example, a CPU 701, a ROM 702, a RAM 703, an EEPROM 704, an HD 705, an HDD controller 706, a short-range communication I/F 708, a network I/F 711, a keyboard 712, a pointing device 713, a medium I/F 715, an external device connection I/F 716, and a bus line 720. The hardware resources described above are similar to the corresponding hardware resources of the application server 3, namely, the CPU 301, the ROM 302, the RAM 303, the EEPROM 304, the HD 305, the HDD controller 306, the short-range communication I/F 308, the network I/F 311, the keyboard 312, the pointing device 313, the medium I/F 315, the external device connection I/F 316, and the bus line 320, and will not be described herein.

As illustrated in FIG. 7, each of the one or more media distribution servers 9 is implemented by, for example, a computer. Each of the one or more media distribution servers 9 includes, for example, a CPU 901, a ROM 902, a RAM 903, an EEPROM 904, an HD 905, an HDD controller 906, a short-range communication I/F 908, a network I/F 911, a keyboard 912, a pointing device 913, a medium I/F 915, an external device connection I/F 916, and a bus line 920. The hardware resources described above are similar to the corresponding hardware resources of the application server 3, namely, the CPU 301, the ROM 302, the RAM 303, the EEPROM 304, the HD 305, the HDD controller 306, the short-range communication I/F 308, the network I/F 311, the keyboard 312, the pointing device 313, the medium I/F 315, the external device connection I/F 316, and the bus line 320, and will not be described herein.

Each of the programs described above may be recorded in a file in an installable or executable format on a computer-readable recording medium for distribution or downloaded via a network for distribution. Examples of the recording medium include a compact disc recordable (CD-R), a digital versatile disc (DVD), Blu-ray Disc®, an SD card, and a USB memory. The recording medium may be provided in the form of a program product to users within a certain country or outside that country. For example, the distribution control apparatus 7 implements a distribution control method according to an embodiment of the present disclosure in response to execution of a program according to an embodiment of the present disclosure.

Functional Configuration of Communication System

Figure 8:
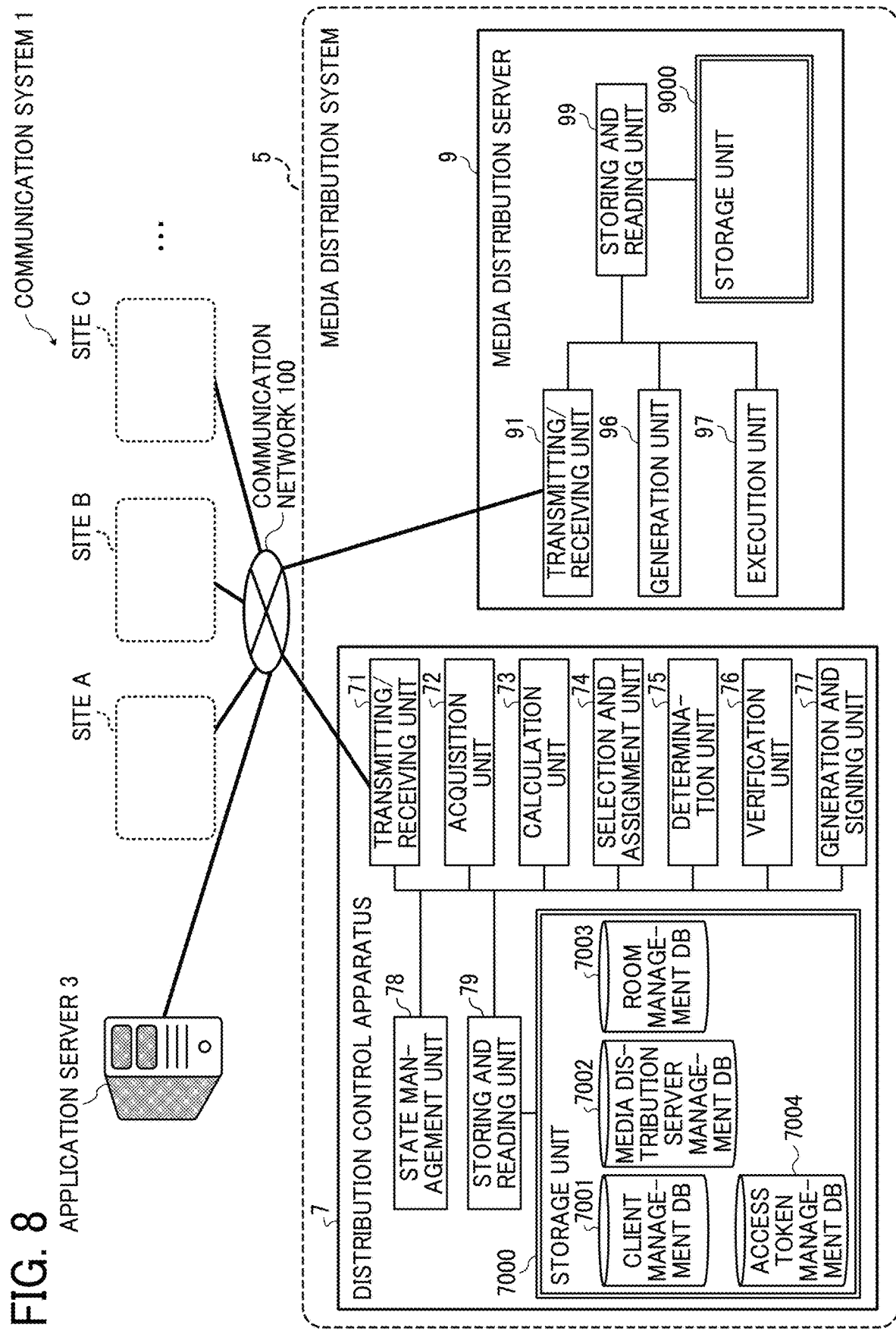
FIG. 8 is a diagram illustrating an example functional configuration of the communication system according to the first embodiment of the present disclosure.

Next, the functional configuration of the communication system 1 according to this embodiment will be described with reference to FIGS. 8 to 15. FIG. 8 is a diagram illustrating an example functional configuration of the communication system 1.

Functional Configuration of Distribution Control Apparatus

As illustrated in FIG. 8, the distribution control apparatus 7 includes a transmitting/receiving unit 71, an acquisition unit 72, a calculation unit 73, a selection and assignment unit 74, a determination unit 75, a verification unit 76, a generation and signing unit 77, a state management unit 78, and a storing and reading unit 79. The functional units described above are functions or means implemented by any one of the hardware resources illustrated in FIG. 7 operating in accordance with instructions from the CPU 701 according to a program for the distribution control apparatus 7, which is loaded onto the RAM 703 from at least one of the ROM 702, the EEPROM 704, and the HD 705. The distribution control apparatus 7 further includes a storage unit 7000. The storage unit 7000 is implemented by at least one of the ROM 702, the EEPROM 704, and the HD 705 illustrated in FIG. 7. The storage unit 7000 stores, for example, a communication program (communication application) for communicating with a communication apparatus used at each site, the application server 3, and the one or more media distribution servers 9 via the communication network 100, and a browser application for displaying media information.

Functional Elements of Distribution Control Apparatus

Next, the functional elements of the distribution control apparatus 7 will be described in detail. The transmitting/receiving unit 71 of the distribution control apparatus 7 illustrated in FIG. 8 is mainly implemented by processing performed by the CPU 701 on the network I/F 711 and the short-range communication I/F 708. The transmitting/receiving unit 71 transmits and receives various data (or information) to and from any communication apparatus, the application server 3, and the one or more media distribution servers 9 via the communication network 100. Further, the transmitting/receiving unit 71 transmits a connection response to a communication apparatus at a certain site as a response to a connection request made by the communication apparatus. The communication apparatus at the certain site is a communication apparatus used at a certain site included in a certain collective site from which information related to a connection request to connect to a distributable media distribution server assigned by the selection and assignment unit 74, which will be described below, is transmitted. The connection response includes destination information (address information) specifying a distributable media distribution server as a destination. Further, the transmitting/receiving unit 71 transmits information related to a reconnection request for reconnecting to any other newly assigned media distribution server to the communication apparatuses at the sites included in the certain collective site. Further, the transmitting/receiving unit 71 transmits a generated access token to the communication apparatuses at the sites included in the certain collective site. Further, the transmitting/receiving unit 71 transmits, in response to a connection request transmitted from the communication apparatus at each site and including an access token to request a connection to the distributable media distribution server, a connection response to the communication apparatus at the site. In this embodiment, the transmitting/receiving unit 71 functions as an example of at least one of a transmitting means and a receiving means.

The acquisition unit 72 is mainly implemented by processing performed by the CPU 701. The acquisition unit 72 acquires an access token from each site. The access token includes room identification information and site identification information, which will be described below. In this embodiment, the acquisition unit 72 functions as an example of an acquisition means.

The calculation unit 73 is mainly implemented by processing performed by the CPU 701. The calculation unit 73 calculates a bandwidth available to the one or more media distribution servers 9. Specifically, the calculation unit 73 calculates a difference between a reserved bandwidth used by a certain media distribution server for distribution and a maximum reserved bandwidth available to the certain media distribution server. In this embodiment, the calculation unit 73 functions as an example of a calculation means.

The selection and assignment unit 74 is mainly implemented by processing performed by the CPU 701. The selection and assignment unit 74 selects a media distribution server from among the certain one or more media distribution servers 9, based on the reserved bandwidth used by the selected (predetermined) media distribution server for distribution and a maximum reserved bandwidth available to the certain media distribution server, and assigns the selected media distribution server, as a distributable media distribution server capable of distributing to communication apparatuses at sites in a certain collective site including one or more sites that share the same media information. If the reserved bandwidth exceeds the maximum reserved bandwidth, the selection and assignment unit 74 does not assign the predetermined media distribution server, but assigns, as the distributable media distribution server, another media distribution server supporting the reserved bandwidth among the one or more media distribution servers 9 to the communication apparatuses at the sites. In one example, if the reserved bandwidth exceeds the maximum reserved bandwidth, the selection and assignment unit 74 assigns an additional media distribution server, in place of the predetermined media distribution server, as a new media distribution server capable of distributing the media information to the communication apparatuses at the sites. In another example, if the reserved bandwidth exceeds the maximum reserved bandwidth, the selection and assignment unit 74 causes a specific collective site, which is managed by the predetermined media distribution server, to be managed by another media distribution server instead of the predetermined media distribution server and then assigns the predetermined media distribution server to the communication apparatuses at the sites as the distributable media distribution server. Further, the selection and assignment unit 74 assigns another media distribution server supporting the reserved bandwidth, based on the difference calculated by the calculation unit 73. When the determination unit 75, which will be described below, determines that the reserved bandwidth is within the maximum reserved bandwidth, the selection and assignment unit 74 assigns the predetermined media distribution server as a distributable media distribution server. When the determination unit 75 determines that the reserved bandwidth is not within the maximum reserved bandwidth, the selection and assignment unit 74 assigns another media distribution server instead of the predetermined media distribution server as a distributable media distribution server. In this embodiment, the selection and assignment unit 74 functions as an example of an assignment means.

The determination unit 75 is mainly implemented by processing performed by the CPU 701. The determination unit 75 performs various determinations in the distribution control apparatus 7. Specifically, the determination unit 75 determines whether the reserved bandwidth used by the predetermined media distribution server for distribution, which is calculated by the calculation unit 73, is within the maximum reserved bandwidth available to the predetermined media distribution server. That is, the determination unit 75 determines whether the reserved bandwidth is less than or equal to the maximum reserved bandwidth. In this embodiment, the determination unit 75 functions as an example of a determination means.

The verification unit 76 is mainly implemented by processing performed by the CPU 701. The verification unit 76 refers to a client management database (DB), which will be described below, based on a room generation request and an access token acquisition request transmitted from the application server 3 and a connection request and a room participation request transmitted from each site to verify a client. In this embodiment, the verification unit 76 functions as an example of a verification means.

The generation and signing unit 77 is mainly implemented by processing performed by the CPU 701. In response to the verification unit 76 verifying a client, the generation and signing unit 77 generates an access token including room identification information and site identification information, which will be described below, and signs the access token by using a client secret of the client. The generation and signing unit 77 generates an access token in response to at least one of a participation request transmitted from a communication apparatus at a predetermined site to participate in a predetermined collective site and another participation request transmitted from a communication apparatus at another site to participate in the predetermined collective site. The access token includes collective site identification information that identifies the predetermined collective site, and either predetermined-site identification information that identifies the predetermined site or another-site identification information that identifies the other site. In this embodiment, the generation and signing unit 77 functions as an example of a generation means. The generation and signing unit 77 also functions as an example of a signing means.

In the communication system 1 according to this embodiment, in one example, the generation and signing unit 77 is not included in the distribution control apparatus 7, but is included in any other apparatus that enables communication between the distribution control apparatus 7 and a communication apparatus at each site via the communication network 100. In another example, the generation and signing unit 77 is included in each of the one or more media distribution servers 9.

The state management unit 78 is mainly implemented by processing performed by the CPU 701. In response to a media distribution server setup completion notification received by the transmitting/receiving unit 71 from any one of the one or more media distribution servers 9, the state management unit 78 refers to a media distribution server management DB, which will be described below, to change the state of the corresponding one of the one or more media distribution servers 9. In this embodiment, the state management unit 78 functions as an example of a state management means.

The storing and reading unit 79 is mainly implemented by processing performed by the CPU 701 on at least one of the ROM 702, the EEPROM 704, and the HD 705. The storing and reading unit 79 stores various data (or information) in the storage unit 7000 or reads various data (or information) from the storage unit 7000. In this embodiment, the storing and reading unit 79 functions as an example of a storing and reading means.

Client Management Table

FIG. 9 illustrates an example of a client management table. The storage unit 7000 includes a client management DB 7001. The client management DB 7001 includes the client management table illustrated in FIG. 9. In the client management table, the items "client key" and "client secret" are stored and managed in association with each other for each piece of client identification information that identifies a client.

The client key is information unique to an application and is given to the application server 3 in the form of information such as "AAAAAAAA" or "CCCCCCCC", for example. The client secret is other information unique to the application and is managed in pair with the client key, and is given in the form of information such as "BBBBBBBB" or "DDDDDDDD", for example.

Media Distribution Server Management Table

FIG. 10 illustrates an example of a media distribution server management table. The storage unit 7000 includes a media distribution server management DB 7002. The media distribution server management DB 7002 includes the media distribution server management table illustrated in FIG. 10. In the media distribution server management table, the items "maximum reserved bandwidth", "address information", and "state" are stored and managed in association with each other for each piece of media distribution server identification information that identifies a corresponding one of the one or more media distribution servers 9.

The maximum reserved bandwidth represents a maximum bandwidth for transmitting and receiving media information, which is determined in advance in accordance with the performance of the corresponding one of the one or more media distribution servers 9. For example, a bandwidth of 100 Mbps is given. The address information is address information given to the corresponding one of the one or more media distribution servers 9. For example, "sfu1@example.com" is given. The state represents the state of the corresponding one of the one or more media distribution servers 9. For example, the state is managed as a state such as "setup in progress" or "completion of setup".

Room Management Table

FIG. 11 illustrates an example of a room management table. The storage unit 7000 includes a room management DB 7003. The room management DB 7003 includes the room management table illustrated in FIG. 11. In the room management table, the items "room identification information", "reserved bandwidth", "media distribution server identification information", and "site identification information" are stored and managed in association with each other for each piece of client identification information.

The room identification information is information for identifying a collective site, which is a collection of one or more sites. For example, "R0002" or "R0003" is given. In this embodiment, the collective site is also referred to as "room". The reserved bandwidth represents a bandwidth used by the client to reserve the room. For example, a bandwidth such as a bandwidth of 90 Mbps or 50 Mbps is given. In this embodiment, the reserved bandwidth is controlled such that the value of the reserved bandwidth or the value of the total reserved bandwidth does not exceed the maximum reserved bandwidth of the corresponding one of the one or more media distribution servers 9. The media distribution server identification information is information for identifying each of the one or more media distribution servers 9. For example, "M0091" or "M0092" is given. The site identification information is information for identifying each site included in the room. For example, "MB000A" or "B000B" is given.

Access Token Management Table FIG. 12 illustrates an example of an access token management table. The storage unit 7000 includes an access token management DB 7004. The access token management DB 7004 includes the access token management table illustrated in FIG. 12. In the access token management table, a key name included in an access token and a value thereof are stored and managed in association with each other. The key name includes the room identification information, the site identification information, and the like described above. The value is given "R0001" as a value corresponding to the room identification information, for example. The value is given "B000A" as a value corresponding to the site identification information, for example.

Functional Configuration of Media Distribution Server

Referring back to FIG. 8, each of the one or more media distribution servers 9 includes a transmitting/receiving unit 91, a generation unit 96, an execution unit 97, and a storing and reading unit 99. The functional units described above are functions or means implemented by any one of the hardware resources illustrated in FIG. 7 operating in accordance with instructions from the CPU 901 according to a program for the one or more media distribution servers 9, which is loaded onto the RAM 903 from at least one of the ROM 902, the EEPROM 904, and the HD 905. Each of the one or more media distribution servers 9 further includes a storage unit 9000. The storage unit 9000 is implemented by at least one of the ROM 902, the EEPROM 904, and the HD 905 illustrated in FIG. 7. The storage unit 9000 stores, for example, a communication program (communication application) for communicating with a communication apparatus used at each site, the application server 3, and the distribution control apparatus 7 via the communication network 100, and a browser application for displaying media information. In this embodiment, the media distribution system 5 includes the one or more media distribution servers 9. The functional units of each of the one or more media distribution servers 9 are denoted by the reference numerals as described above, such as the transmitting/receiving unit 91, the generation unit 96, the execution unit 97, and the storing and reading unit 99, unless otherwise specified.

Functional Elements of Media Distribution Server

Next, the functional elements of each of the one or more media distribution servers 9 will be described in detail. The transmitting/receiving unit 91 of each of the one or more media distribution servers 9 illustrated in FIG. 8 is mainly implemented by processing performed by the CPU 901 on the network I/F 911 and the short-range communication I/F 908. The transmitting/receiving unit 91 transmits and receives various data (or information) to and from any communication apparatus, the application server 3, and the distribution control apparatus 7 via the communication network 100. In this embodiment, the transmitting/receiving unit 91 functions as an example of at least one of a transmitting means and a receiving means.

The generation unit 96 is mainly implemented by processing performed by the CPU 901. The generation unit 96 encrypts room identification information and site identification information received from the distribution control apparatus 7 to generate credential information. The generation unit 96 generates the credential information by using a shared key that is held at the time of setup of the corresponding media distribution server 9. The credential information generated by the generation unit 96 verifies the validity of each site and identifies which sites are managed in the same room, based on credential information transmitted from a communication apparatus at each site, which will be described below, decoding the received credential information by using the shared key, and extracting room identification information and site identification information. In this embodiment, the generation unit 96 functions as an example of a generation means.

The execution unit 97 is mainly implemented by processing performed by the CPU 901. The execution unit 97 executes setup of the corresponding media distribution server 9 in response to an activation request transmitted from the distribution control apparatus 7. In this embodiment, the execution unit 97 functions as an example of an execution means.

The storing and reading unit 99 is mainly implemented by processing performed by the CPU 901 on at least one of the ROM 902, the EEPROM 904, and the HD 905. The storing and reading unit 99 stores various data (or information) in the storage unit 9000 or reads various data (or information) from the storage unit 9000. In this embodiment, the storing and reading unit 99 functions as an example of a storing and reading means.

Functional Configuration of Application Server

Figure 13:
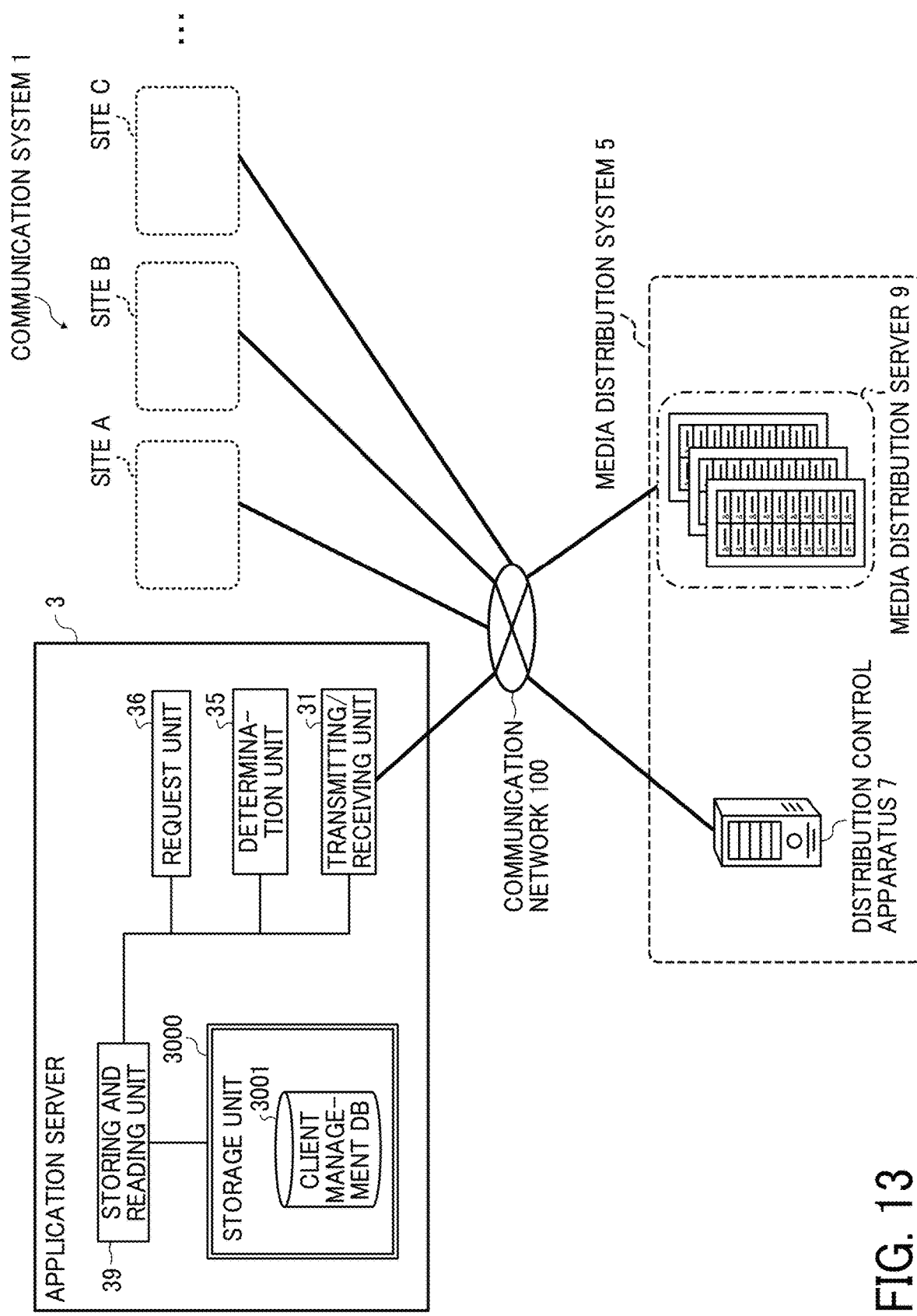
FIG. 13 is a diagram illustrating an example functional configuration of the communication system according to the first embodiment of the present disclosure.

FIG. 13 is a diagram illustrating an example functional configuration of the communication system 1. As illustrated in FIG. 13, the application server 3 includes a transmitting/receiving unit 31, a determination unit 35, a request unit 36, and a storing and reading unit 39. The functional units described above are functions or means implemented by any one of the hardware resources illustrated in FIG. 7 operating in accordance with instructions from the CPU 301 according to a program for the application server 3, which is loaded onto the RAM 303 from at least one of the ROM 302, the EEPROM 304, and the HD 305. The application server 3 further includes a storage unit 3000. The storage unit 3000 is implemented by at least one of the ROM 302, the EEPROM 304, and the HD 305 illustrated in FIG. 7. The storage unit 3000 stores, for example, a communication program (communication application) for communicating with a communication apparatus used at each site, the distribution control apparatus 7, and the one or more media distribution servers 9 via the communication network 100, and a browser application for displaying media information.

Functional Elements of Application Server

Next, the functional elements of the application server 3 will be described in detail. The transmitting/receiving unit 31 of the application server 3 illustrated in FIG. 13 is mainly implemented by processing performed by the CPU 301 on the network I/F 311 and the short-range communication I/F 308. The transmitting/receiving unit 31 transmits and receives various data (or information) to and from any communication apparatus, the distribution control apparatus 7, and the one or more media distribution servers 9 via the communication network 100. Further, the transmitting/receiving unit 31 transmits information related to various requests, such as a room generation request, an access token acquisition request, a room reserved bandwidth change request, and a standby state inquiry, to the distribution control apparatus 7. Further, the transmitting/receiving unit 31 receives various responses to the various requests described above from the distribution control apparatus 7. In this embodiment, the transmitting/receiving unit 31 functions as an example of at least one of a transmitting means and a receiving means.

The determination unit 35 is mainly implemented by processing performed by the CPU 301. The determination unit 35 determines whether to make a change to the reserved bandwidth for a corresponding one of the one or more media distribution servers 9 in response to a room participation request transmitted from each site. In this embodiment, the determination unit 35 functions as an example of a determination means.

The request unit 36 is mainly implemented by processing performed by the CPU 301. The request unit 36 makes the various requests described above, such as the room generation request, the access token acquisition request, the room reserved bandwidth change request, and the standby state inquiry, to the distribution control apparatus 7. In this embodiment, the request unit 36 functions as an example of a request means.

The storing and reading unit 39 is mainly implemented by processing performed by the CPU 301 on at least one of the ROM 302, the EEPROM 304, and the HD 305. The storing and reading unit 39 stores various data (or information) in the storage unit 3000 or reads various data (or information) from the storage unit 3000. In this embodiment, the storing and reading unit 39 functions as an example of a storing and reading means.

Client Management Table

FIG. 14 illustrates an example of a client management table. The storage unit 3000 includes a client management DB 3001. The client management DB 3001 includes the client management table illustrated in FIG. 14. The client management DB 3001 has a configuration similar to that of the client management DB 7001 described above, and will not be described in detail herein.

Functional Configuration of Communication Apparatus

Figure 15:
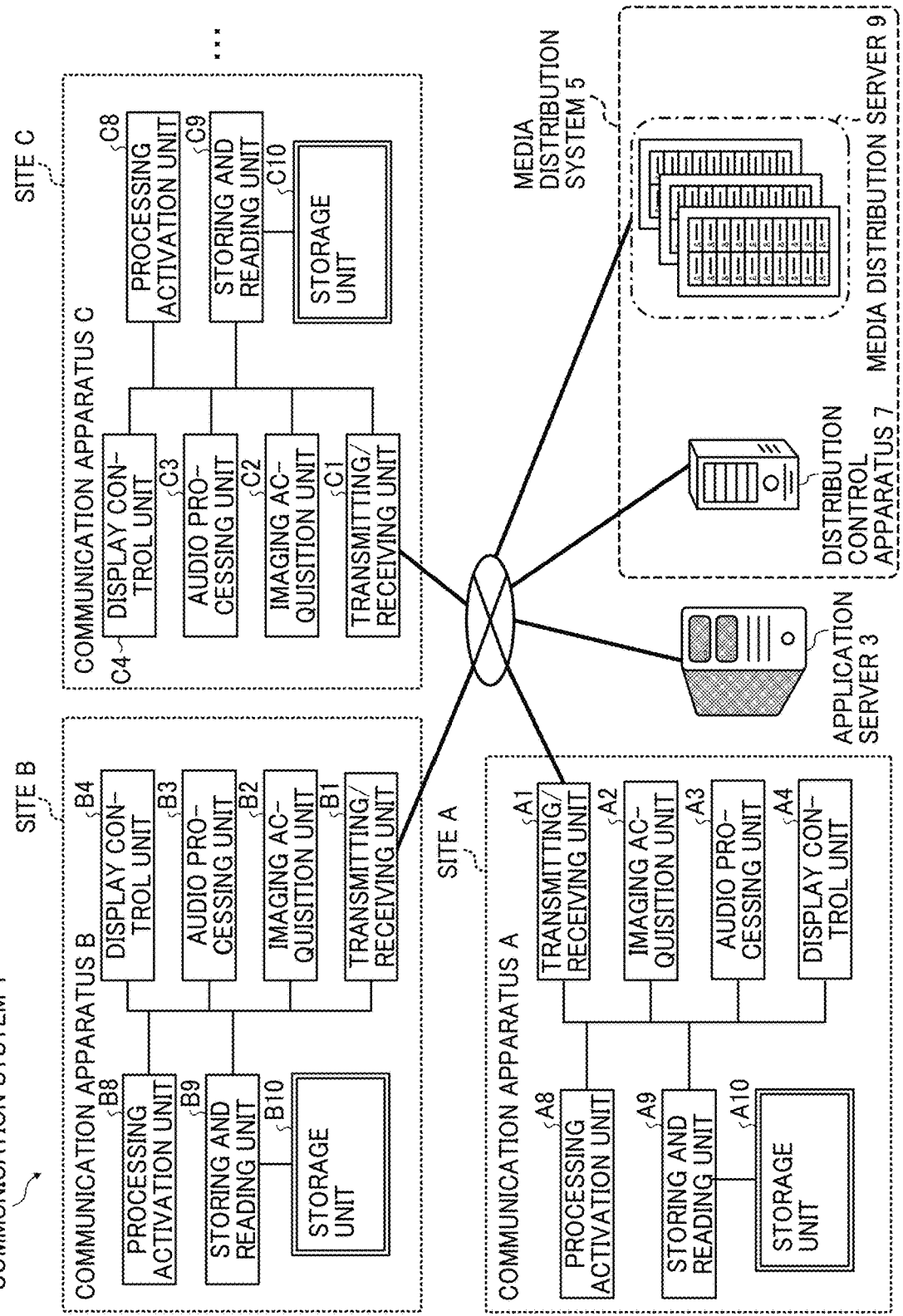
FIG. 15 is a diagram illustrating an example functional configuration of the communication system according to the first embodiment of the present disclosure.

FIG. 15 is a diagram illustrating an example functional configuration of the communication system 1. As illustrated in FIG. 15, a communication apparatus A arranged at the site A (or used at the site A) includes a transmitting/receiving unit A1, an imaging acquisition unit A2, an audio processing unit A3, a display control unit A4, a processing activation unit A8, and a storing and reading unit A9. The functional units described above are functions or means implemented by any one of the hardware resources illustrated in FIG. 4 operating in accordance with instructions from the CPU 211 according to a program for the communication apparatus, which is loaded onto the DRAM 214 from at least one of the ROM 212 and the SRAM 213. The communication apparatus A further includes a storage unit A10. The storage unit A10 is implemented by at least one of the ROM 212 and the SRAM 213 illustrated in FIG. 4. The storage unit A10 stores, for example, a communication program (communication application) for communicating with the application server 3, the distribution control apparatus 7, and the one or more media distribution servers 9 via the communication network 100. A communication apparatus B arranged at the site B (used at the site B) and a communication apparatus C arranged at the site C (used at the site C) are also implemented by hardware resources similar to those of the communication apparatus A, and will not be described in detail herein.

Functional Elements of Communication Apparatus

Next, the functional elements of the communication apparatus A will be described in detail. The functional elements of the communication apparatuses B and C are similar to the functional elements of the communication apparatus A, and will not be described in detail herein. The transmitting/receiving unit A1 of the communication apparatus A illustrated in FIG. 15 is mainly implemented by processing performed by the CPU 211 on the network I/F 216 and the communication unit 217. The transmitting/receiving unit A1 transmits and receives various data (or information) to and from the application server 3, the distribution control apparatus 7, and the one or more media distribution servers 9 via the communication network 100. In this embodiment, the transmitting/receiving unit A1 functions as an example of at least one of a transmitting means and a receiving means.

The imaging acquisition unit A2 is mainly implemented by processing performed by the CPU 211 on the imaging elements 203a and 203b and the imaging controller 205. The imaging acquisition unit A2 captures an image of the face or the like of an object, which is a user at each site (the site A), to acquire an image (video). In this embodiment, the imaging acquisition unit A2 functions as an example of an imaging acquisition means.

The audio processing unit A3 is mainly implemented by processing performed by the CPU 211 on the microphone 208 and the audio processor 209. The audio processing unit A3 performs a process of collecting speech uttered at each site (the site A) and a sound generated at each site (the site A) and generating an audio signal. In this embodiment, the audio processing unit A3 functions as an example of an audio processing means.

The display control unit A4 is mainly implemented by processing performed by the CPU 211 on the display device 4. The display control unit A4 performs control to display various screens and information (or data) for the communication apparatus A. Further, the display control unit A4 causes the display device 4 to display a display screen created in hypertext markup language (HTML) or the like by using a browser, for example. The display control unit A4 further causes the display device 4 to display media information transmitted from a distributable media distribution server. In this embodiment, the display control unit A4 functions as an example of a display control means.

The processing activation unit A8 is mainly implemented by processing performed by the CPU 211. The processing activation unit A8 activates a media information distribution application installed in the communication apparatus A to execute a media information distribution service. Further, the processing activation unit A8 operates the media information distribution application and the browser application, which are managed by the communication apparatus A, in a predetermined work area of the DRAM 214. Further, the processing activation unit A8 disconnects the currently connected media distribution server among the one or more media distribution servers 9 in response to a media distribution server reconnection request transmitted from the distribution control apparatus 7, and performs a process of connecting to a new media distribution server. In this embodiment, the processing activation unit A8 functions as an example of an execution processing means.

The storing and reading unit A9 is mainly implemented by processing performed by the CPU 211 on at least one of the ROM 212 and the SRAM 213. The storing and reading unit A9 stores various data (or information) in the storage unit A10 or reads various data (or information) from the storage unit A10. In this embodiment, the storing and reading unit A9 functions as an example of a storing and reading means.

Processes and Operations

Generation of Room

Figure 16:
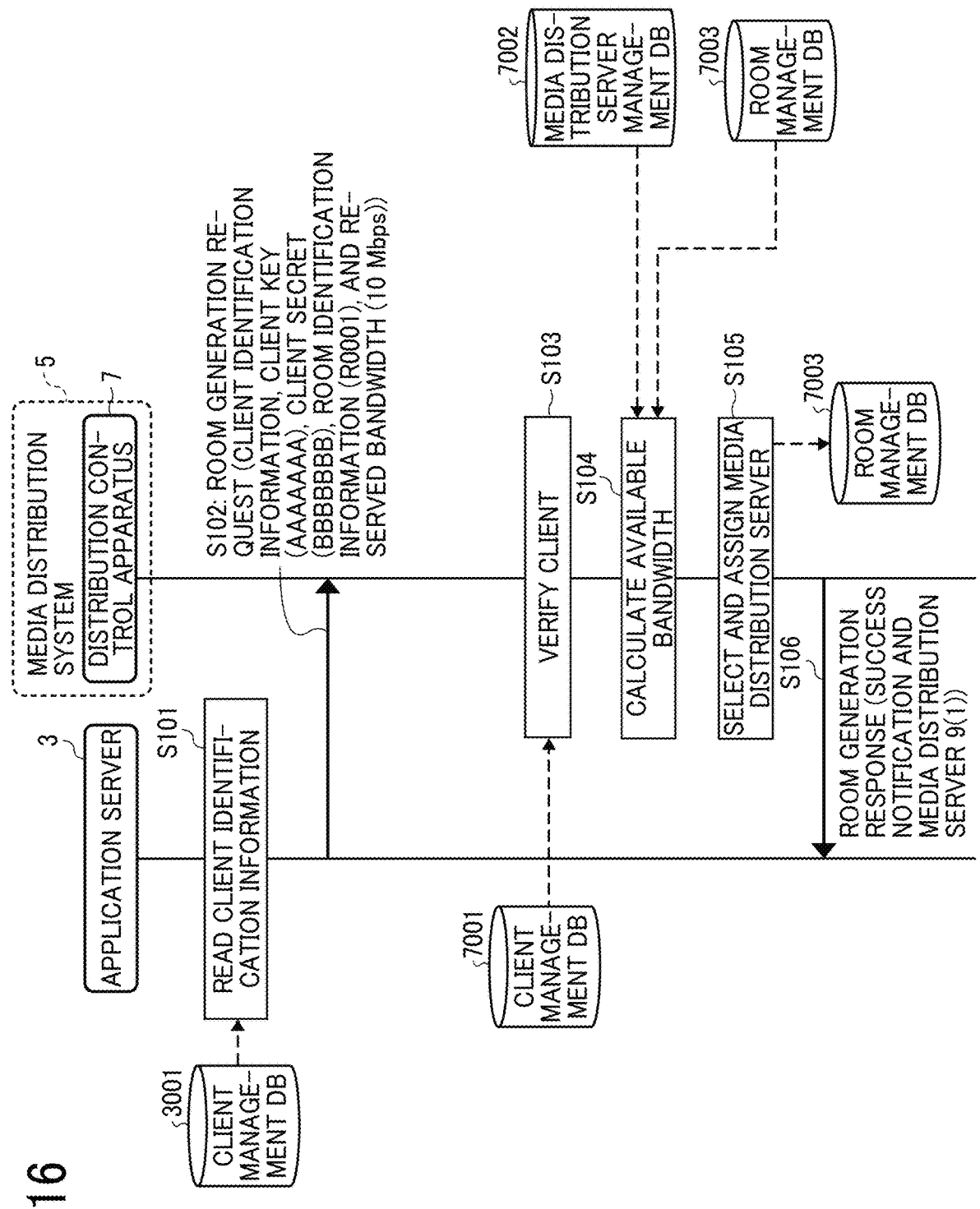
FIG. 16 is a sequence diagram illustrating an example of a room generation process according to the first embodiment of the present disclosure.

Next, a process or operation of the communication system 1 according to the first embodiment will be described with reference to FIGS. 16 to 22C. FIG. 16 is a sequence diagram illustrating an example of a room generation process. First, the storing and reading unit 39 of the application server 3 accesses the client management DB 3001 (see FIG. 14) to read the information, namely, the client key and the client secret, corresponding to client identification information (step S101). In one example, the storing and reading unit 39 may read all of the client keys and the client secrets.

Then, the request unit 36 of the application server 3 designates a room reserved bandwidth and transmits information related to a room generation request to the distribution control apparatus 7 (step S102). Then, the transmitting/receiving unit 71 of the distribution control apparatus 7 receives the information related to the room generation request transmitted from the application server 3. The room generation request includes client identification information, a client key ("AAAAAAA"), a client secret ("BBBBBBB"), room identification information ("R0001") indicating the room 1, and a reserved bandwidth ("10 Mbps").

Then, the storing and reading unit 79 of the distribution control apparatus 7 searches the client management DB 7001 (see FIG. 9) by using the client identification information received in step S102 as a search key to read the corresponding client key and the corresponding client secret. Then, the verification unit 76 compares the pair of the client key and the client secret, which is also received in step S102, with the read pair of the client key and the client secret to perform verification (step S103). In this embodiment, the information on client 1, which has transmitted the information on the room generation request, has passed the verification.

Then, the storing and reading unit 79 searches the room management DB 7003 (see FIG. 11) by using the received client identification information as a search key to read the corresponding media distribution server identification information and the corresponding reserved bandwidth. Then, the calculation unit 73 searches the media distribution server management DB 7002 (see FIG. 10) by using the media distribution server identification information as a search key to read the corresponding maximum reserved bandwidth, and calculates the difference between the reserved bandwidth and the maximum reserved bandwidth (step S104).

Then, the selection and assignment unit 74 selects and assigns a media distribution server from among the one or more media distribution servers 9, based on the available bandwidth calculated in step S104 (step S105). Examples of an algorithm for selecting a media distribution server include the following methods of (A) selecting the media distribution server having the most sufficient available bandwidth;
(B) selecting the media distribution server having the least sufficient available bandwidth among media distribution servers supporting the reserved bandwidth; and
(C) selecting the first supporting media distribution server in a round-robin manner.

In this embodiment, in one example, media distribution server 1 (the media distribution server 9(1)) is selected in accordance with the method (B) or (C). More specifically, the selection and assignment unit 74 assigns the room 1 to the media distribution server 1 (the media distribution server 9(1)) in the room management DB 7003 (see FIG. 11). Since the room 1 includes the sites A and B, the site identification information of the site A and the site identification information of the site B are added to the "site identification information" column. This addition processing is permitted for the following reason. The media distribution server 9(1) having the media distribution server identification information "M0091" has already been assigned the room 2 having a reserved bandwidth of 90 Mbps. In this state, the reserved bandwidth of the room 1, which is 10 Mbps, is given. As a result, the total reserved bandwidth is less than or equal to the maximum reserved bandwidth of the media distribution server 9(1), which is 100 Mbps. Further, as in the method (B) described above, the media distribution server 9(1) is assigned in accordance with the rule of assigning the media distribution server having the least sufficient available bandwidth.

As a result of the processing of step S105, the following content is added to the room management DB 7003 (see FIG. 11). In this case, "C0001" is added to the client identification information, "R0001" is added to the corresponding room identification information, "10" is added to the corresponding reserved bandwidth, and "M0091" is added to the corresponding media distribution server identification information. No addition or change is made to the item "site identification information".

Then, the transmitting/receiving unit 71 transmits a room generation response to the application server 3 as a response to the room generation request in step S102 (step S106). Then, the transmitting/receiving unit 31 of the application server 3 receives the room generation response transmitted from the distribution control apparatus 7. The room generation response includes a notification indicating successful room generation, and information (e.g., the media distribution server name) on the assigned media distribution server 1 (the media distribution server 9(1)).

In the communication system 1 according to this embodiment, the processing of steps S102 and S106 described above may be executed with the intervention of another apparatus or the like between the application server 3 and the distribution control apparatus 7, for example. That is, information (or data) may be transmitted and received between the application server 3 and the distribution control apparatus 7 via another apparatus. The configuration described above is applicable even in a case where any other processing step is present between the application server 3 and the distribution control apparatus 7.

Connection from Sites (Connection from Site A)

Next, a connection process from each site will be described. FIG. 17A is a sequence diagram illustrating an example of a connection process from the site A. First, to participate in a predetermined room in the application server 3, the transmitting/receiving unit A1 of the communication apparatus A used at the site A transmits information related to a room participation request to the application server 3 (step S111). Then, the transmitting/receiving unit 31 of the application server 3 receives the information related to the room participation request transmitted from the communication apparatus A. The room participation request includes, for example, information indicating a room position and a request for acquiring an access token for accessing the distribution control apparatus 7.

Then, the determination unit 35 of the application server 3 determines whether to change the reserved bandwidth (step S112). Specifically, the determination unit 35 determines that the reserved bandwidth set for the room 1 is sufficient even for participation of the site A included in the room 1.

Then, the transmitting/receiving unit 31 transmits information related to an access token acquisition request to the distribution control apparatus 7 (step S113). Then, the transmitting/receiving unit 71 of the distribution control apparatus 7 receives the information related to the access token acquisition request transmitted from the application server 3. The access token acquisition request includes the client key, the client secret, the room identification information ("R0001"), and the site identification information ("B000A").

Then, the verification unit 76 of the distribution control apparatus 7 verifies the client (step S114). The processing of step S114 is similar to that of step S103 described above, and will not be described in detail herein.

Then, the generation and signing unit 77 generates and signs an access token (step S115). Specifically, the generation and signing unit 77 registers the room identification information ("R0001") and the site identification information ("B000A"), which are received in step S113, in the items of the corresponding values in the access token management DB 7004 (see FIG. 12), and signs the information using the client secret. That is, the access token generated at this time includes the room identification information ("R0001"), the site identification information ("B000A"), and the client secret.

Then, the transmitting/receiving unit 71 transmits an access token acquisition response to the application server 3 as a response to the access token acquisition request transmitted in step S113 (step S116). Then, the transmitting/receiving unit 31 of the application server 3 receives the access token acquisition response transmitted from the distribution control apparatus 7. The access token acquisition response includes the room identification information ("R0001") and the site identification information ("B000A").

Then, the transmitting/receiving unit 31 of the application server 3 transmits a room participation response to the communication apparatus A at the site A as a response to the room participation request transmitted in step S111 (step S117). Then, the transmitting/receiving unit A1 of the communication apparatus A at the site A receives the room participation response transmitted from the application server 3. The room participation response includes the access token and a notification indicating successful room participation.

In the communication system 1 according to this embodiment, the processing of steps S111 and S117 described above may be executed with the intervention of another apparatus or the like between the communication apparatus A and the application server 3, for example. That is, information (or data) may be transmitted and received between the communication apparatus A and the application server 3 via another apparatus. The configuration described above is applicable even in a case where any other processing step is present between the communication apparatus A and the application server 3.

Figure 17B:
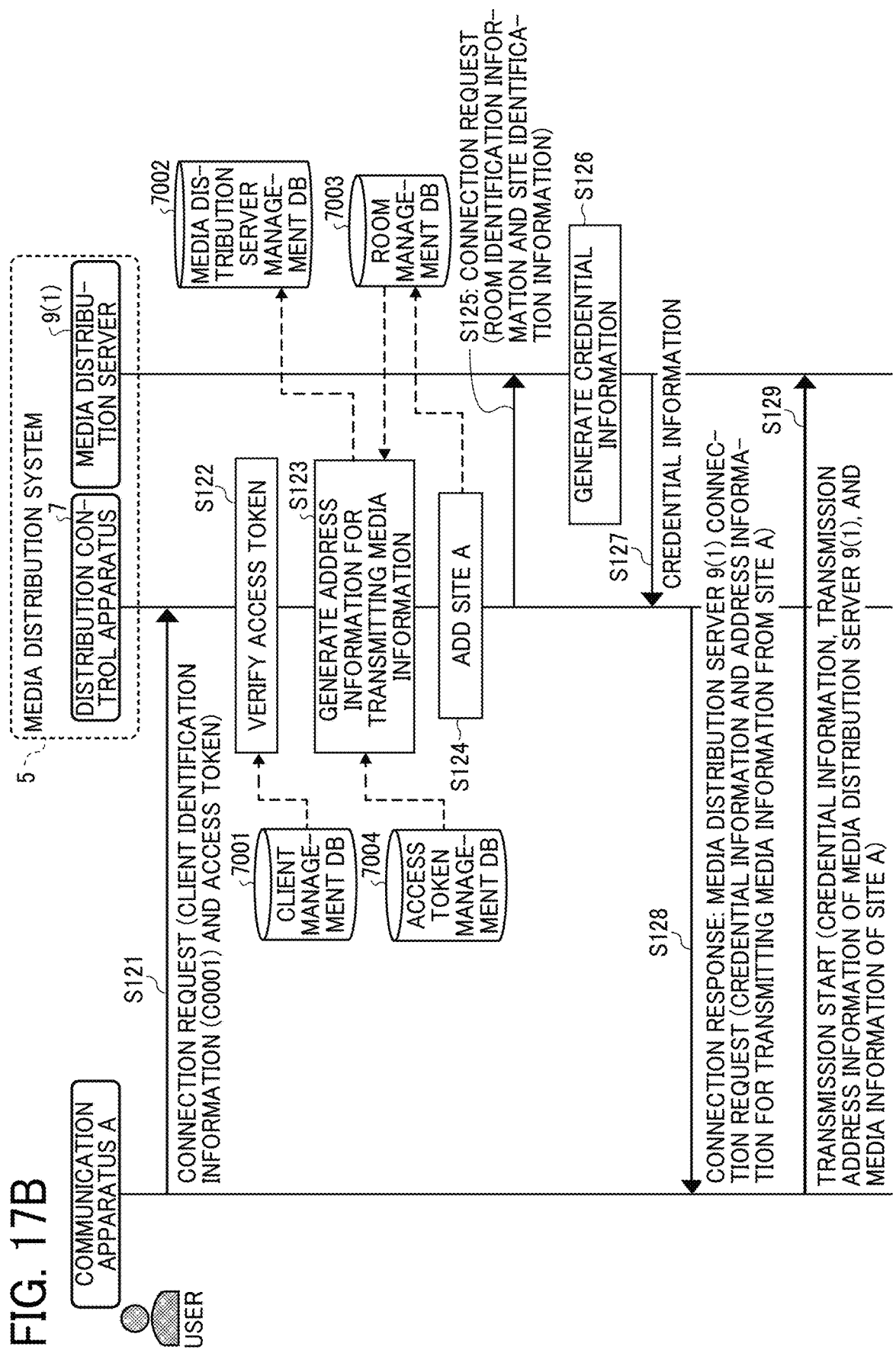
FIG. 17B is a sequence diagram illustrating the example of the connection process from the site A according to the first embodiment of the present disclosure.

The connection process from the site A will still be described. FIG. 17B is a sequence diagram illustrating the example of the connection process from the site A. The transmitting/receiving unit A1 of the communication apparatus A at the site A transmits to the distribution control apparatus 7 information related to a connection request to connect to the media distribution server 9(1) (step S121). Then, the transmitting/receiving unit 71 of the distribution control apparatus 7 receives the information related to the connection request transmitted from the communication apparatus A. Specifically, the transmitting/receiving unit A1 of the communication apparatus A adds the client identification information and the acquired access token to a connection request, and transmits the connection request to the distribution control apparatus 7.

Then, the verification unit 76 of the distribution control apparatus 7 verifies the access token (step S122). Specifically, the verification unit 76 searches the client management DB 7001 (see FIG. 9) by using the client identification information included in the received access token as a search key to read the corresponding client secret and verifies whether the read client secret matches the client secret used to sign the access token.

Then, the generation and signing unit 77 generates address information for transmitting the media information (step S123). Specifically, the generation and signing unit 77 operates in cooperation with the storing and reading unit 79 to read the room identification information ("R0001") and the site identification information ("B000A") from the access token management DB 7004 (see FIG. 12). Then, the generation and signing unit 77 searches the room management DB 7003 (see FIG. 11) by using the room identification information ("R0001") as a search key to reference the corresponding media distribution server identification information. Further, the generation and signing unit 77 generates address information corresponding to the referenced media distribution server identification information as address information for transmitting the media information from the communication apparatus A at the site A, and registers the generated address information in the item of the corresponding address information in the media distribution server management DB 7002 (see FIG. 10).

Then, the storing and reading unit 79 adds the site identification information ("B000A") of the room 1 to the site identification information in the room management DB 7003 (see FIG. 11) (step S124).

As a result of the processing of step S124, the room management DB 7003 (see FIG. 11) further includes, in addition to the content added in the processing of step S105, "B000A", which represents the identification information of the site A, in the item "site identification information".

Then, the transmitting/receiving unit 71 of the distribution control apparatus 7 transmits a connection request to the media distribution server 9(1) (step S125). Then, the transmitting/receiving unit 91 of the media distribution server 9(1) receives the connection request transmitted from the distribution control apparatus 7. The connection request includes the room identification information ("R0001") and the site identification information ("B000A") received in step S113.

Then, the generation unit 96 of the media distribution server 9(1) encrypts the received room identification information ("R0001") and the received site identification information ("B000A") to generate credential information (step S126). The generation unit 96 generates the credential information by using a shared key that is held at the time of setup of the media distribution server 9(1).

Then, the transmitting/receiving unit 91 transmits the generated credential information to the distribution control apparatus 7 (step S127). Then, the transmitting/receiving unit 71 of the distribution control apparatus 7 receives the credential information transmitted from the media distribution server 9(1).

Then, the transmitting/receiving unit 71 of the distribution control apparatus 7 transmits to the communication apparatus A at the site A a connection response to the connection request (step S128). Specifically, the transmitting/receiving unit 71 transmits a connection request to connect to the distributable media distribution server 9(1) to the communication the communication apparatus A at the site A as a connection response. Then, the transmitting/receiving unit A1 of the communication apparatus A receives, as a connection response, the connection request transmitted from the distribution control apparatus 7. The connection request to connect to the media distribution server 9(1), which is a connection response, includes the credential information received in step S127 and address information (e.g., "sfu1@example.com") for receiving the media information from the site A.

Then, the transmitting/receiving unit A1 of the communication apparatus A starts the transmission of the media information to the connected media distribution server 9(1) (step S129). Then, the transmitting/receiving unit 91 of the media distribution server 9(1) receives the information for starting the transmission of the media information, which is transmitted from the communication apparatus A. The information for starting the transmission of the media information includes, for example, the credential information, the transmission address information ("sfu1@example.com") of the media distribution server 9(1), and the media information of the site A.

In the communication system 1 according to this embodiment, the processing of steps S121 and S128 described above may be executed with the intervention of another apparatus or the like between the communication apparatus A and the distribution control apparatus 7, for example. That is, information (or data) may be transmitted and received between the communication apparatus A and the distribution control apparatus 7 via another apparatus. The configuration described above is applicable even in a case where any other processing step is present between the communication apparatus A and the distribution control apparatus 7.

Connection from Sites (Connection from Site B)

Next, a connection process from the site B will be described. FIG. 18A is a sequence diagram illustrating an example of a connection process from the site B. The processing of steps S131 to S137 described below is performed in a similar manner as described above referring to the processing of steps S111 to S117, except that the communication apparatus that issues the room participation request is changed to the communication apparatus B and the site identification information is changed from "B000A" to "B000B", and will not be described in detail herein.

Figure 18B:
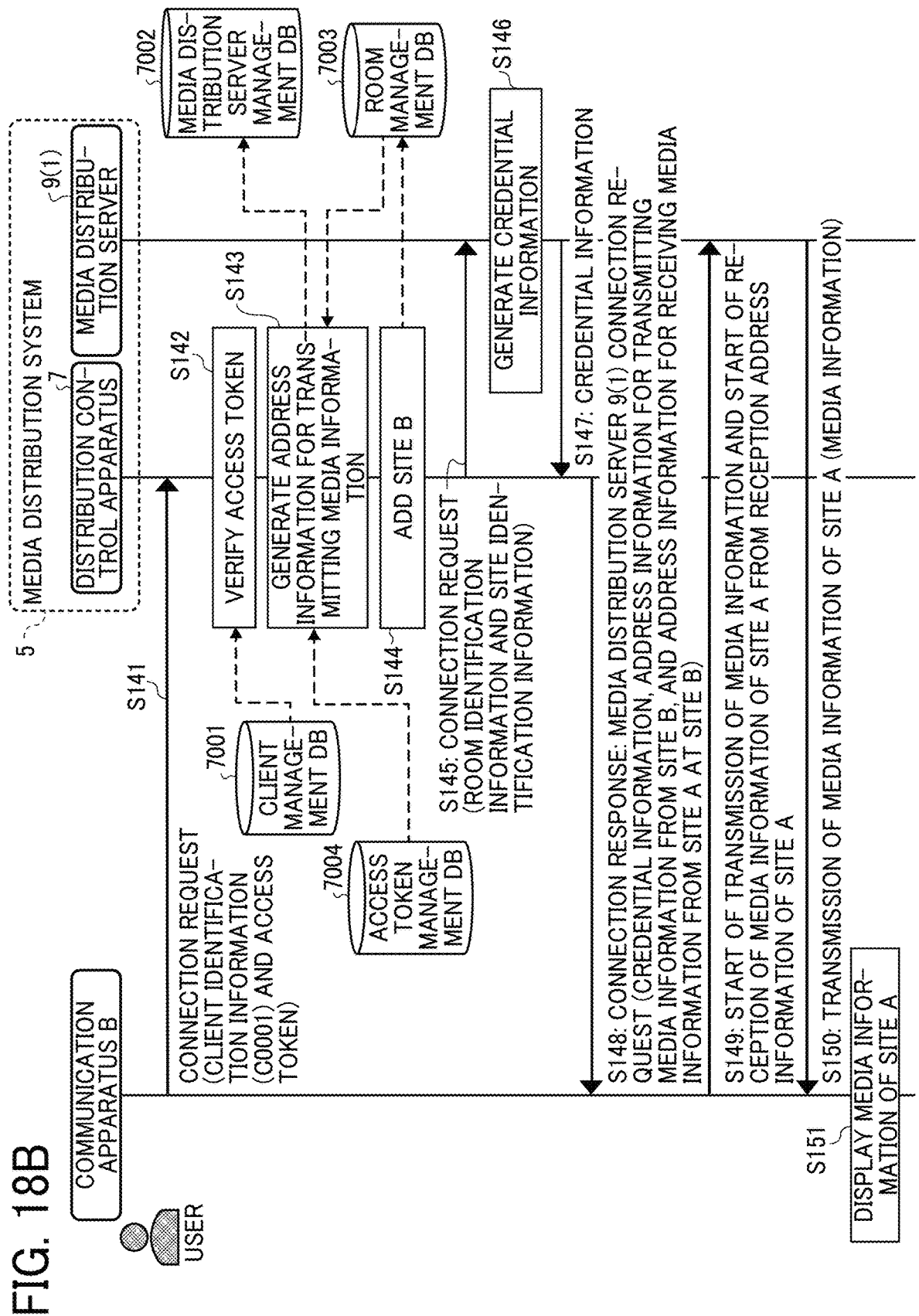
FIG. 18B is a sequence diagram illustrating the example of the connection process from the site B according to the first embodiment of the present disclosure.

The connection process from the site B will still be described. FIG. 18B is a sequence diagram illustrating the example of the connection process from the site B. The processing of steps S141 to S148 illustrated in FIG. 18B is performed in a similar manner as the processing of steps S121 to S128 described above, except that the site identification information of the site to be added is changed from "B000A" to "B000B", and will not be described in detail herein. It should be noted that, in step S148, the connection response transmitted from the distribution control apparatus 7 includes address information for transmitting the media information from the communication apparatus B at the site B and address information for allowing the communication apparatus B at the site B to receive the media information of the site A.

As a result of the processing of step S144, the room management DB 7003 (see FIG. 11) further includes, in addition to the content added in the processing of step S124, "B000B", which represents the identification information of the site B, in the item "site identification information".

Then, the transmitting/receiving unit B1 of the communication apparatus B starts the transmission of the media information to the media distribution server 9(1) and starts the reception of the media information of the site A from the reception address information of the site A (step S149). Then, the transmitting/receiving unit 91 of the media distribution server 9(1) receives the media information transmitted from the communication apparatus B.

Then, the transmitting/receiving unit 91 transmits the media information of the site A to the communication apparatus B at the site B (step S150). Then, the transmitting/receiving unit B1 of the communication apparatus B receives the media information of the site A transmitted from the media distribution server 9(1).

Then, the display control unit B4 of the communication apparatus B causes the display 807 of the communication apparatus B (the information processing apparatus 8) to display the media information of the site A received in the processing of step S150 (step S151).

In the communication system 1 according to this embodiment, the processing of steps S149 and S150 described above may be executed with the intervention of another apparatus or the like between the communication apparatus B and the media distribution server 9(1), for example. That is, information (or data) may be transmitted and received between the communication apparatus B and the media distribution server 9(1) via another apparatus. The configuration described above is applicable even in a case where any other processing step is present between the communication apparatus B and the media distribution server 9(1).

Figure 18C:
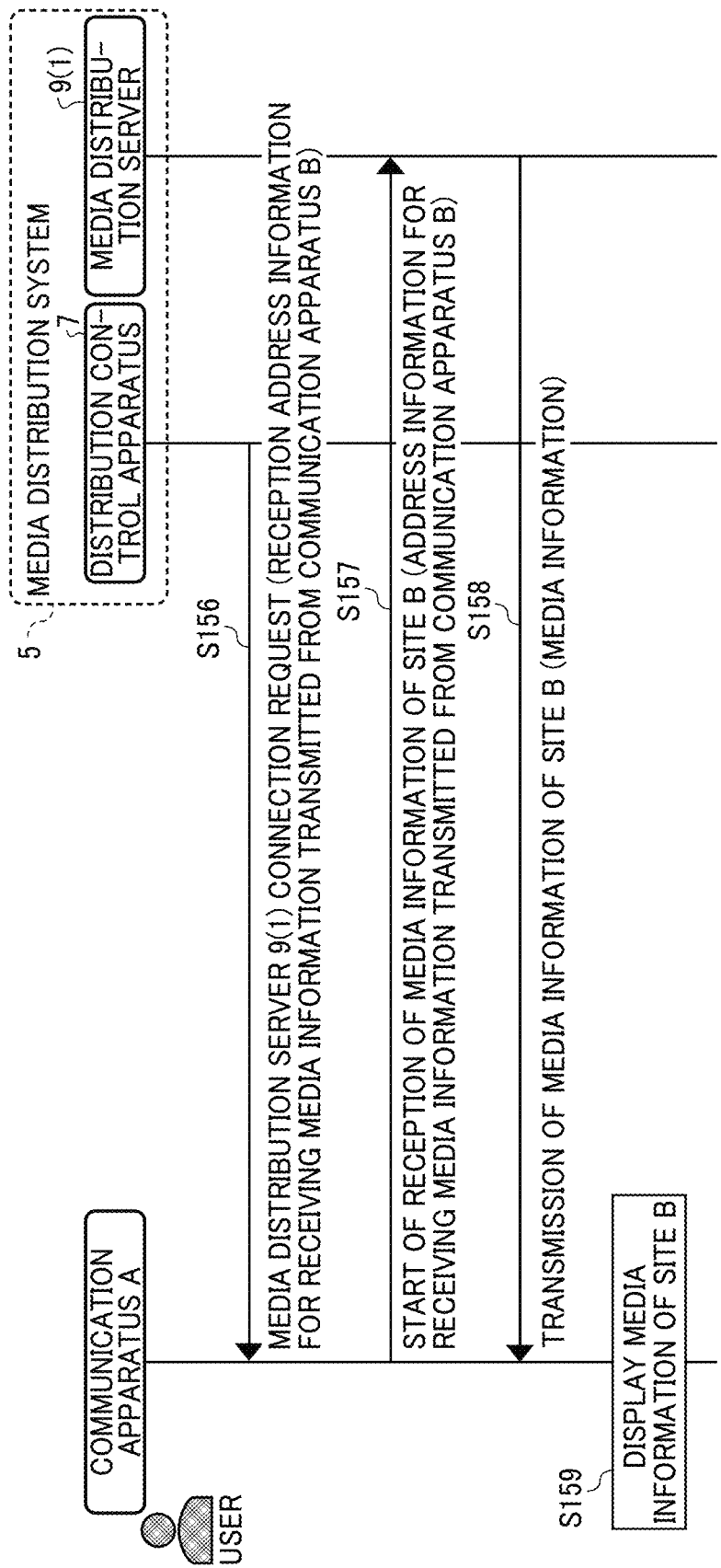
FIG. 18C is a sequence diagram illustrating the example of the connection process from the site B according to the first embodiment of the present disclosure.

The connection process from the site B will still be described. FIG. 18C is a sequence diagram illustrating the example of the connection process from the site B. The transmitting/receiving unit A1 of the communication apparatus A transmits to the distribution control apparatus 7 information related to a connection request to connect to the media distribution server 9(1) (step S156). Then, the transmitting/receiving unit 71 of the distribution control apparatus 7 receives the information related to the connection request to connect to the media distribution server 9(1), which is transmitted from the communication apparatus A. The connection request to connect to the media distribution server 9(1) includes reception address information for receiving the media information transmitted from the communication apparatus B at the site B.

Then, the transmitting/receiving unit A1 of the communication apparatus A transmits information for starting the reception of the media information of the site B (step S157). Then, the transmitting/receiving unit 91 of the media distribution server 9(1) receives the information for starting the reception of the media information of the site B, which is transmitted from the communication apparatus A. The information for starting the reception of the media information of the site B includes address information (e.g., "sfu1@example.com") for receiving the media information transmitted from the communication apparatus B.

Then, the transmitting/receiving unit 91 of the media distribution server 9(1) transmits the media information of the site B to the communication apparatus A (step S158). Then, the transmitting/receiving unit A1 of the communication apparatus A receives the media information of the site B transmitted from the media distribution server 9(1).

Then, the display control unit A4 of the communication apparatus A causes the display 407 of the display device 4 to display the media information of the site B (step S159).

Connection from Sites (Connection from Site C)

Figure 19A:
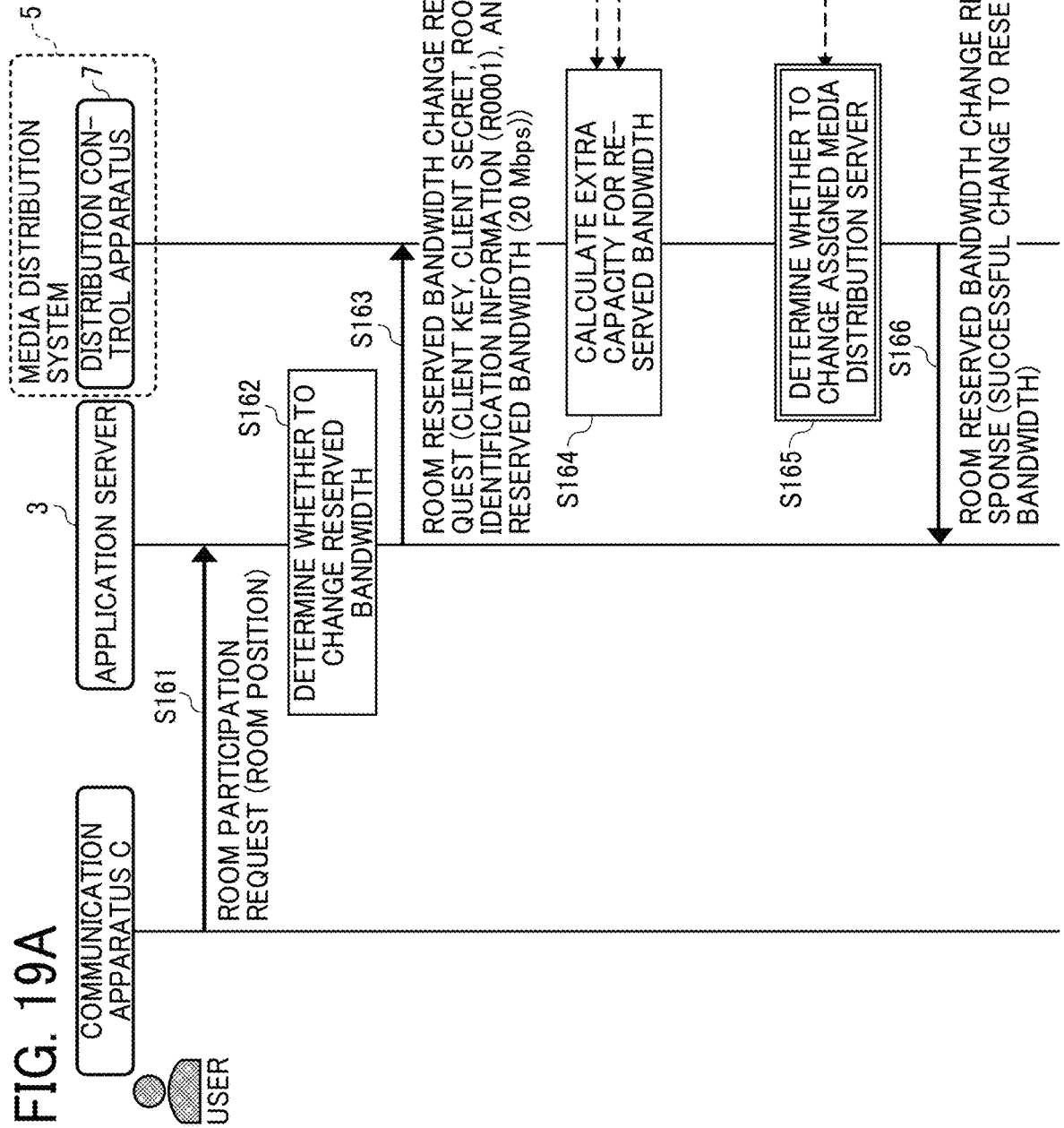
FIG. 19A is a sequence diagram illustrating an example of a connection process from site C according to the first embodiment of the present disclosure.

Next, a connection process from the site C will be described. FIG. 19A is a sequence diagram illustrating an example of a connection process from the site C. First, to participate in the predetermined room in the application server 3, the transmitting/receiving unit C1 of the communication apparatus C used at the site C transmits information related to a room participation request to the application server 3 (step S161). Then, the transmitting/receiving unit 31 of the application server 3 receives the information related to the room participation request transmitted from the communication apparatus C. The room participation request includes, for example, information indicating a room position and a request for acquiring an access token for accessing the distribution control apparatus 7.

Then, the determination unit 35 of the application server 3 determines whether to change the reserved bandwidth (step S162). This determination processing is performed when the application server 3 does not initially assume participation of three sites and does not secure a sufficient reserved bandwidth. Specifically, in response to participation of the site C included in the room 1, the determination unit 35 of the application server 3 determines that the reserved bandwidth set for the room 1 is not sufficient for the media distribution server 9(1).

Then, the transmitting/receiving unit 31 transmits information related to a room reserved bandwidth change request to the distribution control apparatus 7 (step S163). Then, the transmitting/receiving unit 71 of the distribution control apparatus 7 receives the information related to the room reserved bandwidth change request transmitted from the application server 3. The room reserved bandwidth change request includes the client key, the client secret, the room identification information ("R0001"), and the reserved bandwidth ("20 Mbps").

Then, the calculation unit 73 of the distribution control apparatus 7 calculates the extra capacity for the reserved bandwidth (step S164). Specifically, the storing and reading unit 79 searches the room management DB 7003 (see FIG. 11) by using the received room identification information ("R0001") as a search key to read the corresponding media distribution server identification information ("M0091") and the corresponding reserved bandwidth ("10 Mbps"). The values described above have been added to the room management DB 7003 in the processing of step S105 described above. Then, the calculation unit 73 searches the media distribution server management DB 7002 (see FIG. 10) by using the media distribution server identification information ("M0091") as a search key to read the corresponding maximum reserved bandwidth (100 Mbps), and calculates the difference between the reserved bandwidth and the maximum reserved bandwidth. As a result of the calculation of the difference between the reserved bandwidth and the maximum reserved bandwidth, if the maximum reserved bandwidth is greater than or equal to the total reserved bandwidth, it is determined that the reserved bandwidth is sufficient.

Determination of Whether to Change Assigned Media Distribution Server in Response to Change to Room Reserved Bandwidth Then, the distribution control apparatus 7 determines whether to change the assigned media distribution server 9 (step S165). The determination of whether to change the assigned media distribution server 9 will be described hereinafter. FIG. 19B is a flowchart illustrating an example of a process for determining whether to change the assigned media distribution server 9 in response to a change to the room reserved bandwidth. First, the acquisition unit 72 acquires a reserved bandwidth that has been changed in response to a room participation request from each site (step S165-1).

Then, the determination unit 75 determines whether the total reserved bandwidth is supported by the currently assigned media distribution server (step S165-2). If the total reserved bandwidth is supported by the currently assigned media distribution server (step S165-2: YES), the selection and assignment unit 74 exits the process without changing the assigned media distribution server (i.e., while maintaining the currently assigned media distribution server) (step S165-3).

If the total reserved bandwidth is not supported by the currently assigned media distribution server (step S165-2: NO), the selection and assignment unit 74 selects a media distribution server supporting the updated reserved bandwidth, and then exits the process (step S165-4). Specifically, the selection and assignment unit 74 searches for the maximum reserved bandwidth corresponding to the media distribution server identification information managed in the media distribution server management DB 7002 (see FIG. 10), and selects a media distribution server supporting the total reserved bandwidth (e.g., a media distribution server having a maximum reserved bandwidth greater than or equal to the total reserved bandwidth). Then, the selection and assignment unit 74 exits the process.

The flowchart described above is an example, and the process for determining whether to change the assigned media distribution server in response to a change to the room reserved bandwidth is not limited to the process described above.

Referring back to FIG. 19A, the transmitting/receiving unit 71 of the distribution control apparatus 7 transmits to the application server 3 a room reserved bandwidth change response to the room reserved bandwidth change request transmitted in step S163 (step S166). Then, the transmitting/receiving unit 31 of the application server 3 receives the room reserved bandwidth change response transmitted from the distribution control apparatus 7. The room reserved bandwidth change response includes information or notification indicating a successful change to the reserved bandwidth.

The connection process from the site C will still be described. FIG. 19C is a sequence diagram illustrating the example of the connection process from the site C. The processing of steps S173 to S177 is performed in a similar manner as the processing of steps S113 to S117 described above, except that the site identification information is changed from "B000A" to "B000C", and will not be described in detail herein.

FIG. 19D is a sequence diagram illustrating the example of the connection process from the site C. The transmitting/receiving unit C1 of the communication apparatus C at the site C transmits to the distribution control apparatus 7 information related to a connection request to connect to the media distribution server 9(2) (step S181). Then, the transmitting/receiving unit 71 of the distribution control apparatus 7 receives the information related to the connection request transmitted from the communication apparatus C. Specifically, the transmitting/receiving unit C1 of the communication apparatus C adds the client identification information and the acquired access token to a connection request, and transmits the connection request to the distribution control apparatus 7.

Then, the verification unit 76 of the distribution control apparatus 7 verifies the access token (step S182). Specifically, the verification unit 76 searches the client management DB 7001 (see FIG. 9) by using the client identification information included in the received access token as a search key to read the corresponding client secret and verifies whether the read client secret matches the client secret used to sign the access token.

Then, the generation and signing unit 77 generates address information for transmitting the media information (step S183). Specifically, the generation and signing unit 77 operates in cooperation with the storing and reading unit 79 to read the room identification information ("R0001") and the site identification information ("B000C") from the access token management DB 7004 (see FIG. 12). Then, the generation and signing unit 77 searches the room management DB 7003 (see FIG. 11) by using the room identification information ("R0001") as a search key to reference the corresponding media distribution server identification information. Further, the generation and signing unit 77 generates address information corresponding to the referenced media distribution server identification information as address information for transmitting the media information from the communication apparatus C at the site C, and registers the generated address information in the item of the corresponding address information in the media distribution server management DB 7002 (see FIG. 10).

Then, the storing and reading unit 79 adds the site identification information ("B000C") of the room 1 to the site identification information in the room management DB 7003 (see FIG. 11) (step S184).

As a result of the processing of step S184, the room management DB 7003 (see FIG. 11) further includes the content below in addition to the content added in the processing of step S144. At this point in time, the room management DB 7003 further includes the client identification information ("C0001"). Further, the items, namely, the room identification information ("R0001"), the reserved bandwidth ("20 Mbps"), the media distribution server identification information ("M0092"), and the site identification information ("B000A", "B000B", and "B000C") corresponding to the client identification information ("C0001"), are added to the room management DB 7003. The other items corresponding to the client identification information are as illustrated in FIG. 11, and will not be described herein.

The processing of steps S185 to S187 illustrated in FIG. 19D is similar to the processing of steps S125 to S127 described above, and will not be described in detail herein.

Then, the transmitting/receiving unit 71 of the distribution control apparatus 7 transmits to the communication apparatus C at the site C a connection response to the connection request issued in step S181 (step S188). Then, the transmitting/receiving unit C1 of the communication apparatus C receives, as a connection response, a connection request transmitted from the distribution control apparatus 7. The connection request to connect to the media distribution server 9(2), which is a connection response, includes the address information (e.g., "sfu2@example.com") of the media distribution server 9(2) for receiving the media information from the site C.

Then, the transmitting/receiving unit C1 of the communication apparatus C starts the transmission of the media information to the connected media distribution server 9(2) (step S189). Then, the transmitting/receiving unit 91 of the media distribution server 9(2) receives the information for starting the transmission of the media information, which is transmitted from the communication apparatus C. The information for starting the transmission of the media information includes, for example, the transmission address information ("sfu2@example.com") of the media distribution server 9(2) and the media information of the site C.

Reconnection Process for Site A

Figure 20:
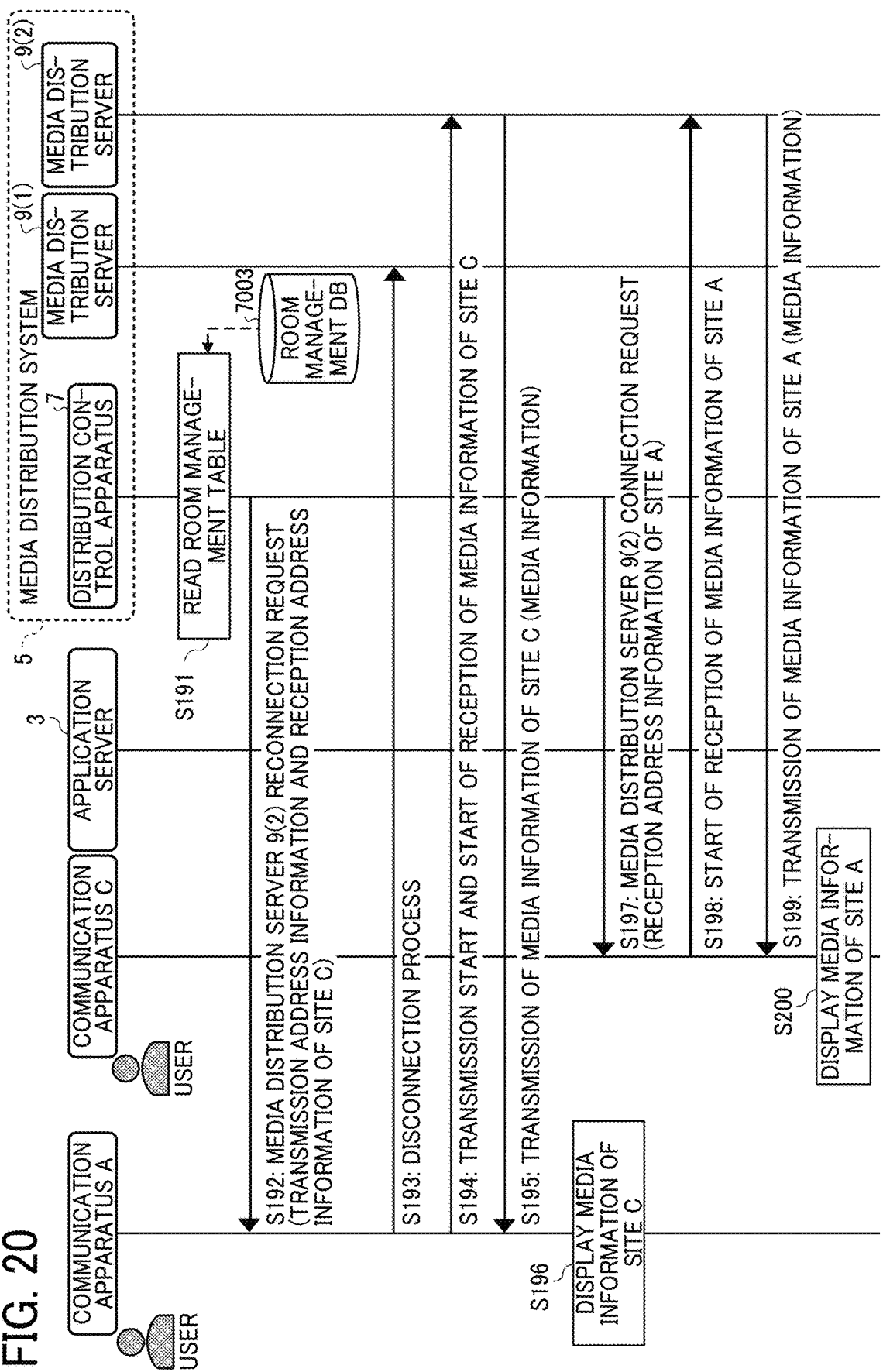
FIG. 20 is a sequence diagram illustrating an example of a reconnection process for the site A according to the first embodiment of the present disclosure.

Next, a reconnection process for the site A will be described. FIG. 20 is a sequence diagram illustrating an example of a reconnection process for the site A. In this embodiment, each of the sites A and C starts the transmission of the media information to a transmission address of a media distribution server for which a reconnection request is made among the one or more media distribution servers 9, and starts the reception of media information of another site from a reception address. That is, the distribution control apparatus 7 transmits to the sites A and C information related to a request to reconnect to an address to which the media information of each of the sites A and C is to be transmitted and an address for receiving media information of another site that has participated in the room. The addresses for transmission and reception are the address of the selected media distribution server 9(2).

First, the storing and reading unit 79 of the distribution control apparatus 7 searches the room management DB 7003 (see FIG. 11) by using the received room identification information ("R0001") as a search key to read all the pieces of corresponding media distribution server identification information and all the pieces of corresponding site identification information (step S191).

Then, the transmitting/receiving unit 71 transmits information related to a request to reconnect to the media distribution server 9(2) to the communication apparatus A at the site A (step S192). Then, the transmitting/receiving unit A1 of the communication apparatus A receives the information related to the request to reconnect to the media distribution server 9(2), which is transmitted from the distribution control apparatus 7. The request to reconnect to the media distribution server 9(2) includes the transmission address information, and the reception address information of the communication apparatus C at the site C.

Then, the processing activation unit A8 of the communication apparatus A operates in cooperation with the transmitting/receiving unit A1 to transmit information for a disconnection process to disconnect the current connection to the media distribution server 9(1) in response to the request to reconnect to the media distribution server 9(2) received in step S192 (step S193). Then, the transmitting/receiving unit 91 of the media distribution server 9(1) receives the information (data) for the disconnection process, which is transmitted from the communication apparatus A.

Then, the transmitting/receiving unit A1 of the communication apparatus A transmits information for starting the transmission of the media information to the newly connected media distribution server 9(2), and starts the reception of the media information of the site C (step S194). Then, the transmitting/receiving unit 91 of the media distribution server 9(2) receives the information for starting the transmission of the media information, which is transmitted from the communication apparatus A.

Then, the transmitting/receiving unit 91 transmits the media information of the site C to the communication apparatus A (step S195). Then, the transmitting/receiving unit A1 of the communication apparatus A receives the media information of the site C transmitted from the media distribution server 9(2).

Then, the display control unit A4 of the communication apparatus A causes the display means of the communication apparatus A (in this case, the display 407 of the display device 4) to display the media information of the site C, which is received in step S195 (step S196).

Then, the transmitting/receiving unit 71 of the distribution control apparatus 7 transmits information related to a connection request to connect to the media distribution server 9(2) to the communication apparatus C at the site C (step S197). Then, the transmitting/receiving unit C1 of the communication apparatus C receives the information related to the connection request to connect to the media distribution server 9(2), which is transmitted from the distribution control apparatus 7. The connection request to connect to the media distribution server 9(2) includes the reception address information of the communication apparatus A at the site A.

Then, the transmitting/receiving unit C1 of the communication apparatus C transmits information for starting the reception of the media information of the site A to the media distribution server 9(2) (step S198). Then, the transmitting/receiving unit 91 of the media distribution server 9(2) receives the information for starting the reception of the media information of the site A, which is transmitted from the communication apparatus C.

Then, the transmitting/receiving unit 91 transmits the media information of the site A to the communication apparatus C (step S199). Then, the transmitting/receiving unit C1 of the communication apparatus C receives the media information of the site A transmitted from the media distribution server 9(2).

Then, the display control unit C4 of the communication apparatus C causes the display means of the communication apparatus C (in this case, the display 1007 of the communication terminal 10) to display the media information of the site A, which is received in step S199 (step S200).

Reconnection Process for Site B

Figure 21A:
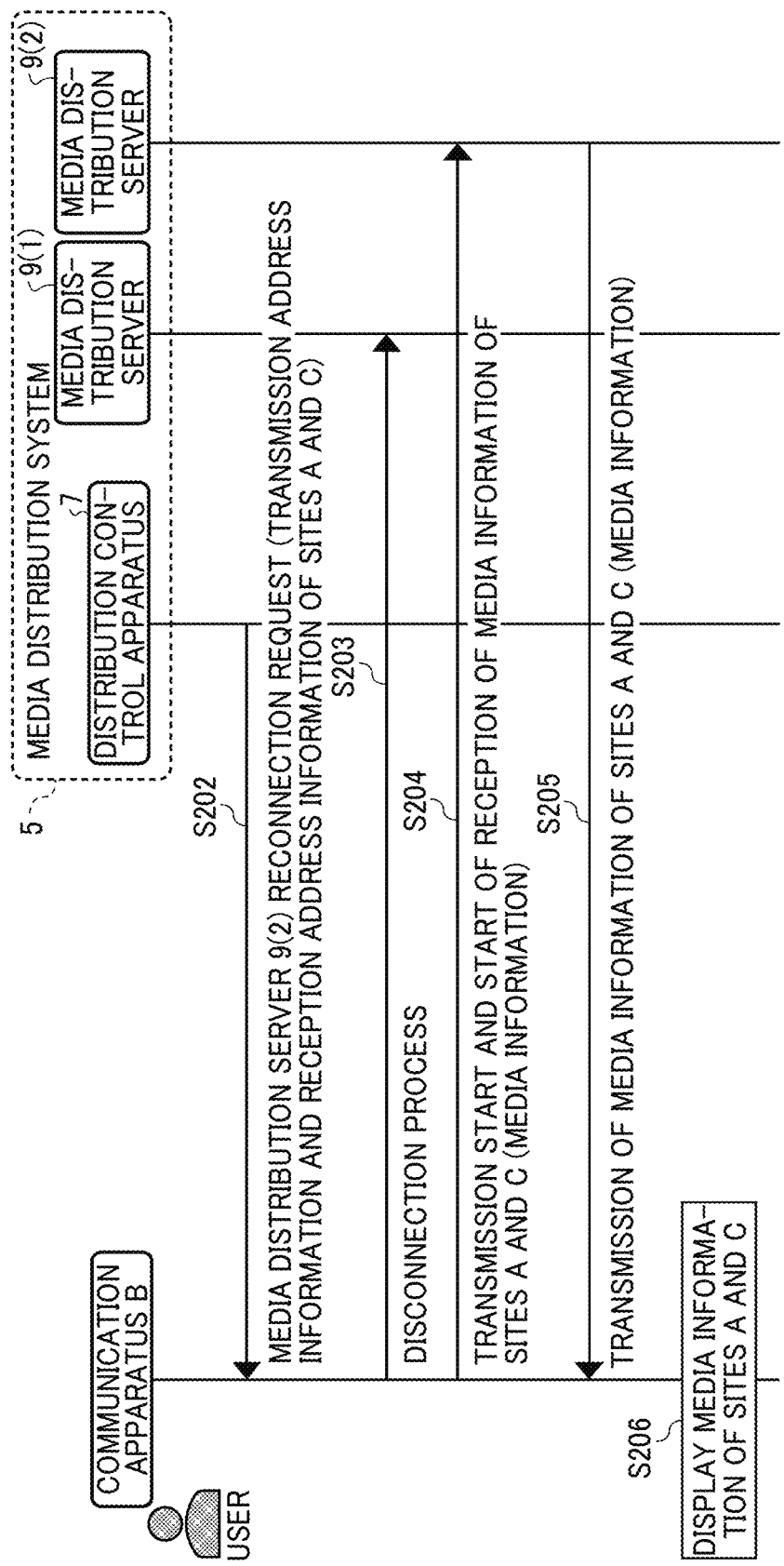
FIG. 21A is a sequence diagram illustrating an example of a reconnection process for the site B according to the first embodiment of the present disclosure.

Next, a reconnection process for the site B will be described. FIG. 21A is a sequence diagram illustrating an example of a reconnection process for the site B. First, the transmitting/receiving unit 71 of the distribution control apparatus 7 transmits information related to a request to reconnect to the media distribution server 9(2) to the communication apparatus B at the site B (step S202). Then, the transmitting/receiving unit B1 of the communication apparatus B receives the information related to the request to reconnect to the media distribution server 9(2), which is transmitted from the distribution control apparatus 7. The request to reconnect to the media distribution server 9(2) includes the transmission address information, the reception address information of the communication apparatus A at the site A, and the reception address information of the communication apparatus C at the site C.

Then, the processing activation unit B8 of the communication apparatus B operates in cooperation with the transmitting/receiving unit B1 to transmit information for a disconnection process to disconnect the current connection to the media distribution server 9(1) in response to the request to reconnect to the media distribution server 9(2) received in step S202 (step S203). Then, the transmitting/receiving unit 91 of the media distribution server 9(1) receives the information (data) for the disconnection process, which is transmitted from the communication apparatus B.

Then, the transmitting/receiving unit B1 of the communication apparatus B transmits information for starting the transmission of the media information to the newly connected media distribution server 9(2), and starts the reception of the media information of the site A and the media information of the site C (step S204). Then, the transmitting/receiving unit 91 of the media distribution server 9(2) receives the information for starting the transmission of the media information, which is transmitted from the communication apparatus B.

Then, the transmitting/receiving unit 91 transmits the media information of the site A and the media information of the site C to the communication apparatus B (step S205). Then, the transmitting/receiving unit B1 of the communication apparatus B receives the media information of the site A and the media information of the site C, which are transmitted from the media distribution server 9(2).

Then, the display control unit B4 of the communication apparatus B causes the display means of the communication apparatus B (in this case, the display 807 of the information processing apparatus 8) to display the media information of the site A and the media information of the site C, which are received in step S205 (step S206).

Figure 21B:
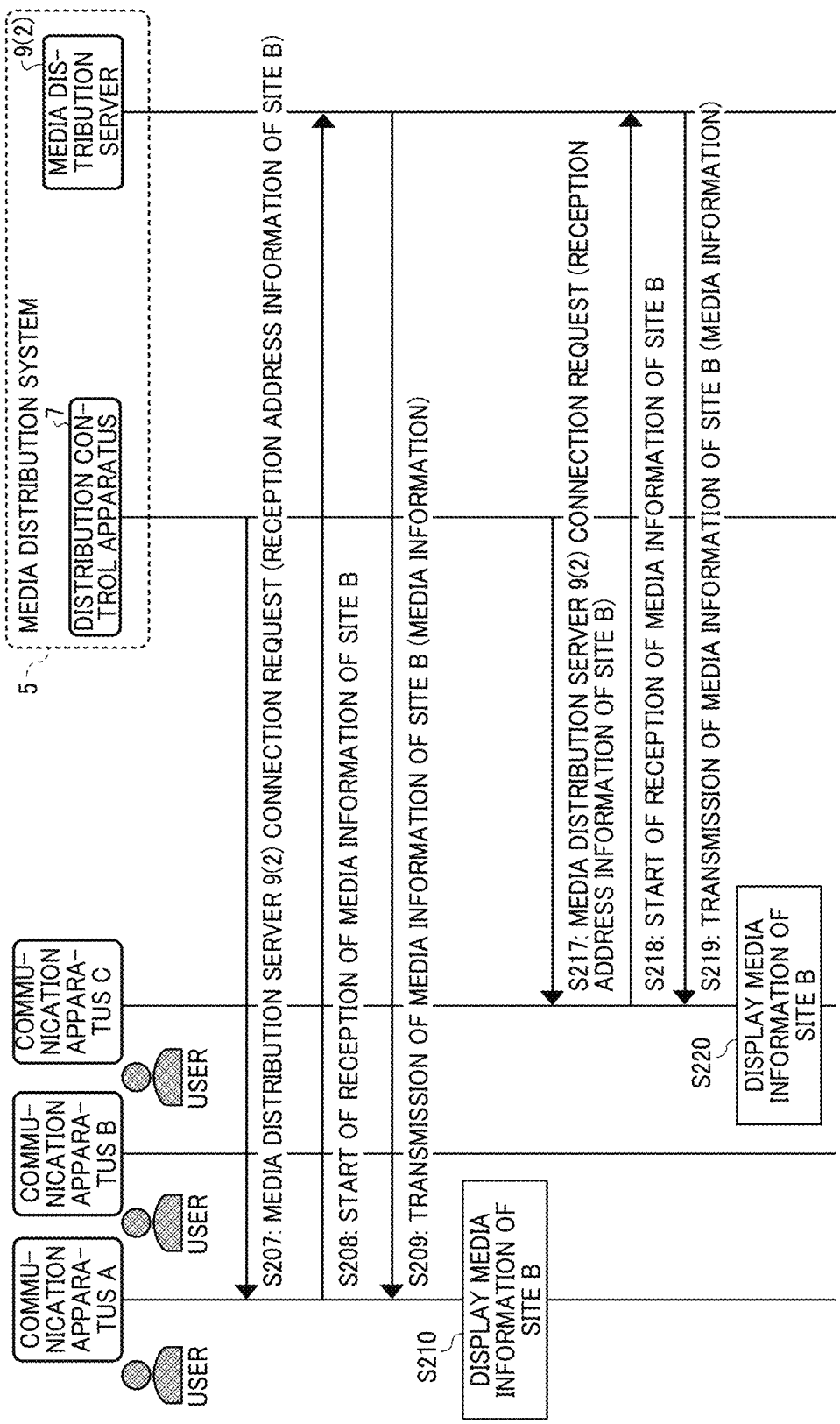
FIG. 21B is a sequence diagram illustrating the example of the reconnection process for the site B according to the first embodiment of the present disclosure.

The reconnection process for the site B will still be described. FIG. 21B is a sequence diagram illustrating the example of the reconnection process for the site B. The transmitting/receiving unit 71 of the distribution control apparatus 7 transmits information related to a connection request to connect to the media distribution server 9(2) to the communication apparatus A at the site A (step S207). Then, the transmitting/receiving unit A1 of the communication apparatus A receives the information related to the connection request to connect to the media distribution server 9(2), which is transmitted from the distribution control apparatus 7. The connection request to connect to the media distribution server 9(2) includes the reception address information of the communication apparatus B at the site B.

Then, the transmitting/receiving unit A1 of the communication apparatus A transmits information for starting the reception of the media information of the site B to the media distribution server 9(2) (step S208). Then, the transmitting/receiving unit 91 of the media distribution server 9(2) receives the information for starting the reception of the media information of the site B, which is transmitted from the communication apparatus A.

Then, the transmitting/receiving unit 91 transmits the media information of the site B to the communication apparatus A (step S209). Then, the transmitting/receiving unit A1 of the communication apparatus A receives the media information of the site B transmitted from the media distribution server 9(2).

Then, the display control unit A4 of the communication apparatus A causes the display means of the communication apparatus A (in this case, the display 407 of the display device 4) to display the media information of the site B, which is received in step S209 (step S210).

Then, the transmitting/receiving unit 71 of the distribution control apparatus 7 transmits information related to a connection request to connect to the media distribution server 9(2) to the communication apparatus C at the site C (step S217). Then, the transmitting/receiving unit C1 of the communication apparatus C receives the information related to the connection request to connect to the media distribution server 9(2), which is transmitted from the distribution control apparatus 7. The connection request to connect to the media distribution server 9(2) includes the reception address information of the communication apparatus B at the site B.

Then, the transmitting/receiving unit C1 of the communication apparatus C transmits information for starting the reception of the media information of the site B to the media distribution server 9(2) (step S218). Then, the transmitting/receiving unit 91 of the media distribution server 9(2) receives the information for starting the reception of the media information of the site B, which is transmitted from the communication apparatus C.

Then, the transmitting/receiving unit 91 transmits the media information of the site B to the communication apparatus C (step S219). Then, the transmitting/receiving unit C1 of the communication apparatus C receives the media information of the site B transmitted from the media distribution server 9(2).

Then, the display control unit C4 of the communication apparatus C causes the display means of the communication apparatus C (in this case, the display 1007 of the communication terminal 10) to display the media information of the site B, which is received in step S219 (step S220).

Example Display Screens

Figure 22C:
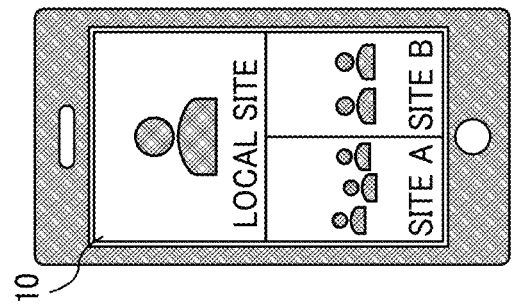
FIGS. 22A to 22C are views of an example screen of media information displayed on the display device, an example screen of media information displayed on the information processing apparatus, and an example screen of media information displayed on the communication terminal, respectively, according to the first embodiment of the present disclosure.
Figure 22B:
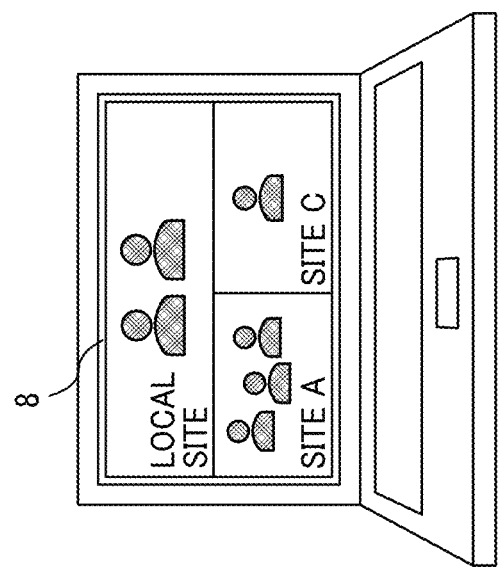
Figure 22A:
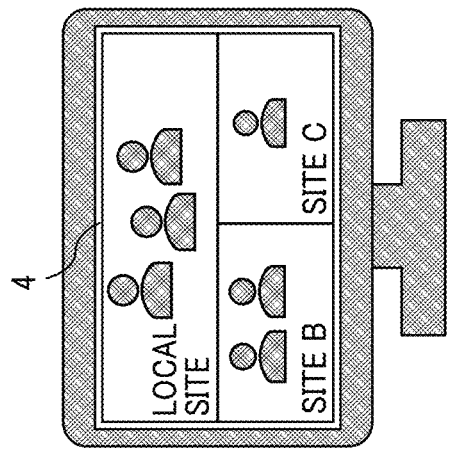

Next, screens of media information to be shared by the respective communication apparatuses at the sites A to C will be described. FIGS. 22A to 22C are views of an example screen of media information displayed on the display device 4, an example screen of media information displayed on the information processing apparatus 8, and an example screen of media information displayed on the communication terminal 10, respectively. In the example illustrated in FIG. 22A, the display 407 of the display device 4 is divided into three areas, and, of these areas, the area indicated by the indication "local site" displays the environmental state of the site A. The area indicated by the indication "site B" displays the environmental state of the site B. The area indicated by the indication "site C" displays the environmental state of the site C. In the example illustrated in FIG. 22B, the display 807 of the information processing apparatus 8 is divided into three areas, and, of these areas, the area indicated by the indication "local site" displays the environmental state of the site B. The area indicated by the indication "site A" displays the environmental state of the site A. The area indicated by the indication "site C" displays the environmental state of the site C. In the example illustrated in FIG. 22C, the display 1007 of the communication terminal 10 is divided into three areas, and, of these areas, the area indicated by the indication "local site" displays the environmental state of the site C. The area indicated by the indication "site A" displays the environmental state of the site A. The area indicated by the indication "site B" displays the environmental state of the site B. At this time, the audio generated at each of the sites A to C may be reproduced together with the screen displayed for the corresponding one of the sites A to C. While FIGS. 22A to 22C illustrate example screens displayed for three sites, namely, the sites A, B, and C, the number of sites is not limited to three. The media information in the displayed example screens described above is not limited to the environmental state of each site, and any image (video) or the like including any audio generated in any space may be displayed.

As described above, in this embodiment, the distribution control apparatus 7 searches the media distribution server management DB 7002 by using media distribution server identification information as a search key to read the corresponding maximum reserved bandwidth, and calculates the difference between the associated reserved bandwidth and the maximum reserved bandwidth (step S104). Then, the distribution control apparatus 7 selects and assigns a media distribution server based on a calculated available bandwidth (step S105), and transmits a connection request to connect to a distributable media distribution server 9 to the communication apparatus A at the site A (step S128). Then, the distributable media distribution server 9 transmits media information of a predetermined site in response to a request from a communication apparatus at another site (step S147). As a result, the following advantage is achieved: in the distribution of media information among a plurality of sites, even if a reserved bandwidth used across the sites that share the media information exceeds a predetermined bandwidth, the transmission and reception quality of the media information to be shared can be maintained.

In this embodiment, furthermore, an existing media distribution server in operation can be used to make a change to the reserved bandwidth of a room.

Second Embodiment

A second embodiment will be described with reference to FIGS. 23 to 26B. The second embodiment describes a media distribution system in which, in response to a change to the room reserved bandwidth, a new media distribution server is added and operated if no existing media distribution server supports a room having the changed reserved bandwidth. The system configuration and the hardware configuration of the media distribution system according to the second embodiment are similar to those of the first embodiment, and will not be described herein. A room management DB in the functional configuration according to the second embodiment has a different initial state from that of the first embodiment, which will be described in detail with reference to FIG. 23.

Room Management Table

FIG. 23 illustrates an example of a room management table. The storage unit 7000 includes a room management DB 7003. The room management DB 7003 includes the room management table illustrated in FIG. 23. The illustrated room management table has items similar to those illustrated in FIG. 11. In the second embodiment, the value of the reserved bandwidth corresponding to room identification information ("R0003") indicating the room 3 is 90 Mbps. That is, an extra capacity of 10 Mbps is provided for the media distribution server identification information ("M0092") corresponding to this reserved bandwidth, which indicates the media distribution server 9(2).

In this state, as in the first embodiment, the client 1 generates room 1 having a reserved bandwidth of 10 Mbps, and assigns the room 1 to the media distribution server 9(1). Then, the sites A and B are connected in sequence. When the site C is connected, information related to a request to change the reserved bandwidth is transmitted from the application server 3 to the distribution control apparatus 7. The details of this process will be described below.

Connection from Sites (Connection from Site C)

Figure 24A:
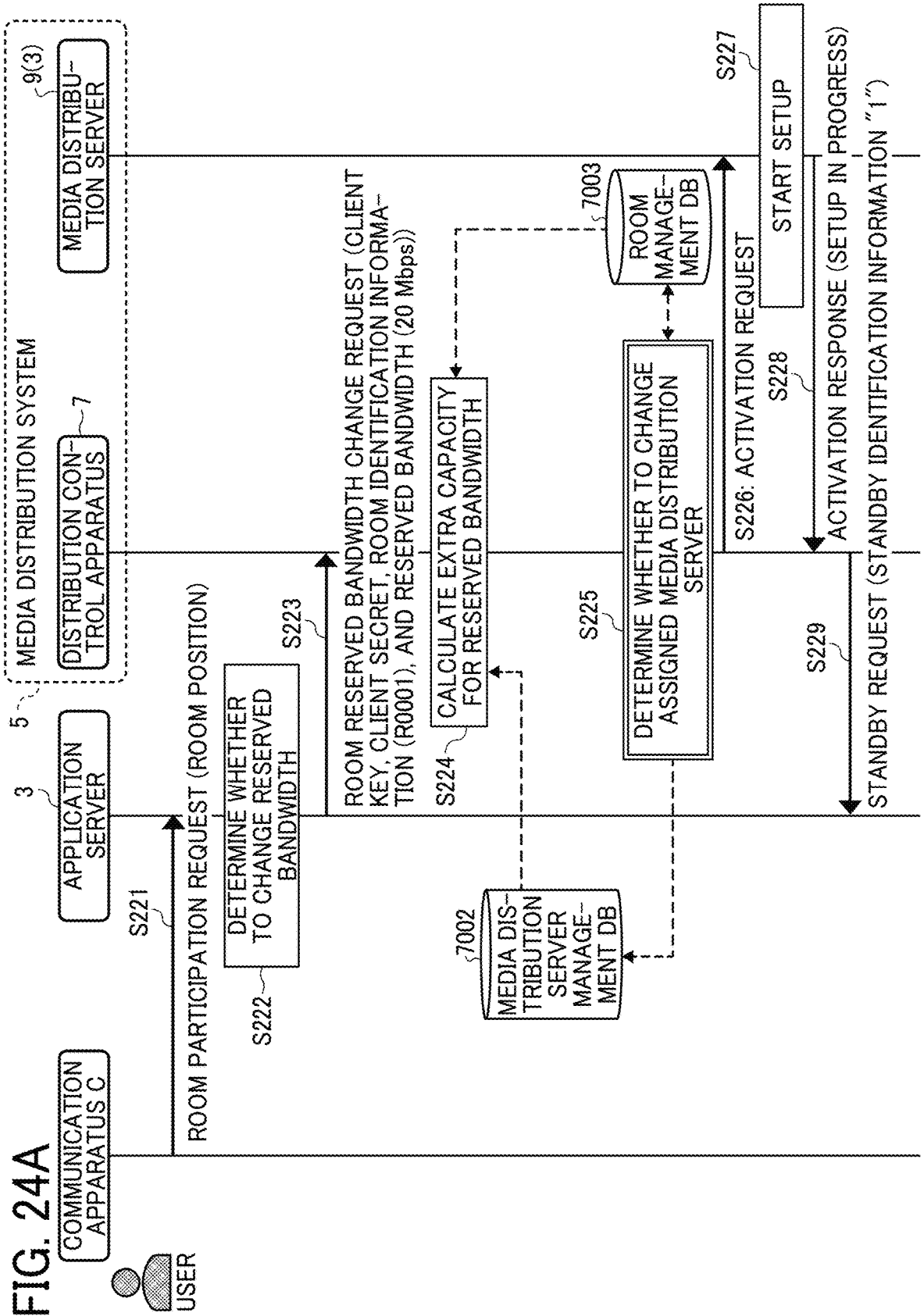
FIG. 24A is a sequence diagram illustrating an example of a connection process from the site C according to the second embodiment of the present disclosure.

Next, a connection process from the site C will be described. FIG. 24A is a sequence diagram illustrating an example of a connection process from the site C. In the sequence diagram illustrated in FIG. 24A, the processing of steps S221 to S224 is similar to the processing of steps S161 to S164 illustrated in FIG. 19A described above, and will not be described in detail herein.

Figure 24B:
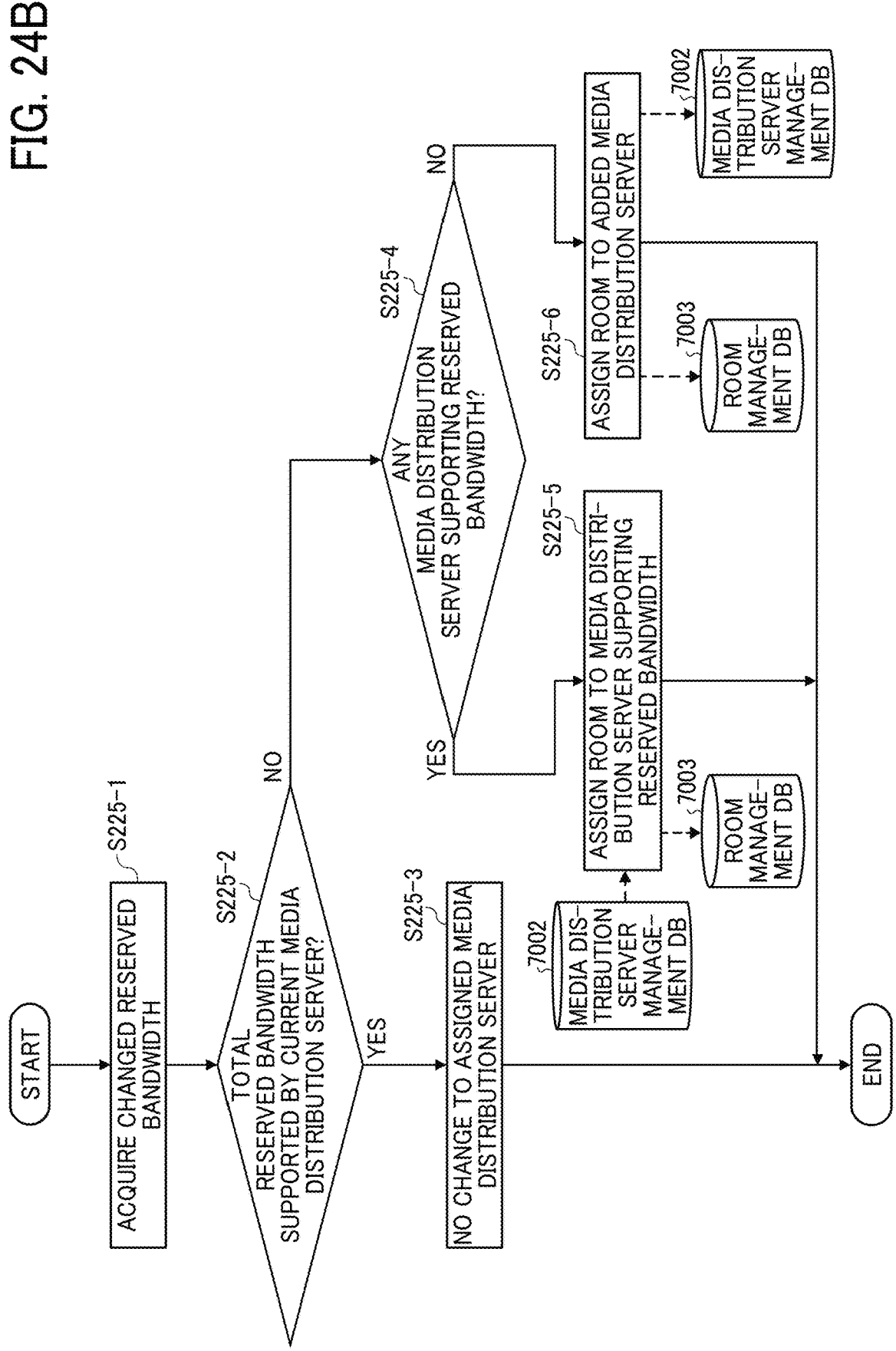
FIG. 24B is a flowchart illustrating an example of a process for determining whether to change an assigned media distribution server in response to a change to the room reserved bandwidth according to the second embodiment of the present disclosure.

Determination of Whether to Change Assigned Media Distribution Server in Response to Change to Room Reserved Bandwidth Then, the distribution control apparatus 7 determines whether to change the assigned media distribution server 9 (step S225). The determination of whether to change the assigned media distribution server 9 will be described hereinafter. FIG. 24B is a flowchart illustrating an example of a process for determining whether to change the assigned media distribution server 9 in response to a change to the room reserved bandwidth according to the second embodiment. First, the acquisition unit 72 acquires a reserved bandwidth that has been changed in response to a room participation request from each site (step S225-1).

Then, the determination unit 75 determines whether the total reserved bandwidth is supported by the currently assigned media distribution server (step S225-2). If the total reserved bandwidth is supported by the currently assigned media distribution server (step S225-2: YES), the selection and assignment unit 74 exits the process without changing the assigned media distribution server (i.e., while maintaining the currently assigned media distribution server) (step S225-3).

If the total reserved bandwidth is not supported by the currently assigned media distribution server (step S225-2: NO), the determination unit 75 determines whether any media distribution server supports the reserved bandwidth (step S225-4). If any media distribution server supports the reserved bandwidth (step S225-4: YES), the selection and assignment unit 74 assigns a room to the media distribution server supporting the reserved bandwidth, and exits the process (step S225-5). Specifically, the selection and assignment unit 74 operates in cooperation with the storing and reading unit 79 and searches the media distribution server management DB 7002 (see FIG. 10), based on the changed reserved bandwidth acquired in step S225-1, by using the current media distribution server identification information as a search key to read the corresponding maximum reserved bandwidth. Then, the selection and assignment unit 74 refers to the read maximum reserved bandwidth and assigns the room for which the participation request has been made to a media distribution server supporting the changed reserved bandwidth among the media distribution servers (the media distribution server identification information) managed in the room management DB 7003 (see FIG. 23). Then, the selection and assignment unit 74 exits the process.

If no media distribution server supports the reserved bandwidth (step S225-4: NO), the selection and assignment unit 74 adds a media distribution server and assigns the room for which the participation request has been made to the additional media distribution server (step S225-6). Then, the selection and assignment unit 74 exits the process. Specifically, the selection and assignment unit 74 adds a new media distribution server to the media distribution server management DB 7002 (see FIG. 10). Then, the selection and assignment unit 74 also adds the additional media distribution server to the room management DB 7003 (see FIG. 23), and assigns the room for which the participation request has been made to the room identification information corresponding to the media distribution server identification information of the additional media distribution server. Then, the selection and assignment unit 74 exits the process.

Referring back to FIG. 24A, the transmitting/receiving unit 71 of the distribution control apparatus 7 transmits information related to an activation request to a newly assigned (additional) media distribution server 9(3) (step S226). Then, the transmitting/receiving unit 91 of the media distribution server 9(3) receives the information related to the activation request transmitted from the distribution control apparatus 7.

Then, the execution unit 97 starts the setup of the media distribution server 9(3) (step S227).

Then, the transmitting/receiving unit 91 transmits to the distribution control apparatus 7 information related to an activation response to the information related to the activation request transmitted in step S226 (step S228). Then, the transmitting/receiving unit 71 of the distribution control apparatus 7 receives the information related to the activation response transmitted from the media distribution server 9(3). The activation response includes, for example, content indicating "setup in progress".

Then, the transmitting/receiving unit 71 of the distribution control apparatus 7 transmits information related to a standby request to the application server 3 (step S229). Then, the transmitting/receiving unit 31 of the application server 3 receives the information related to the standby request transmitted from the distribution control apparatus 7. In one example, the standby request includes standby identification information "1". The standby identification information "1" may be, for example, a flag indicating the standby identification information "1", which is set by the generation and signing unit 77 of the distribution control apparatus 7 based on the content "setup in progress" in the information related to the activation response received in step S228.

In the communication system 1 according to this embodiment, the processing of steps S226 and S228 described above may be executed with the intervention of another apparatus or the like between the distribution control apparatus 7 and the media distribution server 9(3), for example. That is, information (or data) may be transmitted and received between the distribution control apparatus 7 and the media distribution server 9(3) via another apparatus. The configuration described above is applicable even in a case where any other processing step is present between the distribution control apparatus 7 and the media distribution server 9(3).

As a result of the processing of step S225, the following content is added to the media distribution server management DB 7002 (see FIG. 10). At this point in time, the media distribution server management DB 7002 further includes the media distribution server identification information ("M0093"). Further, the items, namely, the maximum reserved bandwidth (100 Mbps), the address information ("sfu3@example.com"), and the state ("setup in progress") corresponding to the media distribution server identification information ("M0093"), are added to the media distribution server management DB 7002. The state "completion of setup" is managed as the states corresponding to the media distribution server identification information ("M0091" and "M0092").

Connection from Sites (Connection from Site C)

Figure 24C:
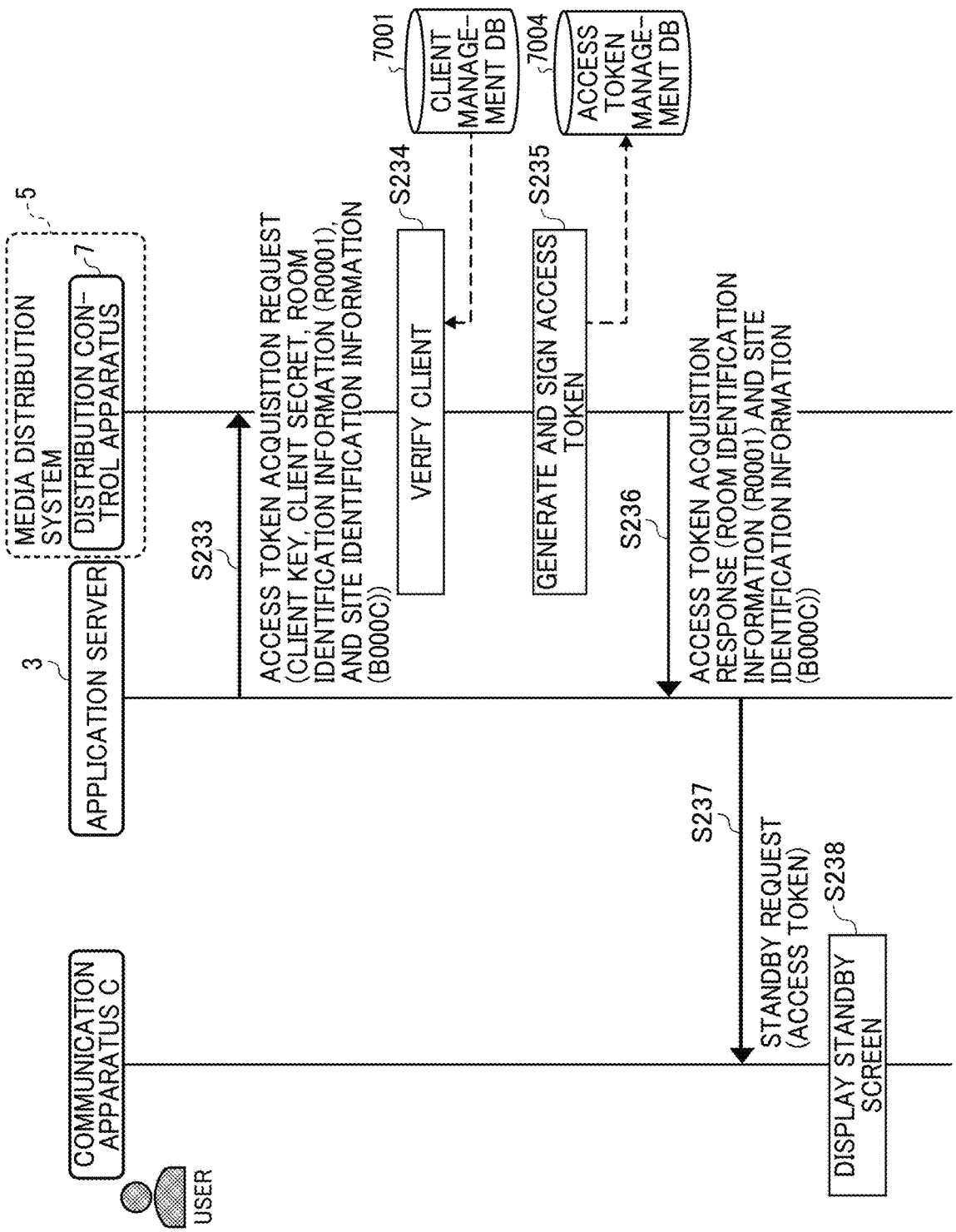
FIG. 24C is a sequence diagram illustrating an example of a connection process from the site C according to the second embodiment of the present disclosure.

FIG. 24C is a sequence diagram illustrating an example of a connection process from the site C according to the second embodiment. The processing of steps S233 to S236 in FIG. 24C is similar to the processing of steps S173 to S176 in FIG. 19C (the processing of steps S113 to S116 in FIG. 17A) described above, and will not be described in detail herein.

Then, the transmitting/receiving unit 31 of the application server 3 transmits information related to a standby request to the communication apparatus C (step S237). Then, the transmitting/receiving unit C1 of the communication apparatus C receives the information related to the standby request transmitted from the application server 3. The standby request includes the access token and a predetermined notification to be displayed on the standby screen.

Then, the display control unit C4 of the communication apparatus C causes the display means of the communication apparatus C (in this case, the display 1007 of the communication terminal 10) to display the predetermined notification received in step S237 (step S238).

Example Display Screens

Next, an example standby screen will be described. FIG. 24D is a view of an example standby screen displayed at the site C according to the second embodiment. The display 1007 of the communication terminal 10, which is an example of the communication apparatus C, displays a predetermined notification indicating the standby screen under the control of the display control unit C4. Examples of the predetermined notification include "Connection is not ready. Please wait". The display of the standby screen enables the user at the site C to grasp that the room participation request transmitted from the communication apparatus C is being processed.

Figure 24E:
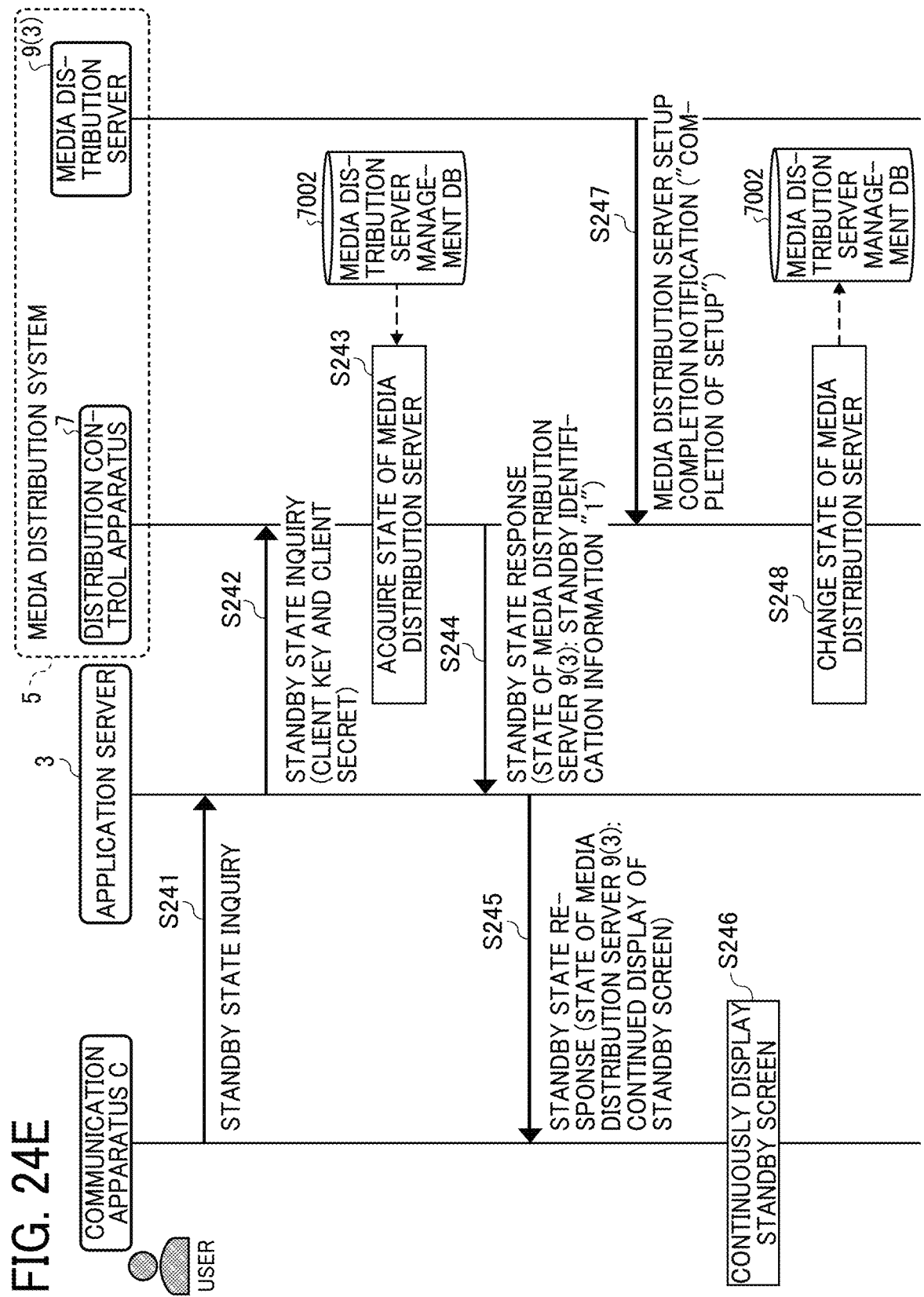
FIG. 24E is a sequence diagram illustrating the example of the connection process from the site C according to the second embodiment of the present disclosure.

The connection process from the site C will still be described. FIG. 24E is a sequence diagram illustrating the example of the connection process from the site C according to the second embodiment. First, the transmitting/receiving unit C1 of the communication apparatus C transmits information related to a standby state inquiry to the application server 3 (step S241). Then, the transmitting/receiving unit 31 of the application server 3 receives the information related to the standby state inquiry transmitted from the communication apparatus C.

Then, the transmitting/receiving unit 31 of the application server 3 transmits (or transfers) the information related to the standby state inquiry to the distribution control apparatus 7 (step S242). Then, the transmitting/receiving unit 71 of the distribution control apparatus 7 receives the information related to the standby state inquiry transmitted from the application server 3. The standby state inquiry includes the client key and the client secret.

Then, the acquisition unit 72 of the distribution control apparatus 7 refers to the media distribution server management DB 7002 (see FIG. 10) and acquires the maximum reserved bandwidth and the address information of each of the one or more media distribution servers 9 (step S243).

Then, the transmitting/receiving unit 71 transmits information related to a standby state response to the application server 3 as a response to the standby state inquiry received in step S242 (step S244). Then, the transmitting/receiving unit 31 of the application server 3 receives the information related to the standby state response transmitted from the distribution control apparatus 7. The standby state response includes information indicating the state of the media distribution server 9(3) (e.g., at least one of the state "setup in progress" and the standby identification information "1"). This means that the standby state for the communication apparatus C has continued at this time.

Then, the transmitting/receiving unit 31 of the application server 3 transmits information related to a standby state response to the communication apparatus C as a response to the standby state inquiry received in step S241 (step S245). Then, the transmitting/receiving unit C1 of the communication apparatus C receives the information related to the standby state response transmitted from the application server 3. The standby state response includes information related to a continuation of the standby screen indicating the state of the media distribution server 9(3).

Then, the display control unit C4 of the communication apparatus C causes the display 1007 of the communication terminal 10, which is an example of the communication apparatus C, to continuously display the content displayed in step S238 (step S246).

Upon completion of the setup of the media distribution server 9(3), the transmitting/receiving unit 91 of the media distribution server 9(3) transmits a media distribution server setup completion notification to the distribution control apparatus 7 (step S247). Then, the transmitting/receiving unit 71 of the distribution control apparatus 7 receives the media distribution server setup completion notification transmitted from the media distribution server 9(3). The media distribution server setup completion notification includes information indicating the state of the media distribution server 9(3) (e.g., "completion of setup").

In response to the media distribution server setup completion notification received in step S247, the state management unit 78 of the distribution control apparatus 7 changes the item "state" corresponding to the media distribution server identification information ("M0093"), which is managed in the media distribution server management DB 7002 (see FIG. 10), from "setup in progress" to "completion of setup" and registers the changed item (step S248).

Figure 24F:
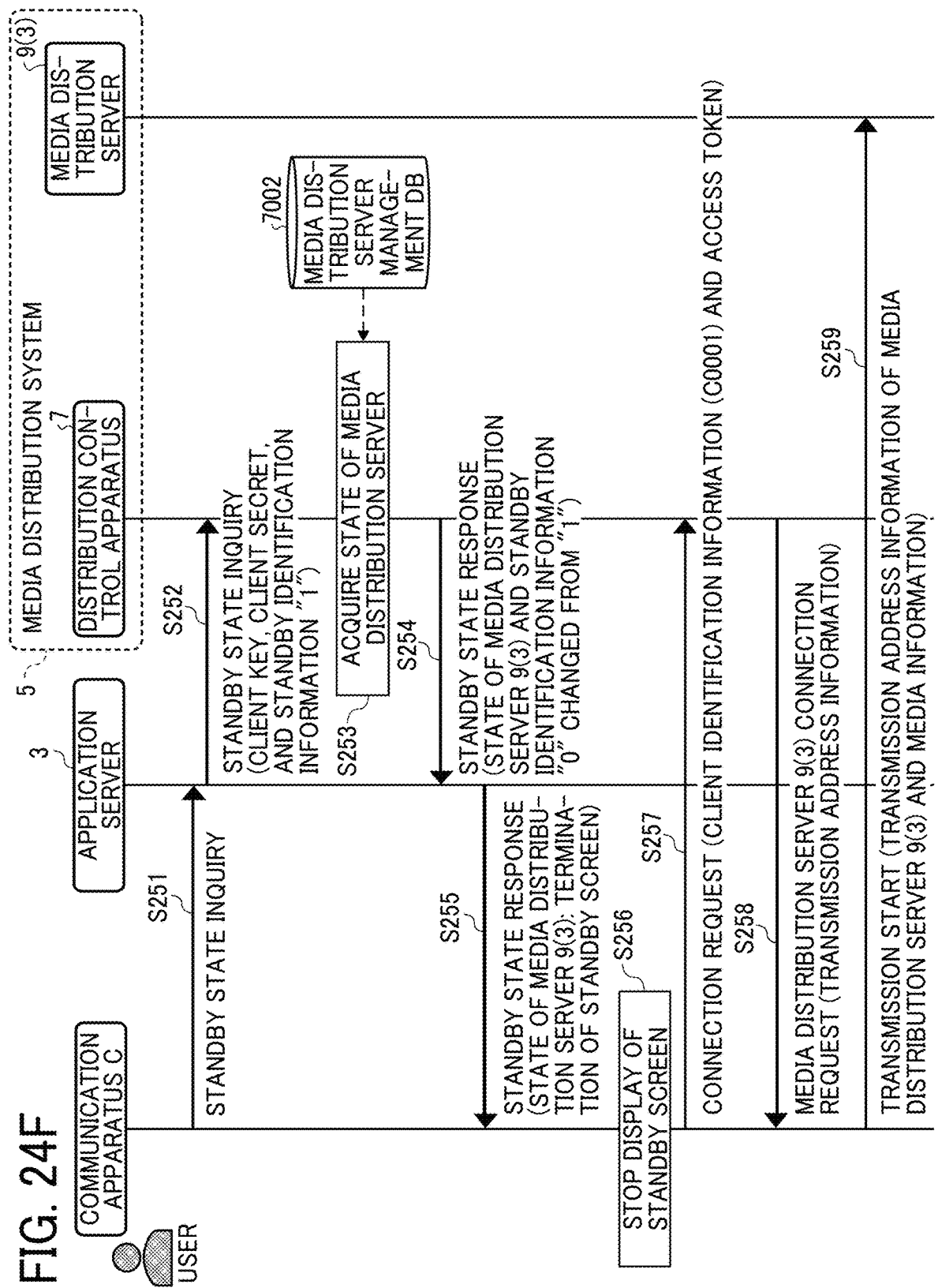
FIG. 24F is a sequence diagram illustrating the example of the connection process from the site C according to the second embodiment of the present disclosure.

The connection process from the site C will still be described. FIG. 24F is a sequence diagram illustrating the example of the connection process from the site C according to the second embodiment. In FIG. 24F, the processing of steps S251 to S253 is similar to the processing of steps S241 to S243 illustrated in FIG. 24E, and will not be described in detail herein. The processing of step S251 and the subsequent steps is repeatedly performed if the response to the standby state inquiry transmitted in step S241 described above indicates continuation of the standby state.

Then, the transmitting/receiving unit 71 transmits information related to a standby state response to the application server 3 as a response to the standby state inquiry received in step S252 (step S254). Then, the transmitting/receiving unit 31 of the application server 3 receives the information related to the standby state response transmitted from the distribution control apparatus 7. The standby state response includes information indicating the state of the media distribution server 9(3) (e.g., at least one of the state "completion of setup" and the standby identification information "0"). This means that the standby state for the communication apparatus C has been canceled at this time such that the communication apparatus C becomes available for connection.

Then, the transmitting/receiving unit 31 of the application server 3 transmits information related to a standby state response to the communication apparatus C as a response to the standby state inquiry received in step S251 (step S255). Then, the transmitting/receiving unit C1 of the communication apparatus C receives the information related to the standby state response transmitted from the application server 3. The standby state response includes information related to the termination of the standby screen indicating the state of the media distribution server 9(3).

Then, the display control unit C4 of the communication apparatus C causes the display 1007 of the communication terminal 10, which is an example of the communication apparatus C, to terminate the display of the standby screen (see FIG. 24D) (step S256).

Then, the transmitting/receiving unit C1 of the communication apparatus C transmits information related to a connection request to the distribution control apparatus 7 (step S257). Then, the transmitting/receiving unit 71 of the distribution control apparatus 7 receives the information related to the connection request transmitted from the communication apparatus C. The connection request includes the client identification information ("C0001") indicating the client 1, and an access token including room identification information and site identification information.

The states "setup in progress" and "completion of setup", which indicate states of the media distribution server 9(3) described above, may be provided (transmitted) to an external device or displayed by the external device in response to receipt of an inquiry from the external device. This makes it possible to sequentially notify end users including a user who uses each site of the status of the setup process and prompt the end users to wait during the setup process.

Then, the transmitting/receiving unit 71 of the distribution control apparatus 7 transmits information related to a connection request to connect to the media distribution server 9(3) to the communication apparatus C (step S258). Then, the transmitting/receiving unit C1 of the communication apparatus C receives the information related to the connection request to connect to the media distribution server 9(3), which is transmitted from the distribution control apparatus 7. The connection request to connect to the media distribution server 9(3) includes the transmission address information.

Then, the transmitting/receiving unit C1 of the communication apparatus C starts the transmission of the media information to the media distribution server 9(3) (step S259). Then, the transmitting/receiving unit 91 of the media distribution server 9(3) receives the media information transmitted from the communication apparatus C. The media information includes the transmission address information of the media distribution server 9(3) and predetermined media information.

Reconnection Process for Site A

Figure 25:
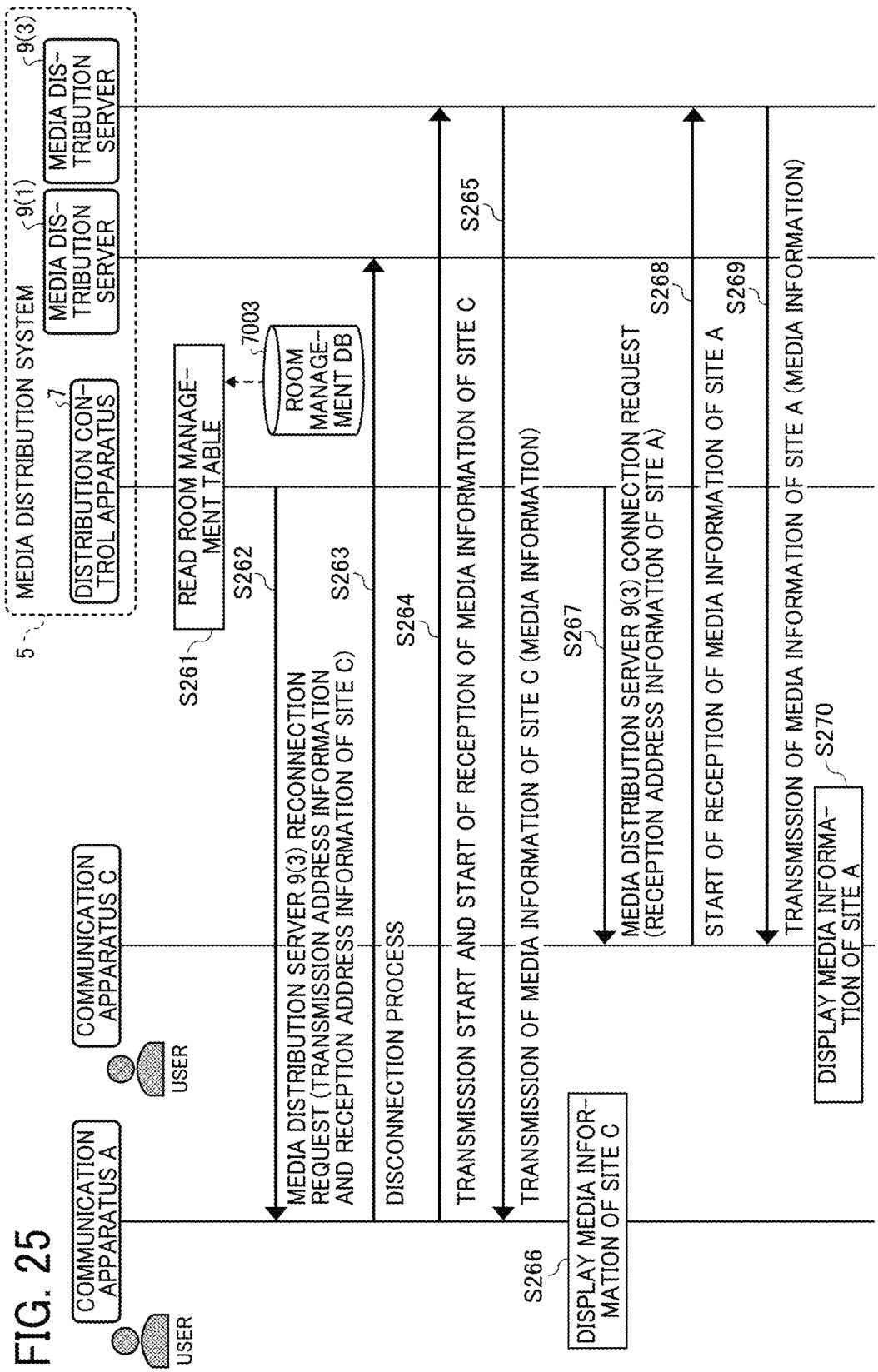
FIG. 25 is a sequence diagram illustrating an example of a reconnection process for the site A according to the second embodiment of the present disclosure.

Next, a reconnection process for the site A will be described. FIG. 25 is a sequence diagram illustrating an example of a reconnection process for the site A according to the second embodiment. The processing of steps S261 to S270 in FIG. 25 is performed in a similar manner as the processing of steps S191 to S200 in FIG. 20 described above, except that the media distribution server to be connected is changed from the media distribution server 9(2) to the media distribution server 9(3), and will not be described in detail herein.

Reconnection Process for Site B

Figure 26A:
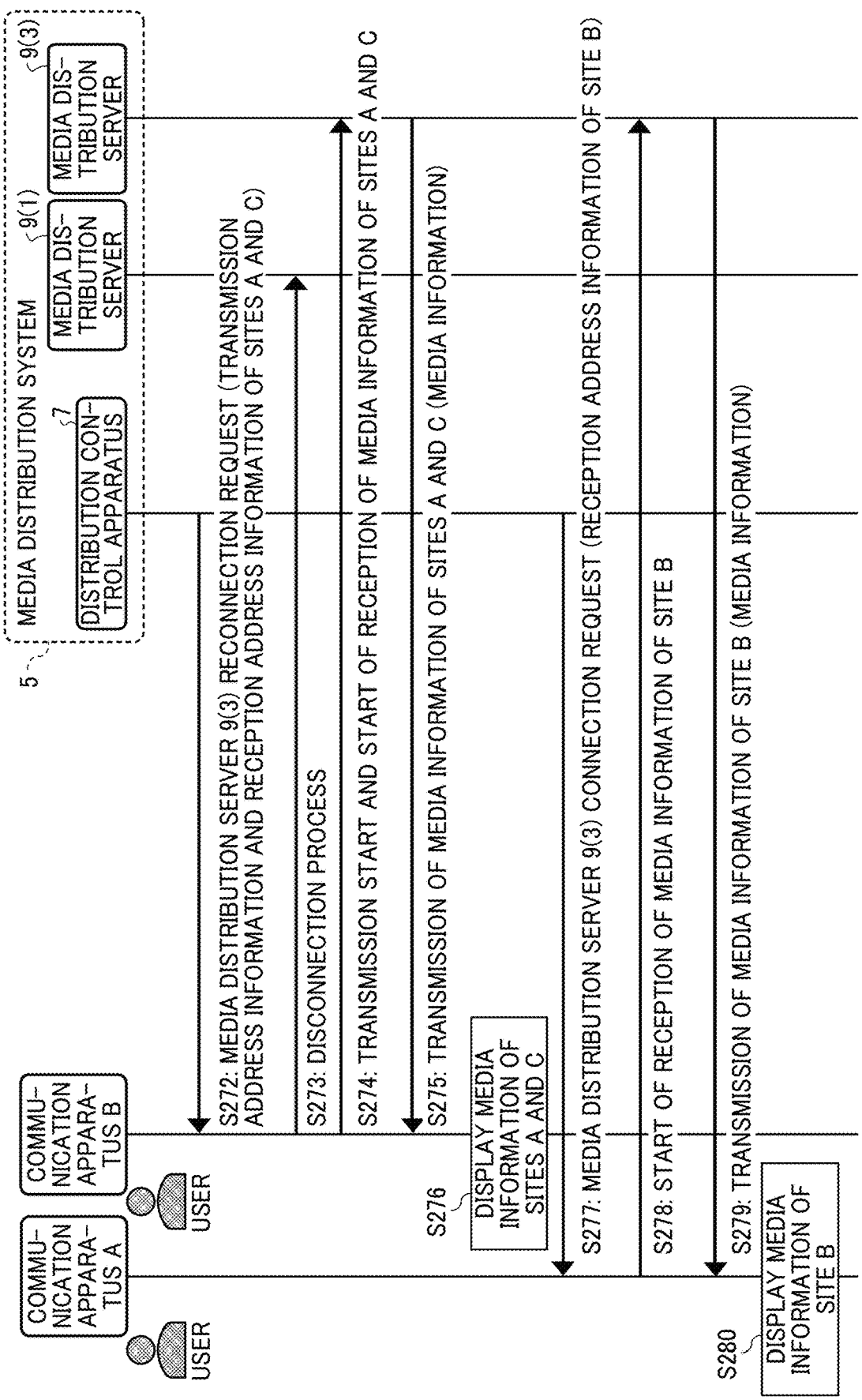
FIG. 26A is a sequence diagram illustrating an example of a reconnection process for the site B according to the second embodiment of the present disclosure.

Next, a reconnection process for the site B will be described. FIG. 26A is a sequence diagram illustrating an example of a reconnection process for the site B according to the second embodiment. The processing of steps S272 to S276 in FIG. 26A is similar to the processing of steps S202 to S206 in FIG. 21A described above, except that the media distribution server to be connected is changed from the media distribution server 9(2) to the media distribution server 9(3), and will not be described in detail herein.

Further, the processing of steps S277 to S280 in FIG. 26A is similar to the processing of steps S207 to S210 in FIG. 21B described above, except that the media distribution server to be connected is changed from the media distribution server 9(2) to the media distribution server 9(3), and will not be described in detail herein.

Figure 26B:
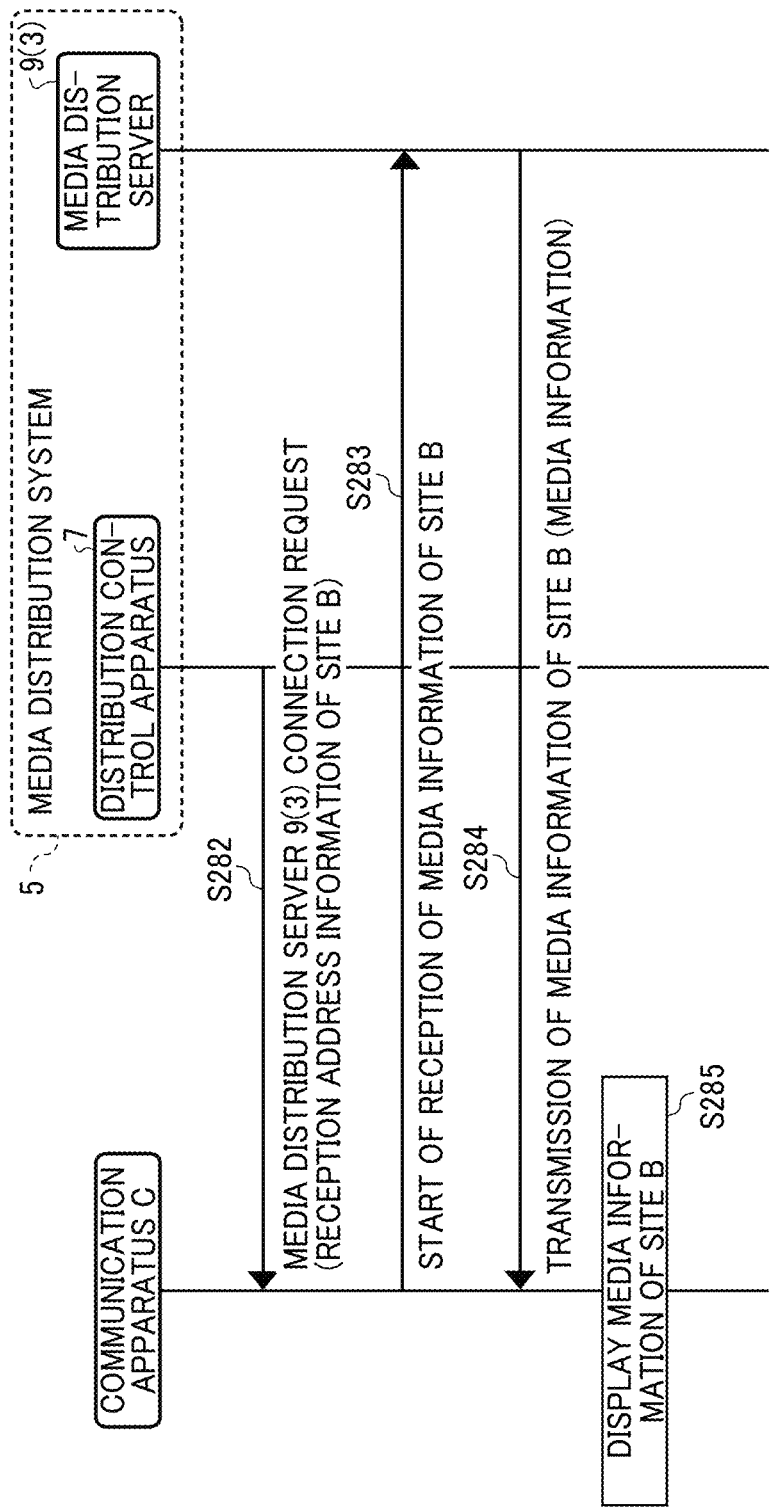
FIG. 26B is a sequence diagram illustrating the example of the reconnection process for the site B according to the second embodiment of the present disclosure.

The reconnection process for the site B will still be described. FIG. 26B is a sequence diagram illustrating the example of the reconnection process for the site B according to the second embodiment. The processing of steps S282 to S285 in FIG. 26B is similar to the processing of steps S217 to S220 in FIG. 21B described above, except that the media distribution server to be connected is changed from the media distribution server 9(2) to the media distribution server 9(3), and will not be described in detail herein.

As a result of the processes described above in the second embodiment, the following content is added to the room management DB 7003 (see FIG. 23). At this point in time, the room management DB 7003 further includes the client identification information ("C0001"). Further, the items, namely, the room identification information ("R0001"), the reserved bandwidth ("20 Mbps"), the media distribution server identification information ("M0093"), and the site identification information ("B000A", "B000B", and "B000C") corresponding to the client identification information ("C0001"), are added to the room management DB 7003. The other items corresponding to the client identification information are as illustrated in FIG. 11, and will not be described herein.

As described above, in this embodiment, in response to a change to the room reserved bandwidth, a new media distribution server is added, assigned a predetermined room, and operated if no existing media distribution server supports the reserved bandwidth for the use of the room (step S225-6). As a result, in addition to the advantages of the first embodiment, the following advantage is achieved that a user at each site is able to make a request to participate in a room via a communication apparatus without concern for the reserved bandwidth, resulting in improved usability in the communication system.

Third Embodiment

A third embodiment will be described with reference to FIGS. 27 to 34B. The third embodiment describes a media distribution system in which, in response to a change to the room reserved bandwidth, although no existing media distribution server supports a room having the changed reserved bandwidth, another room is moved to another media distribution server such that the reserved bandwidth can be supported by the media distribution server.

Figure 27:
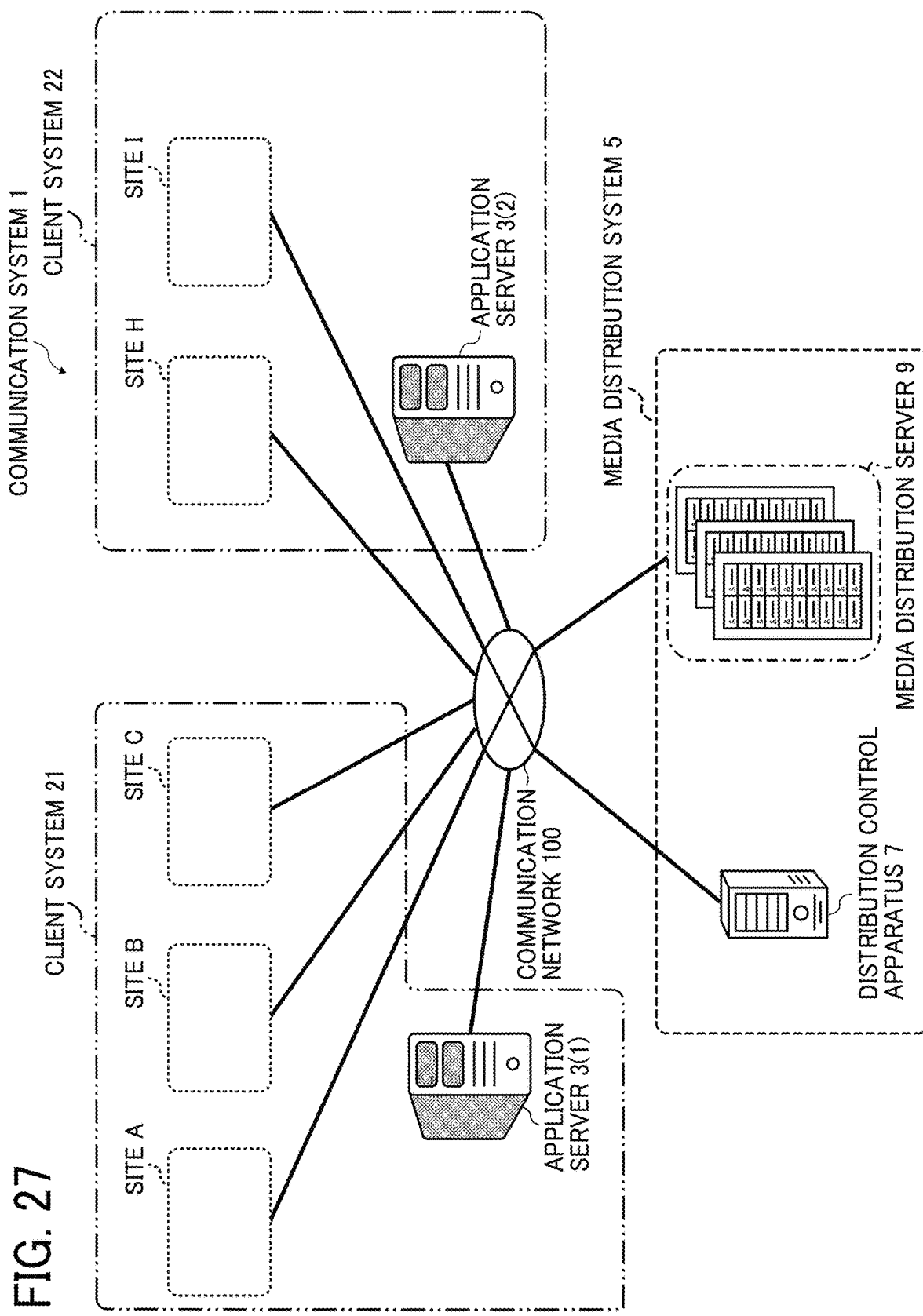
FIG. 27 is a diagram illustrating an example general arrangement of a communication system according to a third embodiment of the present disclosure.

FIG. 27 is a diagram illustrating an example general arrangement of a communication system 1 according to a third embodiment. Unlike the first embodiment and the second embodiment, the communication system 1 according to the third embodiment includes a client system 21 and a client system 22 for respective clients. Each of the client system 21 and the client system 22 has a pair of an application server and a predetermined collective site (room) including one or more sites. The hardware configuration and the functional configuration of each apparatus according to the third embodiment are similar to those of the first embodiment, and will not be described herein.

The third embodiment provides three media distribution servers 9. A media distribution server 9(1) is assigned room 2 ("90 Mbps"), a media distribution server 9(2) is assigned room 3 ("80 Mbps") and room 4 ("10 Mbps"), and a media distribution server 9(3) is assigned room 5 ("90 Mbps"). That is, in one example, the media distribution server management DB 7002 (see FIG. 10) and the room management DB 7003 (see FIG. 11) initially manage the following content.

A media management server management table (the media distribution server management DB 7002) includes:
  media distribution server identification information ("M0091") associated with the maximum reserved bandwidth "100 Mbps", the address information "sfu1@example.com", and the state "completion of setup";
  media distribution server identification information ("M0092") associated with the maximum reserved bandwidth "100 Mbps", the address information "sfu2@example.com", and the state "completion of setup"; and
  media distribution server identification information ("M0093") associated with the maximum reserved bandwidth "100 Mbps", the address information "sfu3@example.com", and the state "completion of setup".

A room management table (the room management DB 7003) includes:
  client identification information ("C0002") associated with the room identification information "R0002", the reserved bandwidth "90 Mbps", the media distribution server identification information "M0091", and the site identification information "B000D and B000E";
  client identification information ("C0002") associated with the room identification information "R0003", the reserved bandwidth "80 Mbps", the media distribution server identification information "M0091", and the site identification information "B000F and B000G";
  client identification information ("C0002") associated with the room identification information "R0004", the reserved bandwidth "10 Mbps", the media distribution server identification information "M0091", and the site identification information "B000H and B000I"; and
  client identification information ("C0003") associated with the room identification information "R0005", the reserved bandwidth "90 Mbps", the media distribution server identification information "M0091", and the site identification information "B000J and B000K".

In this state, as in the first embodiment, the client 1 generates room 1 having a reserved bandwidth of 10 Mbps, and assigns the room 1 to the media distribution server 9(1). Then, the sites A and B are connected in sequence. When the site C is connected, information related to a request to change the reserved bandwidth is transmitted from an application server 3(1) to the distribution control apparatus 7. The details of this process will be described below.

Connection from Sites (Connection from Site C)

Next, a connection process from the site C will be described. FIG. 28A is a sequence diagram illustrating an example of a connection process from the site C according to the third embodiment. In the sequence diagram illustrated in FIG. 28A, the processing of steps S301 to S304 and S306 is similar to the processing of steps S221 to S224 in FIG. 24A (the processing of step S161 to step S164 in FIG. 19A) and the processing of S229 in FIG. 24A, described above, and will not be described in detail herein.

Figure 28B:
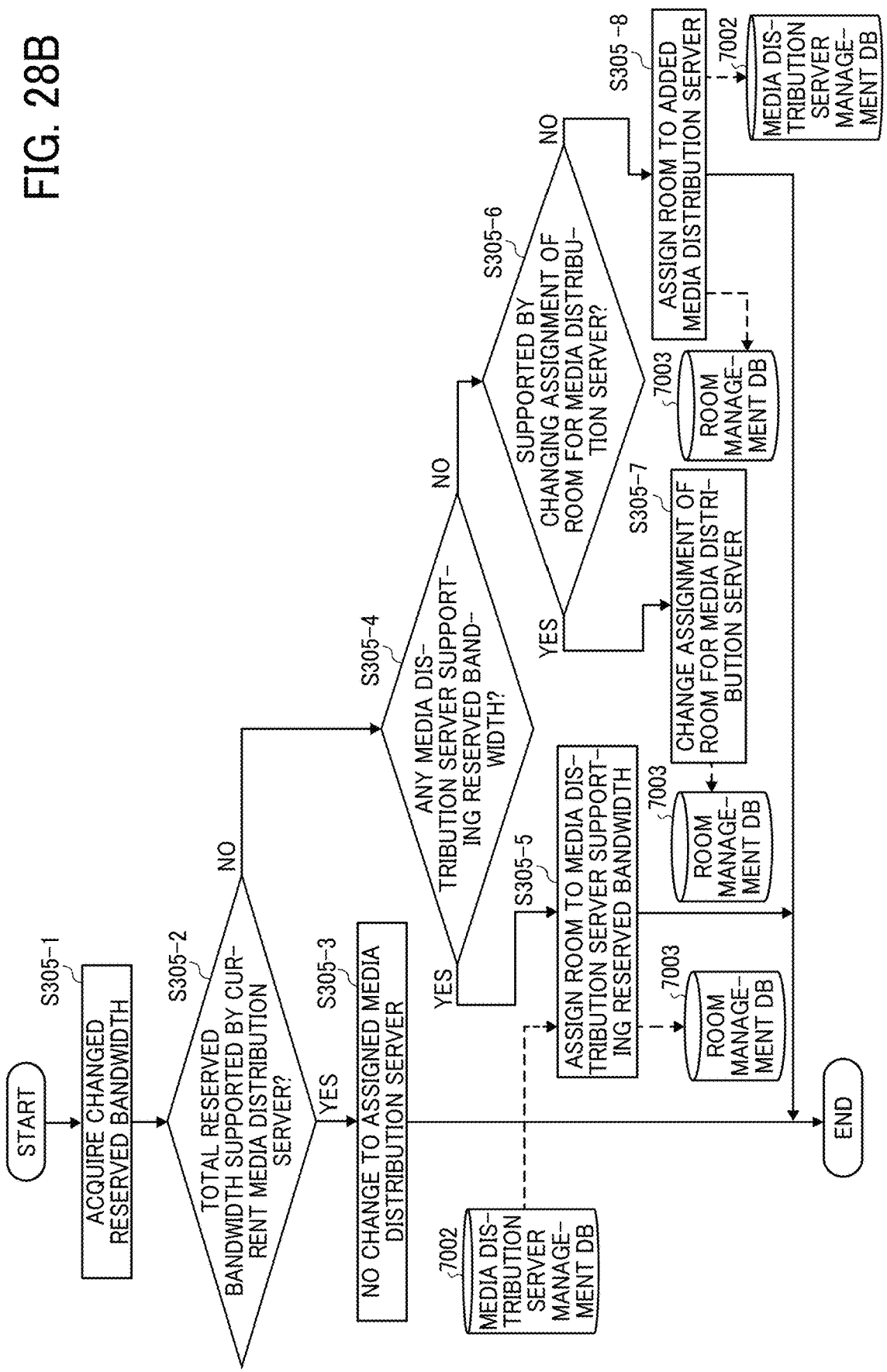
FIG. 28B is a flowchart illustrating an example of a process for determining whether to change an assigned media distribution server in response to a change to the room reserved bandwidth according to the third embodiment of the present disclosure.

Determination of Whether to Change Assigned Media Distribution Server in Response to Change to Room Reserved Bandwidth The process for determining whether to change the assigned media distribution server will now be described. After executing the process of for calculating the extra capacity for the reserved bandwidth in step S304, the distribution control apparatus 7 determines whether to change the assigned media distribution server 9 (step S305). The determination of whether to change the assigned media distribution server 9 will be described hereinafter. FIG. 28B is a flowchart illustrating an example of a process for determining whether to change the assigned media distribution server 9 in response to a change to the room reserved bandwidth according to the third embodiment. First, the acquisition unit 72 acquires a reserved bandwidth that has been changed in response to a room participation request from each site (step S305-1).

Then, the determination unit 75 determines whether the total reserved bandwidth is supported by the currently assigned media distribution server (step S305-2). If the total reserved bandwidth is supported by the currently assigned media distribution server (step S305-2: YES), the selection and assignment unit 74 exits the process without changing the assigned media distribution server (i.e., while maintaining the currently assigned media distribution server) (step S305-3).

If the total reserved bandwidth is not supported by the currently assigned media distribution server (step S305-2: NO), the determination unit 75 determines whether any media distribution server supports the reserved bandwidth (step S305-4). If any media distribution server supports the reserved bandwidth (step S305-4: YES), the selection and assignment unit 74 assigns a room to the media distribution server supporting the reserved bandwidth, and exits the process (step S305-5). Specifically, the selection and assignment unit 74 operates in cooperation with the storing and reading unit 79 and searches the media distribution server management DB 7002 (see FIG. 10), based on the changed reserved bandwidth acquired in step S305-1, by using the current media distribution server identification information as a search key to read the corresponding maximum reserved bandwidth. Then, the selection and assignment unit 74 refers to the read maximum reserved bandwidth and assigns the room for which the participation request has been made to a media distribution server supporting the changed reserved bandwidth among the media distribution servers (the media distribution server identification information) managed in the room management DB 7003 (see FIG. 23). Then, the selection and assignment unit 74 exits the process. In this example, it is assumed that the room management DB 7003 stores information, as described in the case of third embodiment.

If no media distribution server supports the reserved bandwidth (step S305-4: NO), the determination unit 75 further determines whether the reserved bandwidth is supported by changing the assignment of the room for the media distribution server (step S305-6). If the reserved bandwidth is supported by changing the assignment of the room for the media distribution server (step S305-6: YES), the selection and assignment unit 74 changes the assignment of the room for the media distribution server, and exits the process (step S305-7). Specifically, the selection and assignment unit 74 moves the room 4, which is managed in the room management DB 7003 described above (see FIG. 23), from the media distribution server 9(2) to the media distribution server 9(3). In the processing of step S305-7 after the determination in step S305-6 described above, none of the media distribution servers 9(1), 9(2), and 9(3) supports a reserved bandwidth of 20 Mbps, and the selection and assignment unit 74 can recognize that the room 4 (with a reserved bandwidth of 10 Mbps) can be moved to the media distribution server 9(3) (with the use of a reserved bandwidth of 90 Mbps). In addition, the selection and assignment unit 74 moves the room 3 from the media distribution server 9(2). Then, the extra capacity for the reserved bandwidth of the media distribution server 9(2) is given by 100–80=20 Mbps. As a result, the reserved bandwidth of the room 1, which is expanded to 20 Mbps, is supported by the media distribution server 9(2).

If the reserved bandwidth is not supported even by changing the assignment of the room for the media distribution server (step S305-6: NO), the selection and assignment unit 74 adds a media distribution server and assigns the room for which the participation request has been made to the additional media distribution server (step S305-8). Then, the selection and assignment unit 74 exits the process. Specifically, the selection and assignment unit 74 adds a new media distribution server (e.g., a media distribution server 9(4)) to the media distribution server management DB 7002 (see FIG. 10). Then, the selection and assignment unit 74 also adds the additional media distribution server 9(4) to the room management DB 7003 (see FIG. 23), and assigns, as the room for which the participation request has been made, the room identification information (i.e., the room) corresponding to the media distribution server identification information indicating the additional media distribution server 9(4). Then, the selection and assignment unit 74 exits the process.

Figure 28C:
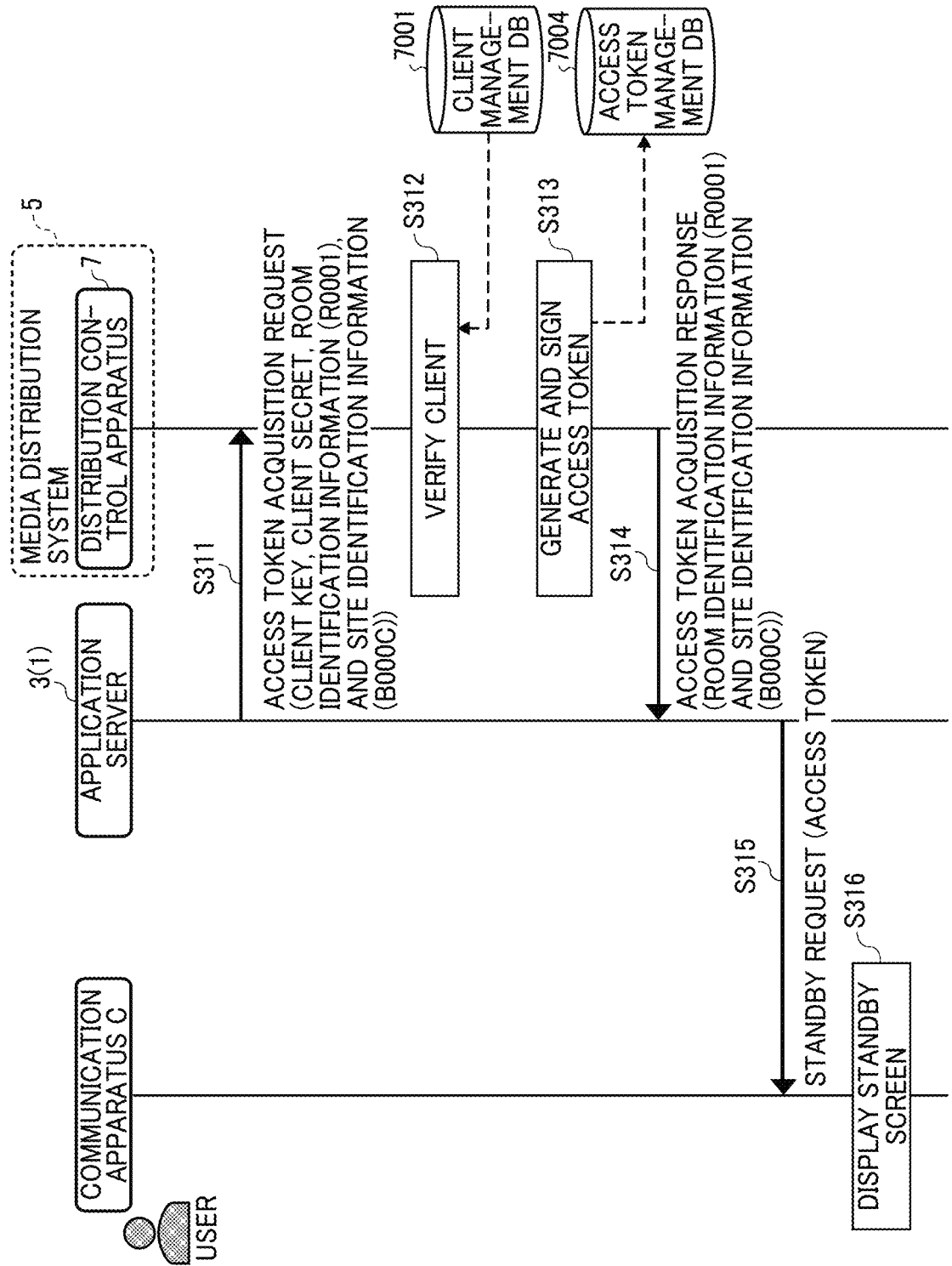
FIG. 28C is a sequence diagram illustrating the example of the connection process from the site C according to the third embodiment of the present disclosure.

The connection process from the site C will still be described. FIG. 28C is a sequence diagram illustrating the example of the connection process from the site C according to the third embodiment. The processing of steps S311 to S316 in FIG. 28C is similar to the processing of steps S233 to S238 in FIG. 24C described above, and will not be described in detail herein.

Reconnection Process for Site H

Next, a reconnection process for site H will be described. FIG. 29 is a sequence diagram illustrating an example of a reconnection process for the site H according to the third embodiment. The processing of steps S321 to S324 in FIG. 29 is substantially the same as the processing of steps S261 to S264 in FIG. 25 described above, except that the communication apparatus included in the site is changed from the communication apparatus A to the communication apparatus H and the media distribution server to be disconnected is changed from the media distribution server (1) (the media distribution server 9(1)) to the media distribution server 9(2), and will not be described in detail herein.

Standby State Inquiry from Each Site (Standby State Inquiry from Site C)

Figure 30:
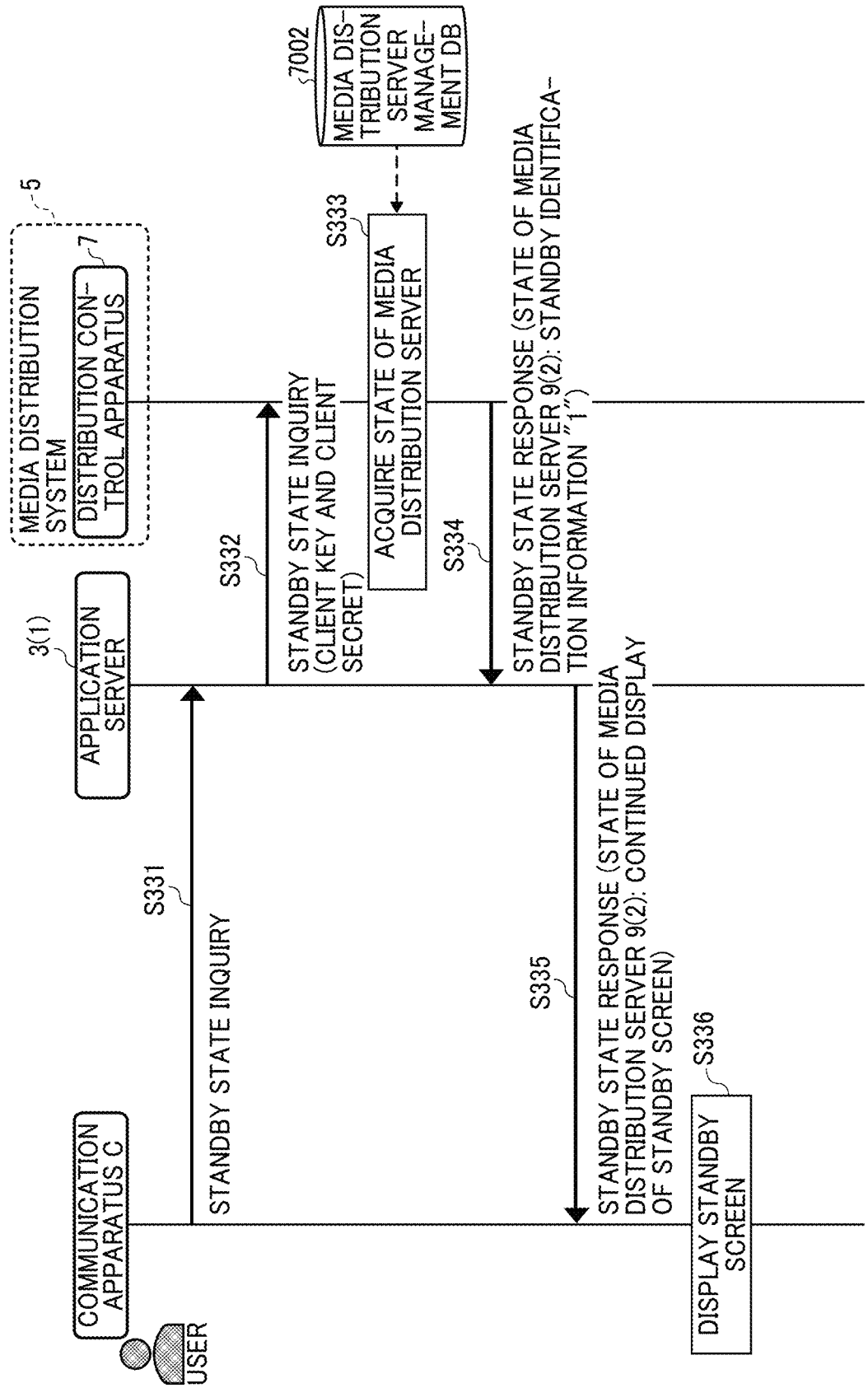
FIG. 30 is a sequence diagram illustrating an example of a standby state inquiry process from the site C according to the third embodiment of the present disclosure.

Next, a standby state inquiry process from the site C will be described. FIG. 30 is a sequence diagram illustrating an example of a standby state inquiry process from the site C according to the third embodiment. The processing of steps S331 to S336 in FIG. 30 is substantially the same as the processing of steps S241 to S246 in FIG. 24E described above, except that the media distribution server of which the standby state is inquired is changed from the media distribution server 9(3) to the media distribution server 9(2), and will not be described in detail herein.

Through the various processes described above in the third embodiment, the state corresponding to the media distribution server identification information ("M0092") in the media distribution server management DB 7002 (see FIG. 10) is registered and managed as, for example, "room assignment being changed". The states corresponding to the other pieces of media distribution server identification information are maintained as the state "completion of setup".

Reconnection Process for Site I

Figure 31:
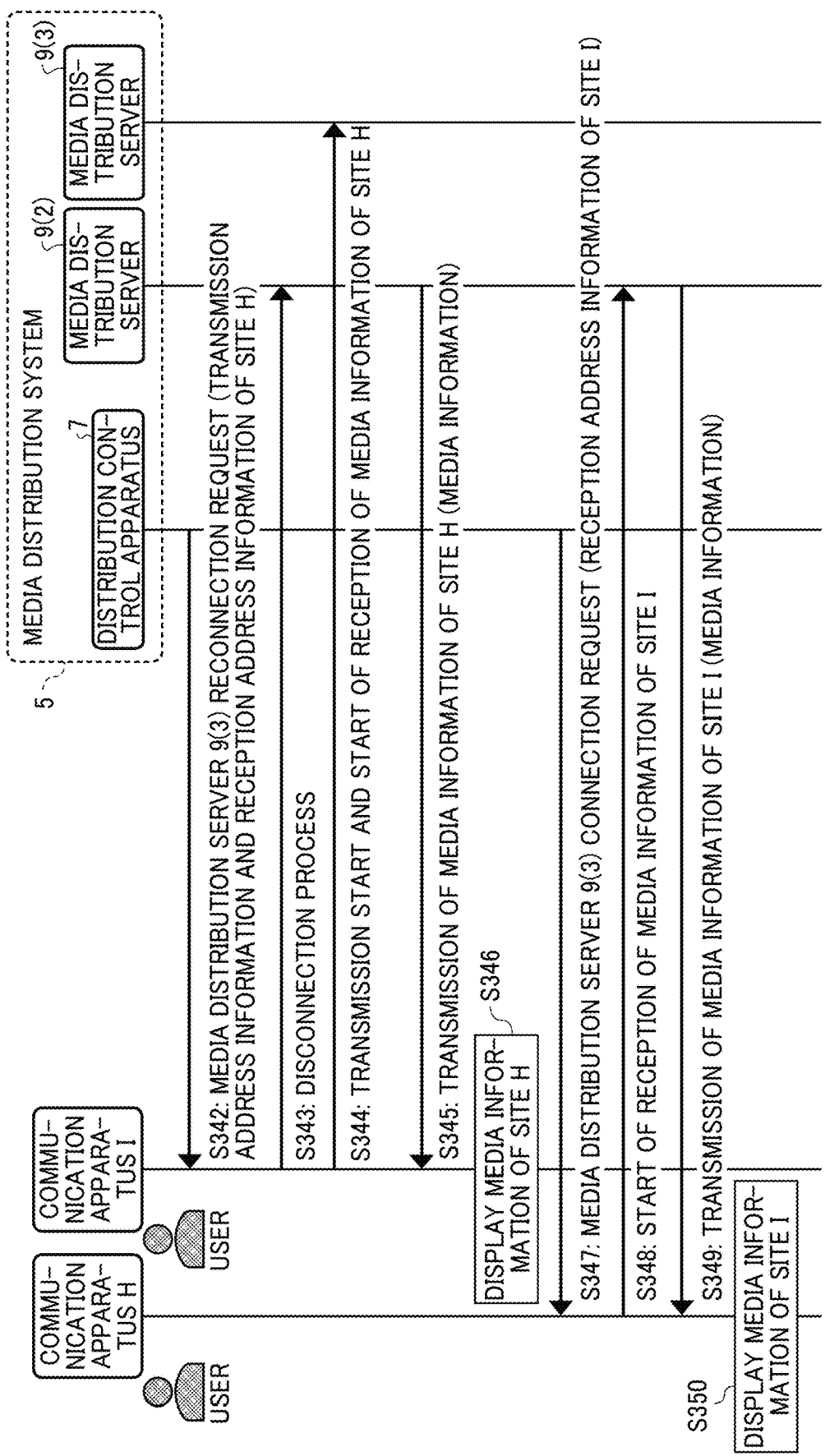
FIG. 31 is a sequence diagram illustrating an example of a reconnection process for site I according to the third embodiment of the present disclosure.

Next, a reconnection process for site I will be described. FIG. 31 is a sequence diagram illustrating an example of a reconnection process for site I according to the third embodiment. The processing of steps S342 to S346 in FIG. 31 is substantially the same as the processing of steps S262 to S266 in FIG. 25 described above, except for the following changes, and will not be described in detail herein. The changes are as follows: the communication apparatus included in the site is changed from the communication apparatus A to the communication apparatus I; the media distribution server to be disconnected is changed from the media distribution server 9(1) to the media distribution server 9(2); and the media information to be displayed is changed from the media information of the site C to the media information of the site H.

Further, the processing of steps S347 to S350 in FIG. 31 is substantially the same as the processing of steps S267 to S270 in FIG. 25 described above, except for the following changes, and will not be described in detail herein. The changes are as follows: the communication apparatus included in the site is changed from the communication apparatus C to the communication apparatus H; and the media information to be displayed is changed from the media information of the site A to the media information of the site I.

Standby State Inquiry from Each Site (Standby State Inquiry from Site C)

Figure 32:
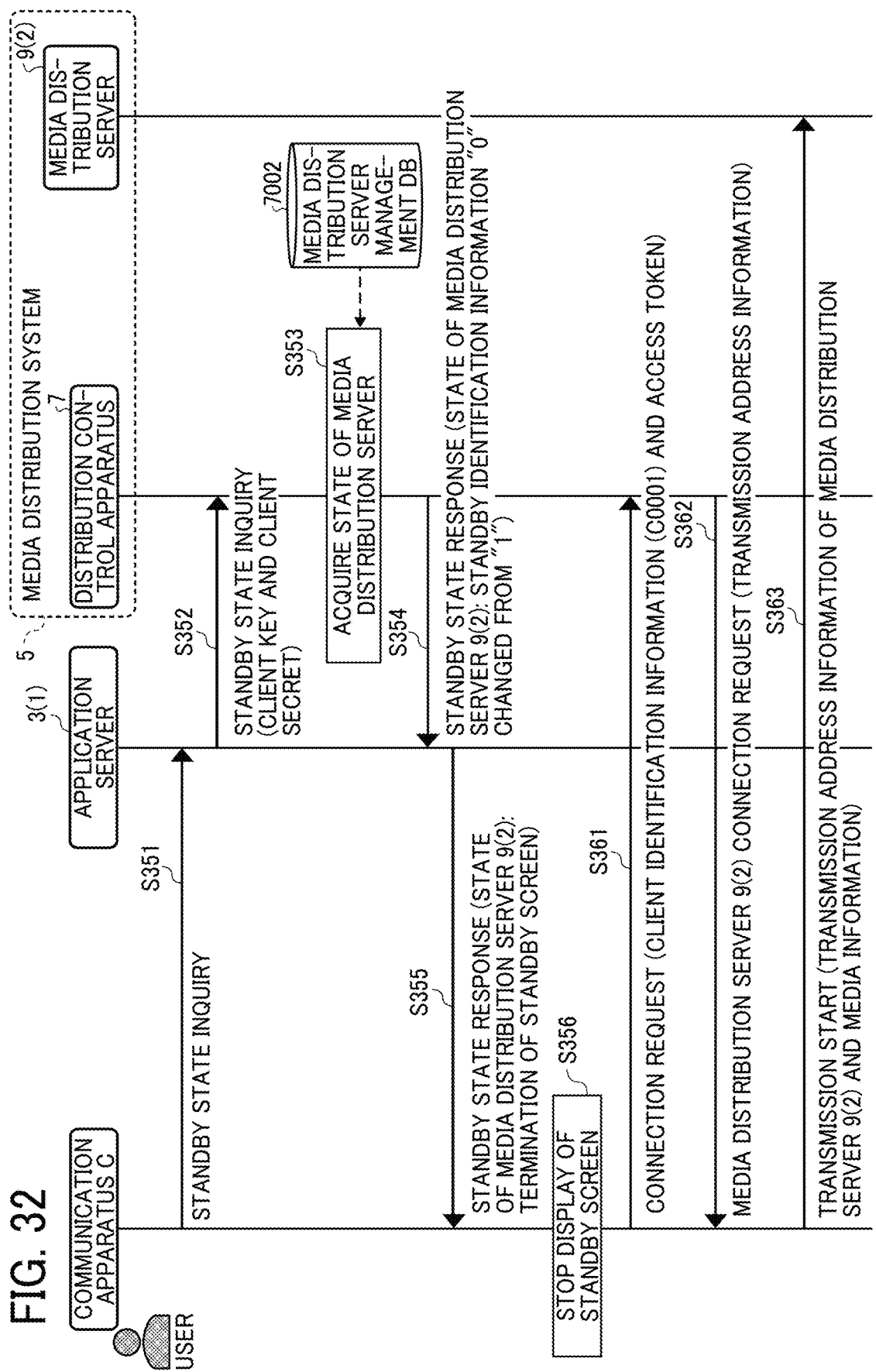
FIG. 32 is a sequence diagram illustrating another example of the standby state inquiry process from the site C according to the third embodiment of the present disclosure.

Next, a standby state inquiry process from the site C will be described. FIG. 32 is a sequence diagram illustrating another example of the standby state inquiry process from the site C according to the third embodiment. The processing of steps S351 to S356 in FIG. 32 is substantially the same as the processing of steps S251 to S256 in FIG. 24F described above, except that the media distribution server 9(3) is changed to the media distribution server 9(2), and will not be described in detail herein. Likewise, the processing of steps S361 to S363 is also the same as the processing of steps S257 to S259 in FIG. 24F described above, except that the media distribution server 9(3) is changed to the media distribution server 9(2), and will not be described in detail herein.

Reconnection Process for Site A

Figure 33:
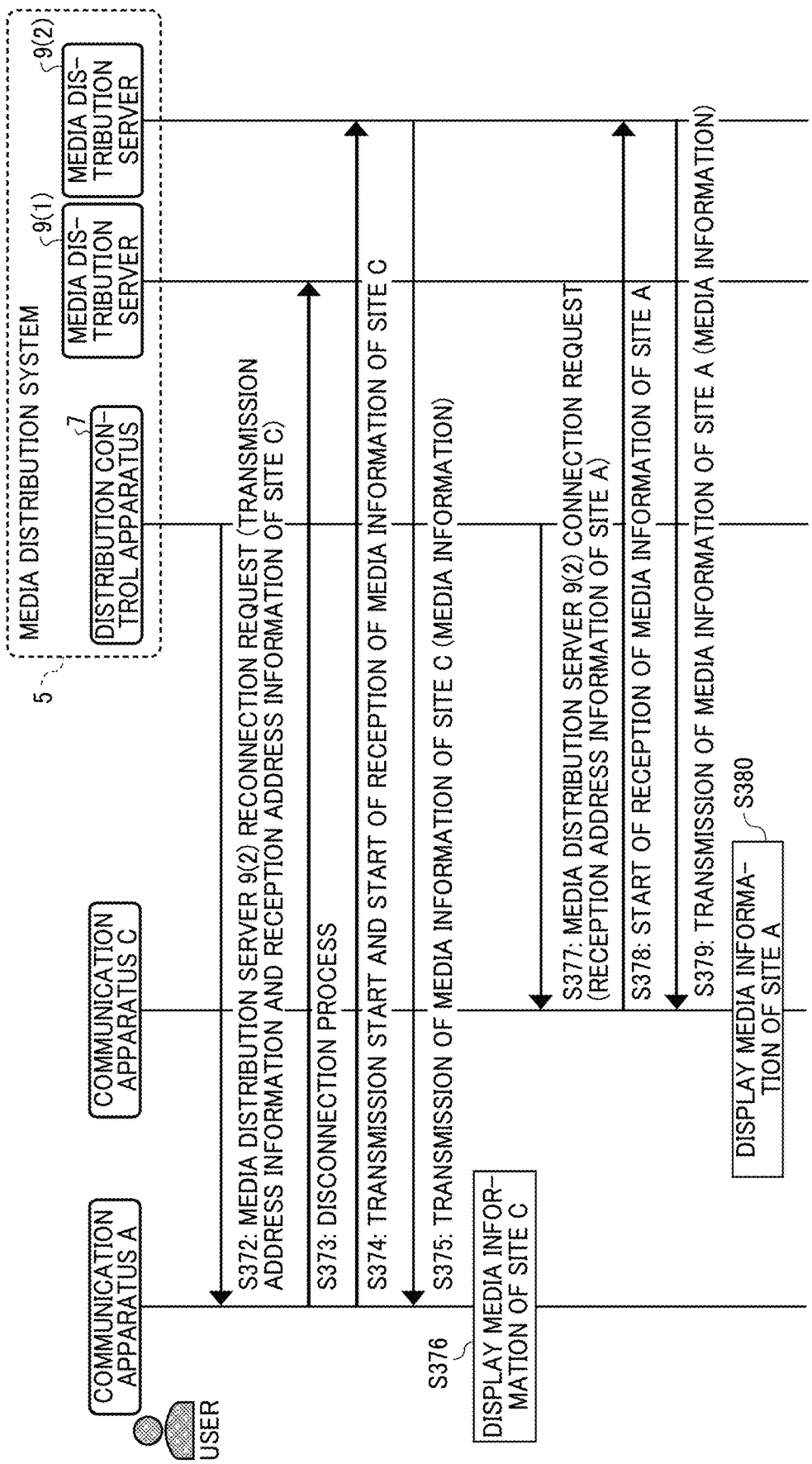
FIG. 33 is a sequence diagram illustrating an example of a reconnection process for the site A according to the third embodiment of the present disclosure.

Next, a reconnection process for the site A will be described. FIG. 33 is a sequence diagram illustrating an example of a reconnection process for the site A according to the third embodiment. The processing of steps S372 to S376 in FIG. 33 is substantially the same as the processing of steps S262 to S266 in FIG. 25 described above, except that the media distribution server 9(3) is changed to the media distribution server 9(2), and will not be described in detail herein.

Likewise, the processing of steps S377 to S380 in FIG. 33 is substantially the same as the processing of steps S267 to S270 in FIG. 25 described above, except that the media distribution server 9(3) is changed to the media distribution server 9(2), and will not be described in detail herein.

Reconnection Process for Site B

Figure 34A:
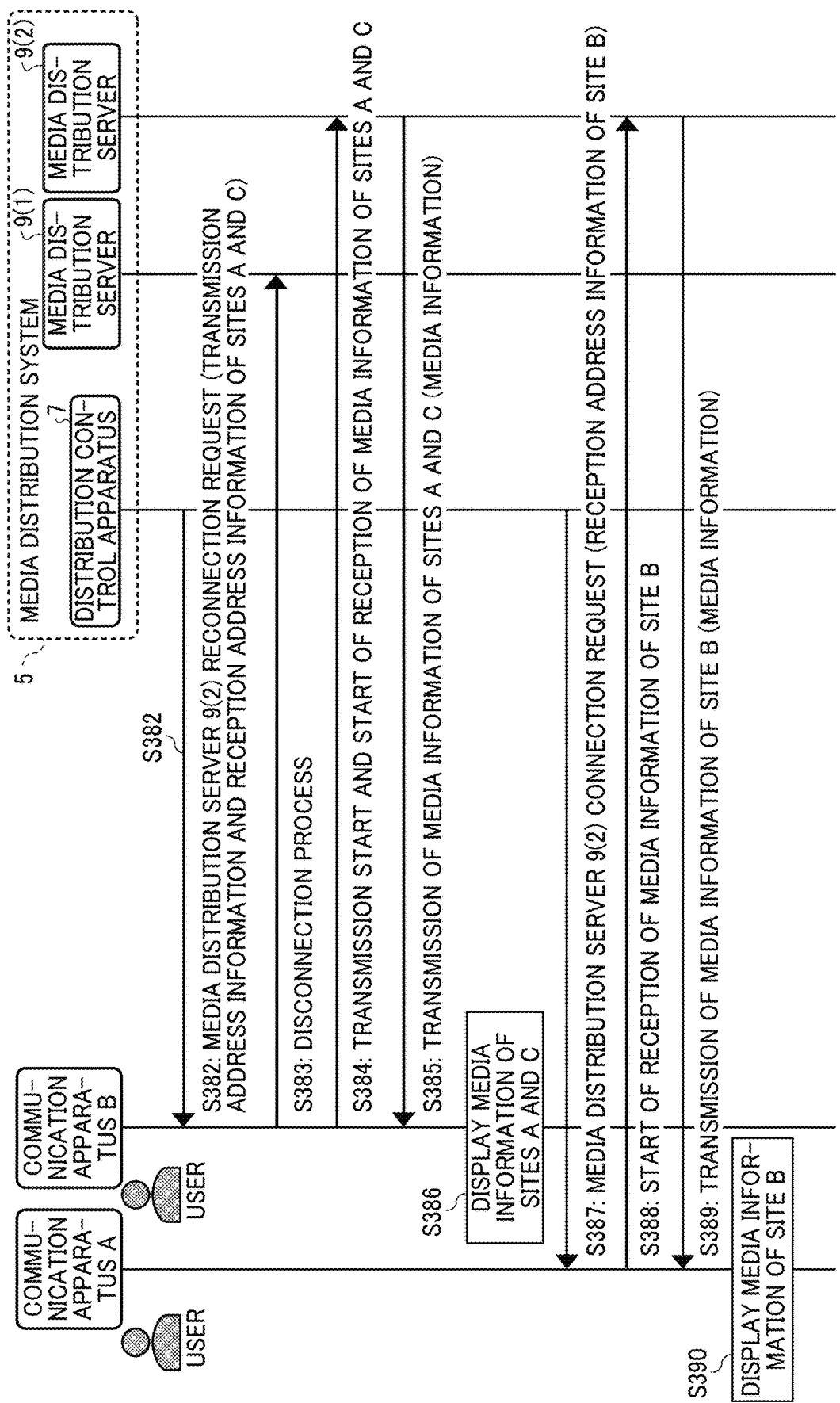
FIG. 34A is a sequence diagram illustrating an example of a reconnection process for the site B according to the third embodiment of the present disclosure.

Next, a reconnection process for the site B will be described. FIG. 34A is a sequence diagram illustrating an example of a reconnection process for the site B according to the third embodiment. The processing of steps S382 to S390 in FIG. 34A is substantially the same as the processing of steps S272 to S280 in FIG. 26A described above, except that the media distribution server 9(3) is changed to the media distribution server 9(2), and will not be described in detail herein.

Reconnection Process for Site B

Figure 34B:
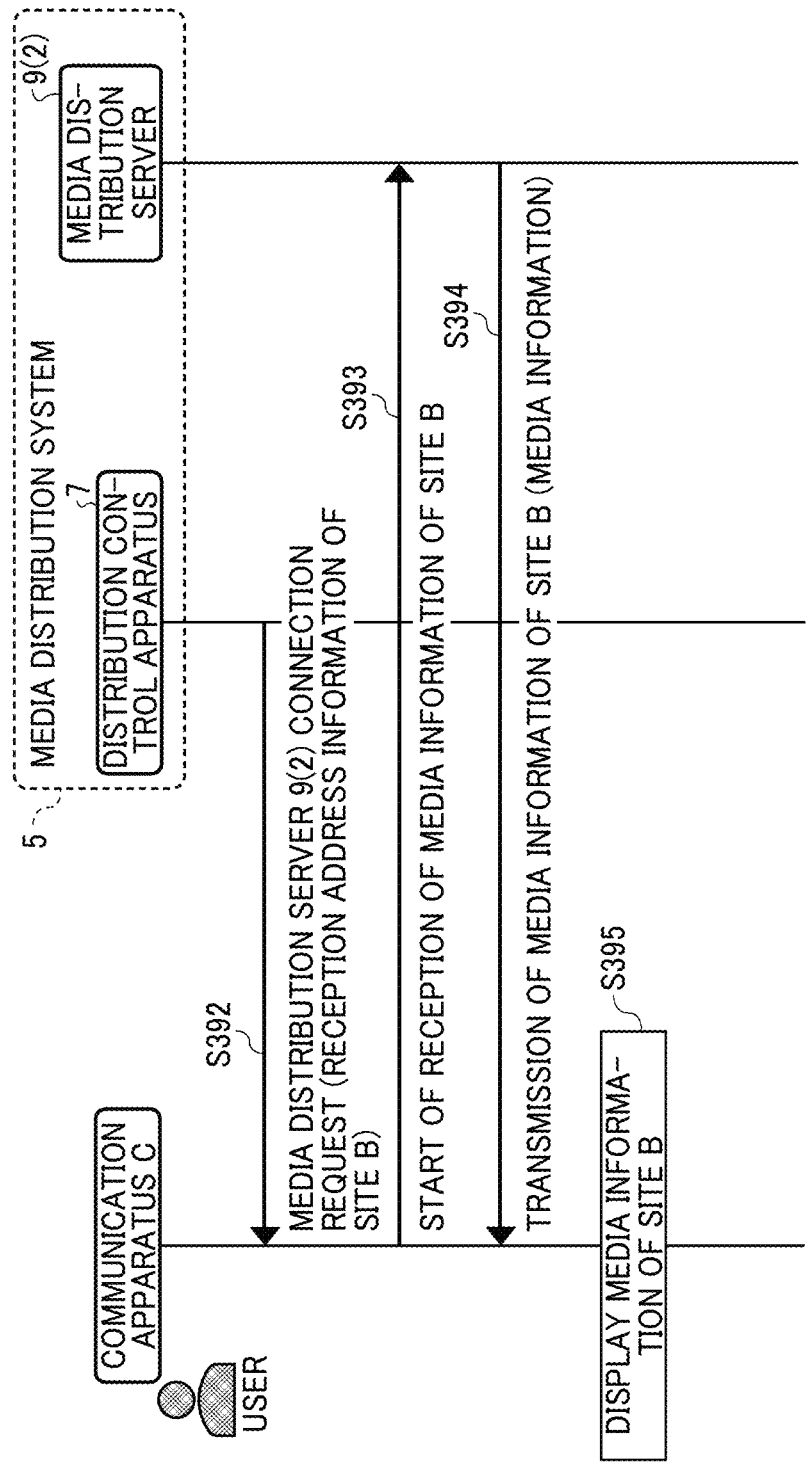
FIG. 34B is a sequence diagram illustrating the example of the reconnection process for the site B according to the third embodiment of the present disclosure.

Next, a reconnection process for the site B will be described. FIG. 34B is a sequence diagram illustrating the example of the reconnection process for the site B according to the third embodiment. The processing of steps S392 to S395 in FIG. 34B is substantially the same as the processing of steps S282 to S285 in FIG. 26B described above, except that the media distribution server 9(3) is changed to the media distribution server 9(2), and will not be described in detail herein.

As a result of the processes described above in the third embodiment, the following content is added to the room management DB 7003 (see FIG. 11). The client identification information ("C0001") is associated with the room identification information "R0001", the reserved bandwidth "20 Mbps", the media distribution server identification information "M0092", and the site identification information "B000A, B000B, and B000C". As a result, the assignment of the room for which a connection request has been made in the third embodiment to an appropriate media distribution server is completed.

As described above, in this embodiment, in response to a change to the room reserved bandwidth, if no existing media distribution server supports the reserved bandwidth for the use of the room, another room is moved to another media distribution server (the position of the room is changed) to secure the reserved bandwidth, and the secured media distribution server is assigned a predetermined room and operated (step S305-7). As a result, in addition to the advantages of the first embodiment, the advantage is achieved that provides the maximum use of the reserved bandwidth for each media distribution server in the communication system. This enables the reserved bandwidth of the predetermined room to be supported without adding a media distribution server, and can optimize the cost of the media distribution system.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Various kinds of information obtained in the embodiments described above may be acquired by a learning effect of machine learning using artificial intelligence (AI). In this case, a distribution control apparatus may use machine learning to perform processes such as calculating the extra capacity for a reserved bandwidth and changing the reserved bandwidth. Alternatively, an apparatus different from the distribution control apparatus, a database, or the like may acquire various information obtained using machine learning. In the present disclosure, the machine learning is defined as a technology that makes a computer acquire human-like learning ability. In addition, the machine learning refers to a technology in which a computer autonomously generates an algorithm used for determination such as data identification from learning data loaded in advance and applies the generated algorithm to new data to make a prediction. Any suitable learning method is applied for machine learning, for example, any one of supervised learning, unsupervised learning, semi-supervised learning, reinforcement learning, and deep learning, or a combination of two or more those learning.

Any one of the above-described operations may be performed in various other ways, for example, in an order different from the one described above.

While a media distribution system, a communication system, a distribution control apparatus, a distribution control method, and a program according to embodiments of the present disclosure have been described, the present disclosure is not limited to the embodiments described above, and additional embodiments may be implemented, or certain components may be changed or omitted so long as such changes can be conceived by a person skilled in the art and achieve the operation and effect of the present disclosure in any aspect within the scope of the present disclosure.

The invention claimed is:

1. A media distribution system comprising:
   one or more media distribution servers configured to distribute media information to one or more communication apparatuses at one or more sites, each of the one or more media distribution servers including one or more rooms, each of the rooms connected to one or more of the sites, the media information being shared between the sites; and
   a distribution control apparatus configured to control distribution of the media information between the one or more media distribution servers and the one or more communication apparatuses, the distribution control apparatus including first circuitry configured to:

assign one of the one or more media distribution servers that is selected based on a reserved bandwidth of the media distribution server for distributing the media information and a maximum reserved bandwidth available to the media distribution server, as a media distribution server that distributes the media information to one or more communication apparatuses at a collective site, the collective site including one or more sites that share the same media information; and transmit, in response to a connection request to connect to the assigned distributable media distribution server, transmitted from a particular communication apparatus of the one or more communication apparatuses at a particular site of the collective site, a connection response to the particular communication apparatus at the particular site, the distributable media distribution server including second circuitry configured to transmit, in response to the connection request from the distribution control apparatus, the media information transmitted from the particular communication apparatus at the particular site of the collective site, to another communication apparatus at another site different from the particular site of the collective site, wherein at each of the sites, when a room reserved bandwidth of the room is allocated, the media distribution server controls an uplink bandwidth for said each site and a downlink bandwidth for said each site, used for media information of said each site, such that the expression $$BR \geq = \Sigma \text{uplink bandwidths}(i) + \Sigma \text{downlink bandwidths}(i,j)$$

is satisfied, where BR is a room reserved bandwidth, i corresponds to sites to which there are uploads, and j corresponds to sites where there are downloads.

2. The media distribution system according to claim 1, wherein the first circuitry is configured to assign, based on the reserved bandwidth exceeding the maximum reserved bandwidth, another media distribution server supporting the reserved bandwidth, in place of the media distribution server that is selected, as the media distribution server that distributes the media information to the one or more communication apparatuses at the collective site.

3. The media distribution system according to claim 1, wherein the first circuitry is configured to assign, based on the reserved bandwidth exceeding the maximum reserved bandwidth, an additional media distribution server, in place of the media distribution server that is selected, as a new media distribution server capable of distributing the media information to the communication apparatuses at the collective site.

4. The media distribution system according to claim 1, wherein the first circuitry is configured to cause, based on the reserved bandwidth exceeding the maximum reserved bandwidth, the collective site managed by the media distribution server that is selected to be managed by another media distribution server, and assign the media distribution server that is selected, as the media distribution server that distributes the media information to the communication apparatuses at the collective site.

5. The media distribution system according to claim 1, wherein the first circuitry of the distribution control apparatus is configured to transmit a reconnection request for reconnecting to another media distribution server that is newly assigned to the communication apparatuses at the sites of the collective site.

6. The media distribution system according to claim 1, wherein the first circuitry of the distribution control apparatus is further configured to:

calculate a difference between the reserved bandwidth and the maximum reserved bandwidth, and assign another media distribution server supporting the reserved bandwidth, based on the difference that is calculated.

7. The media distribution system according to claim 1, wherein the first circuitry is further configured to:

determine whether the reserved bandwidth is within the maximum reserved bandwidth;

assign the selected media distribution server as the media distribution server that distributes the media information, based on a determination that the reserved bandwidth is within the reserved bandwidth; and assign another media distribution server supporting the reserved bandwidth, in place of the selected media distribution server, based on a determination that the reserved bandwidth is not within the reserved bandwidth.

8. The media distribution system according to claim 1, wherein the connection response includes destination information specifying the media distribution server that distributes the media information as a destination, and wherein the second circuitry of the distributable media distribution server is further configured to receive the destination information transmitted from the communication apparatus at said another site.

9. The media distribution system according to claim 1, wherein the first circuitry of the distribution control apparatus is further configured to:

generate an access token in response to at least one of a participation request transmitted from the particular communication apparatus at the particular site to participate in the collective site or another participation request transmitted from the communication apparatus at said another site to participate in the collective site, the access token including: collective site identification information that identifies the collective site; and one of particular-site identification information that identifies the particular site or another-site identification information that identifies said another site, and transmit the generated access token to the communication apparatuses at the sites of the collective site.

10. The media distribution system according to claim 9, wherein the first circuitry of the distribution control apparatus is configured to transmit, in response to a connection request transmitted from the communication apparatuses at the sites and including the access token to request a connection to the media distribution server that distributes the media information, a connection response to the communication apparatuses at the sites.

11. A communication system comprising:

the one or more communication apparatuses at the one or more sites; and the media distribution system according to claim 1, the communication apparatuses at the one or more sites including the communication apparatus at said another site, the communication apparatus at said another site including another circuitry configured to control a display to display the media information, transmitted from the media distribution server that distributes the media information.

12. The communication system according to claim 11, wherein the another circuitry causes the display to display a standby screen including a standby notification.

13. A distribution control apparatus for controlling distribution of media information between one or more communication apparatuses at one or more sites and one or more media distribution servers that distribute the media information to the communication apparatuses at the sites, the distribution control apparatus comprising circuitry configured to:

assign one of the one or more media distribution servers that is selected based on a reserved bandwidth of the media distribution server for distributing the media information and a maximum reserved bandwidth available to the media distribution server, as a media distribution server that distributes the media information to one or more communication apparatuses at a collective site, the collective site including one or more sites that share the same media information, each of the one or more media distribution servers including one or more rooms, each of the rooms connected to one or more of the sites, the media information being shared between the sites; and transmit, in response to a connection request to connect to the assigned distribution media distribution server, transmitted from a particular communication apparatus of the one or more communication apparatuses at a particular site of the collective site, a connection response to the particular communication apparatus at the particular site, wherein at each of the sites, when a room reserved bandwidth of the room is allocated, the media distribution server controls an uplink bandwidth for said each site and a downlink bandwidth for said each site, used for media information of said each site, such that the expression $$BR >= \Sigma \text{uplink bandwidths}(i) + \Sigma_{(i,j)} \text{downlink bandwidths}$$

is satisfied, where BR is a room reserved bandwidth, i corresponds to sites to which there are uploads, and j corresponds to sites where there are downloads.

14. A distribution control method executed by a distribution control apparatus for controlling distribution of media information between one or more communication apparatuses at one or more sites and one or more media distribution servers that distribute the media information to the communication apparatuses at the sites, the distribution control method comprising:

assigning one of the one or more media distribution servers that is selected based on a reserved bandwidth of the media distribution server for distributing the media information and a maximum reserved bandwidth available to the media distribution server, as a media distribution server that distributes the media information to one or more communication apparatuses at a collective site, the collective site including one or more sites that share the same media information, each of the one or more media distribution servers including one or more rooms, each of the rooms connected to one or more of the sites, the media information being shared between the sites; and transmitting, in response to a connection request to connect to the assigned distribution media distribution server, transmitted from a particular communication apparatus of the one or more communication apparatuses at a particular site of the collective site, a connection response to the particular communication apparatus at the particular site, wherein at each of the sites, when a room reserved bandwidth of the room is allocated, the media distribution server controls an uplink bandwidth for said each site and a downlink bandwidth for said each site, used for media information of said each site, such that the expression $$BR >= \Sigma \text{uplink bandwidths}(i) + \Sigma_{(i,j)} \text{downlink bandwidths}$$

is satisfied, where BR is a room reserved bandwidth, i corresponds to sites to which there are uploads, and j corresponds to sites where there are downloads.

* * * * *